(12) United States Patent
Van Wassen et al.

(10) Patent No.: US 11,767,489 B2
(45) Date of Patent: Sep. 26, 2023

(54) FLUIDS FOR ELECTRIC VEHICLES

(71) Applicant: ExxonMobil Technology and Engineering Company, Annandale, NJ (US)

(72) Inventors: Abigail R. Van Wassen, Florham Park, NJ (US); Andrew E. Taggi, New Hope, PA (US); Percy R. Kanga, Cherry Hill, NJ (US)

(73) Assignee: Exxon Mobil Technology and Engineering Company, Annandale, NJ (US)

( * ) Notice: Subject to any disclaimer, the term of this patent is extended or adjusted under 35 U.S.C. 154(b) by 157 days.

(21) Appl. No.: 17/321,646

(22) Filed: May 17, 2021

(65) Prior Publication Data

US 2021/0380899 A1 Dec. 9, 2021

Related U.S. Application Data

(60) Provisional application No. 63/036,509, filed on Jun. 9, 2020.

(51) Int. Cl.
| | |
|---|---|
| *C10M 171/02* | (2006.01) |
| *C09K 5/10* | (2006.01) |
| *H01M 10/613* | (2014.01) |
| *H01M 10/625* | (2014.01) |
| *H01M 10/6567* | (2014.01) |
| *C10N 20/00* | (2006.01) |
| *C10N 30/10* | (2006.01) |

(Continued)

(52) U.S. Cl.
CPC .............. *C10M 171/02* (2013.01); *C09K 5/10* (2013.01); *H01M 10/613* (2015.04); *H01M 10/625* (2015.04); *H01M 10/6567* (2015.04); *C10M 2203/003* (2013.01); *C10N 2020/02* (2013.01); *C10N 2020/067* (2020.05); *C10N 2030/02* (2013.01); *C10N 2030/10* (2013.01); *C10N 2040/046* (2020.05); *C10N 2040/08* (2013.01); *H01M 2220/20* (2013.01)

(58) Field of Classification Search
CPC . C10M 171/02; C10M 2203/003; C09K 5/10; H01M 10/613; H01M 10/625; H01M 10/6567; H01M 2220/20; C10N 2020/02; C10N 2020/067; C10N 2030/02; C10N 2030/10; C10N 2040/046; C10N 2040/08; Y02E 60/10
USPC ........................................................ 252/73
See application file for complete search history.

(56) References Cited

U.S. PATENT DOCUMENTS

| | | |
|---|---|---|
| 2,100,993 A | 11/1937 | Bruson |
| 3,595,791 A | 7/1971 | Cohen |

(Continued)

*Primary Examiner* — Prem C Singh
*Assistant Examiner* — Francis C Campanell
(74) *Attorney, Agent, or Firm* — C. Tumey Law Group PLLC

(57) ABSTRACT

A fluid includes a base stock and one or more additives. The base stock has a viscosity index of at least 80, and either a kinematic viscosity at 40° C. of at least 320 cSt or a kinematic viscosity at 100° C. of at least 14 cSt. The base stock includes greater than or equal to about 90 wt % saturates, less than or equal to about 10 wt % aromatics, and a sum of terminal/pendant propyl groups and terminal/pendant ethyl groups of at least 1.7 per 100 carbon atoms. The fluid has a thermal conductivity measured according to ASTM D7896 at 140° C. of 0.12 W/m·K or greater.

30 Claims, 5 Drawing Sheets

(51) Int. Cl.
    *C10N 30/02*          (2006.01)
    *C10N 40/04*          (2006.01)
    *C10N 40/08*          (2006.01)
    *C10N 20/02*          (2006.01)

(56) References Cited

U.S. PATENT DOCUMENTS

| | | |
|---|---|---|
| 4,767,551 A | 8/1988 | Hunt et al. |
| 6,034,039 A | 3/2000 | Gomes et al. |
| 6,323,164 B1 | 11/2001 | Liesen et al. |
| 9,418,828 B2 | 8/2016 | Mennito et al. |
| 2004/0209786 A1* | 10/2004 | Sagawa ............... C10M 137/04 508/371 |
| 2018/0086998 A1* | 3/2018 | David ................... C10M 101/02 |

\* cited by examiner

FLUIDS FOR ELECTRIC VEHICLES

CROSS-REFERENCE TO RELATED APPLICATIONS

This application claims the benefit of U.S. Provisional Application No. 63/036,509, filed on 9 Jun. 2020, the entire contents of which are incorporated herein by reference.

The provisional application was filed concurrently with U.S. provisional patent applications 63/036,513 and 63/036,518. Each of the aforementioned related patent applications are herein incorporated by reference.

FIELD OF THE INVENTION

Embodiments of the present disclosure generally relate to fluids, such as lubricants, produced from base stocks.

BACKGROUND OF THE INVENTION

There is a continual drive to improve the performance of designed fluids such as finished lubricants. Exposure to high temperature, often in the presence of oxygen, metals, and water, causes lubricants to oxidize and degrade. Exposure to shear forces together with high and low temperature extremes causes lubricants to degrade and become less able to perform their roles in the management of friction and heat transfer. Machines and mechanisms employing degraded lubricants perform at sub-optimal efficiencies and can be at risk of damage. Thus, it may be preferable to periodically drain and replace lubricants, usually at predetermined time intervals. At such times, the users of the affected machines incur a loss of productivity from the machines being out of operation, and incur costs related to the materials, service, and waste disposal aspects of the lubricant change-out. Such detrimental aspects are magnified for applications in which the affected equipment is difficult to access, such as turbines located offshore.

In addition, it may be desirable for fluids that are to be used in electric vehicles to have coolant properties, such as appropriate thermal transfer properties, in addition to other properties, such as wear protection, low temperature pumpability, and resistance to oxidation, that are associated with lubricants.

SUMMARY

In one embodiment, a fluid may include a base stock and one or more additives. The base stock may have a viscosity index of at least 80, and either a kinematic viscosity at 40° C. of at least 320 cSt or a kinematic viscosity at 100° C. of at least 14 cSt. The base stock may include greater than or equal to about 90 wt % saturates, less than or equal to about 10 wt % aromatics, and a sum of terminal/pendant propyl groups and terminal/pendant ethyl groups of at least 1.7 per 100 carbon atoms. The fluid may have a thermal conductivity measured according to ASTM D7896 at 140° C. of 0.12 W/m·K or greater.

In another embodiment, a method may include cooling a surface within an electrical machine by causing a fluid to contact the surface. The fluid may include a base stock and one or more additives. The base stock may have a viscosity index of at least 80, and either a kinematic viscosity at 40° C. of at least 320 cSt or a kinematic viscosity at 100° C. of at least 14 cSt. The base stock may include greater than or equal to about 90 wt % saturates, less than or equal to about 10 wt % aromatics, and a sum of terminal/pendant propyl groups and terminal/pendant ethyl groups of at least 1.7 per 100 carbon atoms. The fluid may have a thermal conductivity measured according to ASTM D7896 at 140° C. of 0.12 W/m·K or greater.

In another embodiment, a method may include blending a base stock and one or more additives to form a blended fluid. The base stock may have a viscosity index of at least 80, and either a kinematic viscosity at 40° C. of at least 320 cSt or a kinematic viscosity at 100° C. of at least 14 cSt. The base stock may include greater than or equal to about 90 wt % saturates, less than or equal to about 10 wt % aromatics, and a sum of terminal/pendant propyl groups and terminal/pendant ethyl groups of at least 1.7 per 100 carbon atoms. The blended fluid may have a thermal conductivity measured according to ASTM D7896 at 140° C. of 0.12 W/m·K or greater. The blended fluid may be configured to resist forming deposits in an oxidizing environment.

BRIEF DESCRIPTION OF THE DRAWINGS

So that the manner in which the above recited features of the present disclosure can be understood in detail, a more particular description of the disclosure, briefly summarized above, may be had by reference to embodiments. Certain aspects of some embodiments are illustrated in the appended figures. It is to be noted, however, that the appended figures illustrate only exemplary embodiments, and therefore are not to be considered limiting of scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
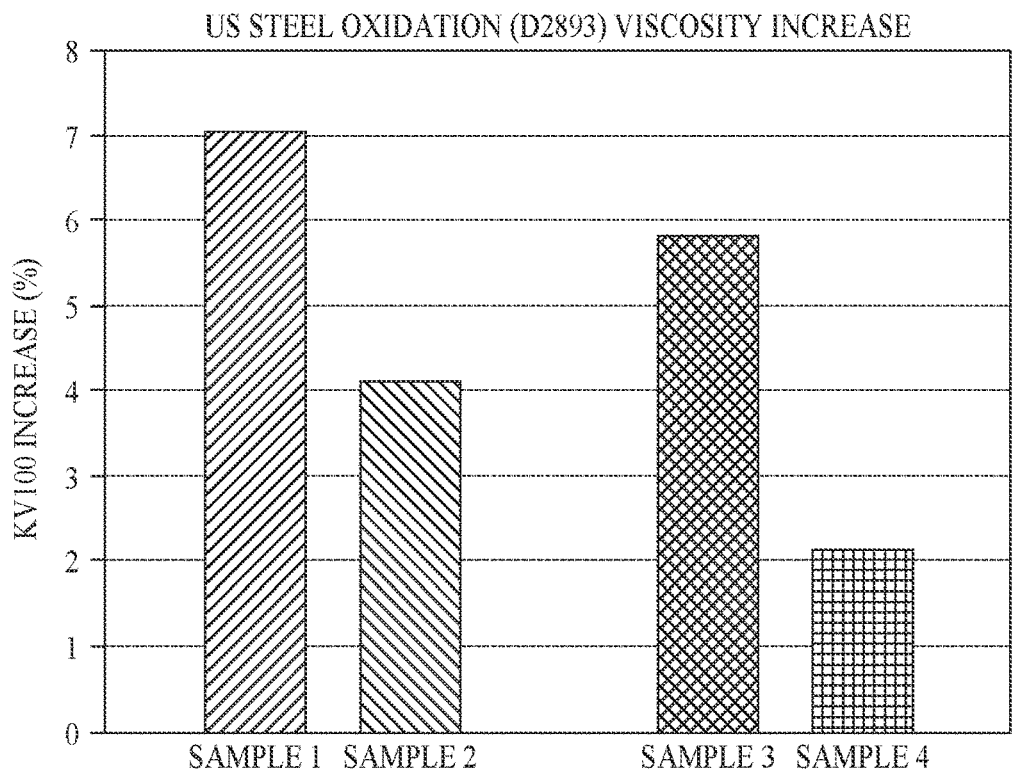
FIG. 1 is a graph illustrating comparative test results for fluids of the present disclosure and lubricants blended from a high viscosity Group I base stock, measured according to the ASTM D2893 US Steel Oxidation Test, according to an embodiment.

Fluids that are used as lubricants are manufactured by blending one or more base stocks with one or more additives. Properties of such fluids, for example a fluid's viscosity, may be governed by selecting different base stocks and different types and/or quantities of additives. Base stocks of the present disclosure may be used to blend fluids that have better properties than other fluids. For example, fluids of the present disclosure may have improved oxidation performance, and/or improved low temperature performance, and/or improved deposit control, and/or improved heat transfer properties compared to other fluids.

There is a need to improve designed fluids, and particularly lubricants, in order to improve performance under extremes of low and high temperature. There is also a benefit to increase time intervals between successive lubricant exchanges without sacrificing the lubricating properties of the lubricants. The present disclosure relates to fluids blended from a base oil comprising a high viscosity Group II base stock, and particularly a high viscosity Group II bright stock. Fluids of the present disclosure may be suited for use in vehicles, particularly in electric, battery-powered vehicles, such as hybrid, plug-in hybrid, and/or battery electric vehicles. Fluids of the present disclosure may exhibit one or more of low temperature rheology, high temperature rheology, oxidation performance, deposit control, thermal conductivity, and specific heat capacity that at least meets, and may exceed, the performance of comparative fluids formulated from Group I bright stock.

"Electric vehicle," and any variant thereof, refers to all-electric and fully electric vehicles, and hybrid and hybrid electric vehicles, which may have any of a variety of parallel or series drivetrain configurations, alone or in combination, and includes the mechanical and electrical systems, subsystems, and components having gears used in the vehicles. Mechanical and electrical systems, subsystems and components having gears can include, for example, electrical vehicle powertrains, powertrain components, drivetrain components, kinetic energy recovery systems (KERS), energy regenerative systems, and the like. The terms electric vehicle and hybrid vehicle may be used interchangeably. Moreover, the term "electric vehicle" is not limited to land-bound vehicles (e.g., automobiles), but is also intended to encompass transportation vehicles that are fully or partially powered electrically and includes aviation vehicles (e.g., airplanes, drones, spacecraft, etc.) and nautical vehicles (e.g., any type of water craft, hovercraft, submarine, etc.). "Electric vehicle" can also refer to manually-driven or autonomous vehicles, or any suitable hybrid thereof.

Although the functions of fluids in electric vehicles largely reflect similar functions of lubricants used in non-electric vehicles powered by internal combustion engines, electric vehicles may also present some different and more stringent operational needs on their fluids. For example, a bearing grease may be selected at least in part on the basis of its contribution to noise reduction as well as its capability to perform the typical functions of a grease, such as friction management, wear-resistance, etc. Furthermore, a grease used for electric motor bearings may be selected at least in part on the basis of its dielectric properties.

Fluids used in drivetrains of electric vehicles may be subjected to demands additional to those placed upon lubricants used in non-electric vehicles. Electric vehicles typically employ one of two different motor-drivetrain configurations. A first configuration comprises a motor and a drivetrain as separate units that are attached within the vehicle. The lubrication needs of the motor are separate from those of the drivetrain, and thus a fluid for such a drivetrain may be formulated similarly to one for a drivetrain of a non-electric vehicle. Nevertheless, because the drivetrain is powered by the electric motor, it should be configured to withstand the unique mechanical demands placed upon it by the electric motor. The output shafts of some electric motors rotate at much higher speeds than those of internal combustion engines, and therefore the drivetrain should be able to cope with such rotational speeds in order to function properly. Additionally, electric motors can generate their maximum torque values at very low rotational speeds—even when the motors' output shafts are not turning (so rotation is at zero revolutions per minute (0 RPM)). Hence, the drivetrain must be able to function effectively when subjected to a maximum torque at 0 RPM. Because of the above aspects, drivetrains for electric vehicles may be subject to greater friction, greater loading at low and zero revolutions, and greater wear problems than drivetrains for non-electric vehicles. These effects, in turn, place greater needs upon the drivetrain fluids. For example, higher rotation speeds can provide a heightened requirement for the fluid's capability to manage friction, to resist foaming, and to withstand shear-thinning of its components. Additionally, efficacy of anti-wear components of a fluid may be desired when the drivetrain is stationary or operating at low revolution speeds. It follows that the fluid's properties when cold at start-up can also be an important consideration.

A second motor-drivetrain configuration has the electric motor and its drivetrain integrated into a single unit. One characteristic of this configuration is that the drivetrain fluid also flows inside the motor. Thus, a drivetrain fluid may be formulated to meet not only the aspects, such as those described above, of functioning in the drivetrain, but also to meet properties of functioning within the motor. These additional demands concern heat transfer properties, electrical insulation properties, copper corrosion resistance, thermal degradation resistance, and deposit control properties, amongst others.

An additional use for fluids in electric vehicles involves the cooling of the vehicles' batteries. Electric vehicles' batteries are subjected to repeated charging and discharging cycles. The rate at which charging (and discharging) occurs depends on the measure of electrical current. Thus, a need for more rapid charging in turn may be satisfied from the use of higher charging currents. However, during charging (and discharging) cycles, batteries generate heat due to their inherent internal resistance—the Ohmic, or Joule, heating effect. This heating becomes more pronounced with increasing electrical current. The lithium ion batteries used in electric vehicles are prone to experience a high level of heating, which can cause failure, hence a need for effective cooling. Conventional battery cooling systems include a water-glycol solution circulating through purpose-made conduits within a battery pack. Such systems may provide ineffective cooling for some battery cells, and thus the batteries may experience hot spots and premature degradation, which may be addressed by immersion cooling of the battery in a suitable fluid. Immersion cooling involves the cooling fluid directly contacting the cells in a battery pack, thereby providing for more effective heat transfer. This, in turn, may allow the use of more compact (space- and weight-efficient) batteries. Suitable cooling fluids may have appropriate heat transfer, dielectric, corrosion resistance, thermal degradation resistance, deposit control, and rheological properties.

In addition to the above, the operation of a hybrid vehicle may place some additional desired attributes for the fluid used within the vehicle's internal combustion engine. For example, because the engine is started only periodically during normal operation, its average operating temperature may be lower than that for an engine of a non-hybrid vehicle. Such a lower temperature may impact the effectiveness of the fluid's anti-wear and antioxidant additives. Furthermore, the fluid's properties when cold at start-up may also be an important consideration.

Fluids described herein may be suitable for use in at least some of the above-described embodiments. The fluids may be formulated with a high viscosity Group II base stock.

Base stocks may be used for the production of fluids, such as lubricating oils for automobiles, industrial lubricants, and lubricating greases. Base stocks may also be used in process oils, white oils, metal working oils and heat transfer fluids. A blend of base stocks may also be referred to as a "base oil." Finished lubricants generally include one or more base stocks plus additives. The base stock component may be the major component in these finished lubricants, and can contribute significantly to the properties of the finished lubricant. Generally, a few lubricating base stocks are used to manufacture a wide variety of finished lubricants by varying the mixtures of individual base stocks and individual additives.

According to the American Petroleum Institute (API) classifications, base stocks are categorized in five groups based on their saturated hydrocarbon content (quoted as a weight percent (wt %)), sulfur level (wt %), and viscosity index (see Table 1). Lubricant base stocks are typically produced in large scale from petroleum sources. Group I, II, and III base stocks are derived from crude oil via processing, such as solvent extraction, hydroprocessing, solvent or catalytic dewaxing, and hydroisomerization. Group III base stocks also can be produced from synthetic hydrocarbon liquids obtained from natural gas, coal or other fossil resources; Group IV base stocks, the polyalphaolefins (PAO), are produced by oligomerization of alpha olefins, such as 1-decene; Group V base stocks include everything that does not belong to Groups I-IV, such as naphthenics, polyalkylene glycols (PAG), and esters.

TABLE 1

| API Classification | wt % Saturates | | wt % Sulfur | | Viscosity Index (VI) |
|---|---|---|---|---|---|
| Group I | <90 | and/or | >0.03 | and | 80-120 |
| Group II | ≥90 | and | ≤0.03 | and | 80-120 |
| Group III | ≥90 | and | ≤0.03 | and | >120 |
| Group IV | Polyalphaolefins (PAO) | | | | |
| Group V | All others not in Groups I-IV | | | | |

A Group II base stock may have at least one property that is enhanced relative to a minimum Group II specification. The enhanced property may be, for example, a viscosity index that is substantially greater than the Group II specification of 80. Such a Group II base stock may have a viscosity index of at least 90, or at least 95, or at least 100, at least 103, or at least 108, or at least 113.

Group II high viscosity base stocks of the present disclosure can have a higher viscosity than traditional Group II base stocks. Group II high viscosity base stocks of the present disclosure can have a kinematic viscosity at 100° C. of at least 14 cSt, or at least 20 cSt, or at least 25 cSt, or at least 30 cSt, or at least 32 cSt; can contain less than 10 wt % aromatics; greater than 90 wt % saturates; and/or less than 0.03 wt % sulfur. The saturates content may be higher, such as greater than 95 wt %, or greater than 97 wt %. Such Group II base stocks typically appear clear and bright. In at least one embodiment, a Group II base stock has one or more of the following properties: a viscosity index of at least 80, an aromatics content of less than 10 wt %, a sulfur content of less than 300 wppm, a kinematic viscosity at 100° C. of at least 14 cSt, a kinematic viscosity at 40° C. of at least 320 cSt, a pour point of −9° C. or less, and/or a cloud point of −2° C. or less. In at least one embodiment, a Group II base stock has a viscosity index of at least 95 and/or a kinematic viscosity at 100° C. of 30 cSt to 40 cSt. Group II base stocks of the present disclosure may have a pour point of −10° C. or less, such as −20° C. or less, or −25° C. to −30° C. Group II base stocks of the present disclosure may have a T10 distillation point of at least 482° C.

A Group II base stock with a kinematic viscosity at 100° C. of 29 cSt to 32 cSt or more can be beneficial, for example, in reducing or minimizing the use of viscosity increasing additives in certain applications where this base stock would serve as a replacement for conventional Group I bright stocks. Additionally, or alternatively, a Group II base stock with a kinematic viscosity at 100° C. of 29 cSt to 32 cSt or more can be beneficial for use in applications where a Group I bright stock potentially would be unsuitable, such as in environments where a Group I bright stock would have difficulties with oxidation stability performance.

Group II high viscosity base stocks of the present disclosure may be derived from low severity deasphalting of resid fractions to form a deasphalted oil. The deasphalted oil can be demetallated, hydrotreated, hydrocracked, hydrodewaxed, and hydrofinished to make a high saturates base stock in the same viscosity range as a traditional Group I bright stock. The resulting base stock, however, may be a Group II high viscosity base stock having an improved color, a lower pour point, an equivalent or higher viscosity index, and a higher saturates content than a Group I bright stock.

In at least one embodiment, a Group II base stock has a kinematic viscosity at 40° C. of about 480 cSt, a kinematic viscosity at 100° C. of about 33 cSt, a viscosity index of about 100, an emulsion time at 82° C. of about 15 mins, a pour point of about −21° C., and a saturates content of about 99 wt %. Table 2 presents a comparison of properties of the example Group II base stock versus typical values of Group I bright stock.

TABLE 2

| Property | Test Method | Example Group II Base Stock | Typical Group I Bright Stock |
|---|---|---|---|
| Appearance | Visual | Clear & Bright | Clear & Bright |
| Viscosity @ 40° C. (cSt) | ASTM D445 | 480 | 480 |
| Viscosity @ 100° C. (cSt) | ASTM D445 | 33 | 32 |
| Viscosity Index | ASTM D2270 | 100 | 97 |
| Emulsion time @ 82° C. (mins) | ASTM D1401 | 15 | 15 |

TABLE 2-continued

| Property | Test Method | Example Group II Base Stock | Typical Group I Bright Stock |
|---|---|---|---|
| Pour point (° C.) | ASTM D97 | −21 | −6 |
| Saturates (wt %) | ASTM D7419 | 99 | 60 |

Thus, Group II high viscosity base stocks of the present disclosure may be suitable for use in lubricant blends as a replacement for existing Group I bright stocks.

Group II Base Stock Overview

Group II lubricant base stocks, including Group II bright stock, may be produced from deasphalted oils generated by low severity $C_{4+}$ deasphalting. Low severity deasphalting as used herein refers to deasphalting under conditions that result in a high yield of deasphalted oil (and/or a reduced amount of rejected asphalt or rock), such as a deasphalted oil yield of at least 50 wt % relative to the feed to deasphalting, or at least 55 wt %, or at least 60 wt %, or at least 65 wt %, or at least 70 wt %, or at least 75 wt %. Group I base stocks (including bright stock) can be formed without performing a solvent extraction on the deasphalted oil. Group II base stocks (including bright stock) can be formed using a combination of catalytic and solvent processing. In contrast with conventional bright stock produced from deasphalted oil formed at low severity conditions, the Group I and Group II bright stocks of the present disclosure can be substantially free of haze after storage for extended periods of time.

In various additional aspects, methods are provided for catalytic processing of $C_3$ deasphalted oils to form Group II bright stock. Forming Group II bright stock by catalytic processing can provide a bright stock with improved compositional properties.

Conventionally, crude oils are often described as being composed of a variety of boiling ranges. Lower boiling range compounds in a crude oil correspond to naphtha or kerosene fuels. Intermediate boiling range distillate compounds can be used as diesel fuel or as lubricant base stocks. If any higher boiling range compounds are present in a crude oil, such compounds are considered as residual or "resid" compounds, corresponding to the portion of a crude oil that is left over after performing atmospheric and/or vacuum distillation on the crude oil.

In some processing schemes, a resid fraction can be deasphalted, with the deasphalted oil used as part of a feed for forming lubricant base stocks. A deasphalted oil used as feed for forming lubricant base stocks is produced using propane deasphalting. This propane deasphalting corresponds to a "high severity" deasphalting, as indicated by a typical yield of deasphalted oil of about 40 wt % or less, often 30 wt % or less, relative to the initial resid fraction. In a typical lubricant base stock production process, the deasphalted oil can then be solvent extracted to reduce the aromatics content, followed by solvent dewaxing to form a base stock. The low yield of deasphalted oil is based in part on the inability of conventional methods to produce lubricant base stocks from lower severity deasphalting that do not form haze over time.

In some aspects, it has been discovered that using a mixture of catalytic processing, such as hydrotreatment, and solvent processing, such as solvent dewaxing, can be used to produce lubricant base stocks from deasphalted oil while also producing base stocks that have little or no tendency to form haze over extended periods of time. The deasphalted oil can be produced by a deasphalting process that uses a $C_4$ solvent, a $C_5$ solvent, a $C_{6+}$ solvent, a mixture of two or more $C_{4+}$ solvents, or a mixture of two or more $C_{5+}$ solvents. The deasphalting process can further correspond to a process with a yield of deasphalted oil of at least 50 wt % for a vacuum resid feed having a T10 distillation point (or a T5 distillation point) of at least 400° C., or at least 510° C., or a deasphalted oil yield of at least 60 wt %, or at least 65 wt %, or at least 70 wt %, or at least 75 wt %. It is believed that the reduced haze formation is due in part to the reduced or minimized differential between the pour point and the cloud point for the base stocks and/or due in part to forming a bright stock with a cloud point of −2° C. or less, or −5° C. or less.

For production of Group II base stocks, in some aspects a deasphalted oil can be hydroprocessed (hydrotreated and/or hydrocracked), so that conversion at about 700° F.+ (370° C.+) is 10 wt % to 40 wt %. The hydroprocessed effluent can be fractionated to separate lower boiling portions from a lubricant base stock boiling range portion. The lubricant boiling range portion can then be hydrocracked, dewaxed, and hydrofinished to produce a catalytically dewaxed effluent. In some embodiments, the lubricant boiling range portion can be underdewaxed, so that the wax content of the catalytically dewaxed heavier portion or potential bright stock portion of the effluent is at least 6 wt %, or at least 8 wt %, or at least 10 wt %. This underdewaxing can also be suitable for forming light or medium or heavy neutral lubricant base stocks that do not require further solvent upgrading to form haze free base stocks. In this discussion, the heavier portion/potential bright stock portion can roughly correspond to a 538° C.+ portion of the dewaxed effluent. The catalytically dewaxed heavier portion of the effluent can then be solvent processed by solvent dewaxing to form a solvent dewaxed effluent. The solvent dewaxed effluent can be separated to form a plurality of base stocks with a reduced tendency (such as no tendency) to form haze over time, including at least a portion of a Group II bright stock product.

For production of Group II base stocks, in other aspects a deasphalted oil can be hydroprocessed (hydrotreated and/or hydrocracked), so that 370° C.+ conversion is at least 40 wt %, or at least 50 wt %. The hydroprocessed effluent can be fractionated to separate lower boiling portions from a lubricant base stock boiling range portion. The lubricant base stock boiling range portion can then be hydrocracked, dewaxed, and hydrofinished to produce a catalytically dewaxed effluent. The catalytically dewaxed effluent can then be solvent extracted to form a raffinate. The raffinate can be separated to form a plurality of base stocks with a reduced tendency (such as no tendency) to form haze over time, including at least a portion of a Group II bright stock product. In yet other aspects, a Group II bright stock product can be formed without performing further solvent processing after catalytic dewaxing.

In other aspects, it has been discovered that catalytic processing can be used to produce Group II bright stock with improved compositional properties from $C_3$, $C_4$, $C_5$, and/or $C_{5+}$ deasphalted oil. The deasphalted oil can be hydrotreated to reduce the content of heteroatoms (such as sulfur and nitrogen), followed by catalytic dewaxing under sweet conditions. In some embodiments, hydrocracking can be included as part of a sour hydrotreatment stage and/or as part of a sweet dewaxing stage.

In various aspects, a variety of combinations of catalytic and/or solvent processing can be used to form lubricant base stocks, including Group II bright stock, from deasphalted oils. These combinations include, but are not limited to:

a) Hydroprocessing of a deasphalted oil under sour conditions (i.e., sulfur content of at least 500 wppm); separation of the hydroprocessed effluent to form at least a lubricant boiling range fraction, and solvent dewaxing of the lubricant boiling range fraction. In some aspects, the hydroprocessing of the deasphalted oil can correspond to hydrotreatment, hydrocracking, or a combination thereof.

b) Hydroprocessing of a deasphalted oil under sour conditions (i.e., sulfur content of at least 500 wppm); separation of the hydroprocessed effluent to form at least a lubricant boiling range fraction; and catalytic dewaxing of the lubricant boiling range fraction under sweet conditions (i.e., 500 wppm or less sulfur). The catalytic dewaxing can correspond to catalytic dewaxing using a dewaxing catalyst with a pore size greater than 8.4 Angstroms. In some embodiments, the sweet processing conditions can further include hydrocracking, noble metal hydrotreatment, and/or hydrofinishing. The optional hydrocracking, noble metal hydrotreatment, and/or hydrofinishing can occur prior to and/or after or after catalytic dewaxing. For example, the order of catalytic processing under sweet processing conditions can be noble metal hydrotreating followed by hydrocracking followed by catalytic dewaxing.

c) The process of b) above, followed by performing an additional separation on at least a portion of the catalytically dewaxed effluent. The additional separation can correspond to solvent dewaxing, solvent extraction (such as solvent extraction with furfural or n-methylpyrollidone), a physical separation such as ultracentrifugation, or a combination thereof.

d) The process of a) above, followed by catalytic dewaxing (sweet conditions) of at least a portion of the solvent dewaxed product. In some embodiments, the sweet processing conditions can further include hydrotreating (such as noble metal hydrotreating), hydrocracking and/or hydrofinishing. The additional sweet hydroprocessing can be performed prior to and/or after the catalytic dewaxing.

In the discussion below, a stage can correspond to a single reactor or a plurality of reactors. In some embodiments, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

In this discussion, conditions may be provided for various types of hydroprocessing of feeds or effluents. Examples of hydroprocessing can include, but are not limited to, one or more of hydrotreating, hydrocracking, catalytic dewaxing, and hydrofinishing/aromatic saturation. Such hydroprocessing conditions can be controlled to have desired values for the conditions (e.g., temperature, pressure, liquid hourly space velocity, treat gas rate) by using at least one controller, such as a plurality of controllers, to control one or more of the hydroprocessing conditions. In some aspects, for a given type of hydroprocessing, at least one controller can be associated with each type of hydroprocessing condition. In some aspects, one or more of the hydroprocessing conditions can be controlled by an associated controller. Examples of structures that can be controlled by a controller can include, but are not limited to, valves that control a flow rate, a pressure, or a combination thereof; heat exchangers and/or heaters that control a temperature; and one or more flow meters and one or more associated valves that control relative flow rates of at least two flows. Such controllers may include a controller feedback loop including at least a processor, a detector for detecting a value of a control variable (e.g., temperature, pressure, flow rate, and a processor output for controlling the value of a manipulated variable (e.g., changing the position of a valve, increasing or decreasing the duty cycle and/or temperature for a heater). In some embodiments, at least one hydroprocessing condition for a given type of hydroprocessing may not have an associated controller.

In this discussion, unless otherwise specified a lubricant boiling range fraction corresponds to a fraction having an initial boiling point or alternatively a T5 boiling point of at least about 370° C. (approximately 700° F.). A distillate fuel boiling range fraction, such as a diesel product fraction, corresponds to a fraction having a boiling range from about 193° C. (375° F.) to about 370° C. (approximately 700° F.). Thus, distillate fuel boiling range fractions (such as distillate fuel product fractions) can have initial boiling points (or alternatively T5 boiling points) of at least about 193° C. and final boiling points (or alternatively T95 boiling points) of about 370° C. or less. A naphtha boiling range fraction corresponds to a fraction having a boiling range from about 36° C. (122° F.) to about 193° C. (375° F.) to about 370° C. (approximately 700° F.). Thus, naphtha fuel product fractions can have initial boiling points (or alternatively T5 boiling points) of at least about 36° C. and final boiling points (or alternatively T95 boiling points) of about 193° C. or less. It is noted that 36° C. roughly corresponds to a boiling point for the various isomers of a $C_5$ alkane. A fuels boiling range fraction can correspond to a distillate fuel boiling range fraction, a naphtha boiling range fraction, or a fraction that includes both distillate fuel boiling range and naphtha boiling range components. Light ends are defined as products with boiling points below about 36° C. which include various $C_1$-$C_4$ compounds. When determining a boiling point or a boiling range for a feed or product fraction, an appropriate ASTM test method can be used, such as the procedures described in ASTM D2887, D2892, and/or D86. Preferably, ASTM D2887 should be used unless a sample is not appropriate for characterization based on ASTM D2887. For example, for samples that will not completely elute from a chromatographic column, ASTM D7169 can be used.

Feedstocks

In various aspects, at least a portion of a feedstock for processing as described herein can correspond to a vacuum resid fraction or another type 950° F.+(510° C.+) or 1000° F.+(538° C.+) fraction. Another example of a method for forming a 950° F.+(510° C.+) or 1000° F.+(538° C.+) fraction is to perform a high temperature flash separation. The 950° F.+(510° C.+) or 1000° F.+(538° C.+) fraction formed from the high temperature flash can be processed in a manner similar to a vacuum resid.

A vacuum resid fraction or a 950° F.+(510° C.+) fraction formed by another process (such as a flash fractionation bottoms or a bitumen fraction) can be deasphalted at low severity to form a deasphalted oil. In some embodiments, the feedstock can also include a portion of a conventional feed for lubricant base stock production, such as a vacuum gas oil.

A vacuum resid (or other 510° C.+) fraction can correspond to a fraction with a T5 distillation point (ASTM D2892, or ASTM D7169 if the fraction will not completely elute from a chromatographic system) of at least about 900° F. (482° C.), or at least 950° F. (510° C.), or at least 1000° F. (538° C.). Alternatively, a vacuum resid fraction can be characterized based on a T10 distillation point (ASTM D2892/D7169) of at least about 900° F. (482° C.), or at least 950° F. (510° C.), or at least 1000° F. (538° C.).

Resid (or other 510° C.+) fractions can be high in metals. For example, a resid fraction can be high in total nickel, vanadium and iron contents. In an aspect, a resid fraction can contain at least 0.00005 grams of Ni/V/Fe (50 wppm) or at least 0.0002 grams of Ni/V/Fe (200 wppm) per gram of resid, on a total elemental basis of nickel, vanadium and iron. In other aspects, the heavy oil can contain at least 500 wppm of nickel, vanadium, and iron, such as up to 1000 wppm or more.

Contaminants such as nitrogen and sulfur are typically found in resid (or other 510° C.+) fractions, often in organically-bound form. Nitrogen content can range from about 50 wppm to about 10,000 wppm elemental nitrogen or more, based on total weight of the resid fraction. Sulfur content can range from 500 wppm to 100,000 wppm elemental sulfur or more, based on total weight of the resid fraction, or from 1000 wppm to 50,000 wppm, or from 1000 wppm to 30,000 wppm.

Still another method for characterizing a resid (or other 510° C.+) fraction is based on the Conradson carbon residue (CCR) of the feedstock. The Conradson carbon residue of a resid fraction can be at least about 5 wt %, such as at least about 10 wt % or at least about 20 wt %. Additionally or alternatively, the Conradson carbon residue of a resid fraction can be about 50 wt % or less, such as about 40 wt % or less or about 30 wt % or less.

In some aspects, a vacuum gas oil fraction can be co-processed with a deasphalted oil. The vacuum gas oil can be combined with the deasphalted oil in various amounts ranging from 20 parts (by weight) deasphalted oil to 1 part vacuum gas oil (i.e., 20:1) to 1 part deasphalted oil to 1 part vacuum gas oil. In some aspects, the ratio of deasphalted oil to vacuum gas oil can be at least 1:1 by weight, or at least 1.5:1, or at least 2:1. Typical (vacuum) gas oil fractions can include, for example, fractions with a T5 distillation point to T95 distillation point of 650° F.-1050° F. (343° C.-566° C.), or 650° F.-1000° F. (343° C.-538° C.), or 650° F.-950° F. (343° C.-510° C.), or 650° F.-900° F. (343° C.-482° C.), or approximately 700° F.-1050° F. (370° C.-566° C.), or approximately 700° F.-1000° F. (370° C.-538° C.), or approximately 700° F.-950° F. (370° C.-510° C.), or approximately 700° F.-900° F. (370° C.-482° C.), or 750° F.-1050° F. (399° C.-566° C.), or 750° F.-1000° F. (399° C.-538° C.), or 750° F.-950° F. (399° C.-510° C.), or 750° F.-900° F. (399° C.-482° C.). For example, a suitable vacuum gas oil fraction can have a T5 distillation point of at least 343° C. and a T95 distillation point of 566° C. or less; or a T10 distillation point of at least 343° C. and a T90 distillation point of 566° C. or less; or a T5 distillation point of at least 370° C. and a T95 distillation point of 566° C. or less; or a T5 distillation point of at least 343° C. and a T95 distillation point of 538° C. or less.

Solvent Deasphalting

Solvent deasphalting is a solvent extraction process. In some aspects, suitable solvents for methods as described herein include alkanes or other hydrocarbons (such as alkenes) containing 4 to 7 carbons per molecule. Examples of suitable solvents include n-butane, isobutane, n-pentane, $C_{4+}$ alkanes, $C_{5+}$ alkanes, $C_{4+}$ hydrocarbons, and $C_{5+}$ hydrocarbons. In other aspects, suitable solvents can include $C_3$ hydrocarbons, such as propane. In such other aspects, examples of suitable solvents include propane, n-butane, isobutane, n-pentane, $C_{3+}$ alkanes, $C_{4+}$ alkanes, $C_{5+}$ alkanes, $C_{3+}$ hydrocarbons, $C_{4+}$ hydrocarbons, and $C_{5+}$ hydrocarbons.

In this discussion, a solvent comprising $C_n$ (hydrocarbons) is defined as a solvent composed of at least 80 wt % of alkanes (hydrocarbons) having n carbon atoms, or at least 85 wt %, or at least 90 wt %, or at least 95 wt %, or at least 98 wt %. Similarly, a solvent comprising $C_{n+}$ (hydrocarbons) is defined as a solvent composed of at least 80 wt % of alkanes (hydrocarbons) having n or more carbon atoms, or at least 85 wt %, or at least 90 wt %, or at least 95 wt %, or at least 98 wt %.

In this discussion, a solvent comprising $C_n$ alkanes (hydrocarbons) is defined to include the situation where the solvent corresponds to a single alkane (hydrocarbon) containing n carbon atoms (for example, n=3, 4, 5, 6, 7) as well as the situations where the solvent is composed of a mixture of alkanes (hydrocarbons) containing n carbon atoms. Similarly, a solvent comprising $C_{n+}$ alkanes (hydrocarbons) is defined to include the situation where the solvent corresponds to a single alkane (hydrocarbon) containing n or more carbon atoms (for example, n=3, 4, 5, 6, 7) as well as the situations where the solvent corresponds to a mixture of alkanes (hydrocarbons) containing n or more carbon atoms. Thus, a solvent comprising $C_{4+}$ alkanes can correspond to a solvent including n-butane; a solvent include n-butane and isobutane; a solvent corresponding to a mixture of one or more butane isomers and one or more pentane isomers; or any other convenient combination of alkanes containing 4 or more carbon atoms. Similarly, a solvent comprising $C_{5+}$ alkanes (hydrocarbons) is defined to include a solvent corresponding to a single alkane (hydrocarbon) or a solvent corresponding to a mixture of alkanes (hydrocarbons) that contain 5 or more carbon atoms. Alternatively, other types of solvents may also be suitable, such as supercritical fluids. In various aspects, the solvent for solvent deasphalting can consist essentially of hydrocarbons, so that at least 98 wt % or at least 99 wt % of the solvent corresponds to compounds containing only carbon and hydrogen. In aspects where the deasphalting solvent corresponds to a $C_{4+}$ deasphalting solvent, the $C_{4+}$ deasphalting solvent can include less than 15 wt % propane and/or other $C_3$ hydrocarbons, or less than 10 wt %, or less than 5 wt %, or the $C_{4+}$ deasphalting solvent can be substantially free of propane and/or other $C_3$ hydrocarbons (less than 1 wt %). In aspects where the deasphalting solvent corresponds to a $C_{5+}$ deasphalting solvent, the $C_{5+}$ deasphalting solvent can include less than 15 wt % propane, butane and/or other $C_3$-$C_4$ hydrocarbons, or less than 10 wt %, or less than 5 wt %, or the $C_{5+}$ deasphalting solvent can be substantially free of propane, butane, and/or other $C_3$-$C_4$ hydrocarbons (less than 1 wt %). In aspects where the deasphalting solvent corresponds to a $C_{3+}$ deasphalting solvent, the $C_{3+}$ deasphalting solvent can include less than 10 wt % ethane and/or other $C_2$ hydrocarbons, or less than 5 wt %, or the $C_{3+}$ deasphalting solvent can be substantially free of ethane and/or other $C_2$ hydrocarbons (less than 1 wt %).

Deasphalting of heavy hydrocarbons, such as vacuum resids, is known in the art and practiced commercially. A deasphalting process typically corresponds to contacting a heavy hydrocarbon with an alkane solvent (propane, butane, pentane, hexane, heptane etc. and their isomers), either in pure form or as mixtures, to produce two types of product streams. One type of product stream can be a deasphalted oil extracted by the alkane, which is further separated to produce deasphalted oil stream. A second type of product stream can be a residual portion of the feed not soluble in the solvent, often referred to as rock or asphaltene fraction. The deasphalted oil fraction can be further processed into make fuels or lubricants. The rock fraction can be further used as blend component to produce asphalt, fuel oil, and/or other products. The rock fraction can also be used as feed to gasification processes such as partial oxidation, fluid bed combustion or coking processes. The rock can be delivered to these processes as a liquid (with or without additional components) or solid (either as pellets or lumps).

During solvent deasphalting, a resid boiling range feed (optionally also including a portion of a vacuum gas oil feed) can be mixed with a solvent. Portions of the feed that are soluble in the solvent are then extracted, leaving behind a residue with little or no solubility in the solvent. The portion of the deasphalted feedstock that is extracted with the solvent is often referred to as deasphalted oil. Typical solvent deasphalting conditions include mixing a feedstock fraction with a solvent in a weight ratio of from about 1:2 to about 1:10, such as about 1:8 or less. Typical solvent deasphalting temperatures range from 40° C. to 200° C., or 40° C. to 150° C., depending on the nature of the feed and the solvent. The pressure during solvent deasphalting can be from about 50 psig (345 kPag) to about 500 psig (3447 kPag).

It is noted that the above solvent deasphalting conditions represent a general range, and the conditions will vary depending on the feed. For example, under typical deasphalting conditions, increasing the temperature can tend to reduce the yield while increasing the quality of the resulting deasphalted oil. Under typical deasphalting conditions, increasing the molecular weight of the solvent can tend to increase the yield while reducing the quality of the resulting deasphalted oil, as additional compounds within a resid fraction may be soluble in a solvent composed of higher molecular weight hydrocarbons. Under typical deasphalting conditions, increasing the amount of solvent can tend to increase the yield of the resulting deasphalted oil. As understood by those of skill in the art, the conditions for a particular feed can be selected based on the resulting yield of deasphalted oil from solvent deasphalting. In aspects where a $C_3$ deasphalting solvent is used, the yield from solvent deasphalting can be 40 wt % or less. In some aspects, $C_4$ deasphalting can be performed with a yield of deasphalted oil of 50 wt % or less, or 40 wt % or less. In various aspects, the yield of deasphalted oil from solvent deasphalting with a $C_{4+}$ solvent can be at least 50 wt % relative to the weight of the feed to deasphalting, or at least 55 wt %, or at least 60 wt % or at least 65 wt %, or at least 70 wt %. In aspects where the feed to deasphalting includes a vacuum gas oil portion, the yield from solvent deasphalting can be characterized based on a yield by weight of a 950° F.+(510° C.) portion of the deasphalted oil relative to the weight of a 510° C.+ portion of the feed. In such aspects where a $C_{4+}$ solvent is used, the yield of 510° C.+ deasphalted oil from solvent deasphalting can be at least 40 wt % relative to the weight of the 510° C.+ portion of the feed to deasphalting, or at least 50 wt %, or at least 55 wt %, or at least 60 wt % or at least 65 wt %, or at least 70 wt %. In such aspects where a $C_{4+}$ solvent is used, the yield of 510° C.+ deasphalted oil from solvent deasphalting can be 50 wt % or less relative to the weight of the 510° C.+ portion of the feed to deasphalting, or 40 wt % or less, or 35 wt % or less.

Hydrotreating and Hydrocracking

After deasphalting, the deasphalted oil (and any additional fractions combined with the deasphalted oil) can undergo further processing to form lubricant base stocks. This can include hydrotreatment and/or hydrocracking to remove heteroatoms to desired levels, reduce Conradson Carbon content, and/or provide viscosity index (VI) uplift. Depending on the aspect, a deasphalted oil can be hydroprocessed by hydrotreating, hydrocracking, or hydrotreating and hydrocracking.

The deasphalted oil can be hydrotreated and/or hydrocracked with little or no solvent extraction being performed prior to and/or after the deasphalting. As a result, the deasphalted oil feed for hydrotreatment and/or hydrocracking can have a substantial aromatics content. In various aspects, the aromatics content of the deasphalted oil feed can be at least 50 wt %, or at least 55 wt %, or at least 60 wt %, or at least 65 wt %, or at least 70 wt %, or at least 75 wt %, such as up to 90 wt % or more. Additionally or alternatively, the saturates content of the deasphalted oil feed can be 50 wt % or less, or 45 wt % or less, or 40 wt % or less, or 35 wt % or less, or 30 wt % or less, or 25 wt % or less, such as down to 10 wt % or less. In this discussion and the claims below, the aromatics content and/or the saturates content of a fraction can be determined based on ASTM D7419.

The reaction conditions during demetallization and/or hydrotreatment and/or hydrocracking of the deasphalted oil (and optional vacuum gas oil co-feed) can be selected to generate a desired level of conversion of a feed. Any convenient type of reactor, such as fixed bed (for example trickle bed) reactors can be used. Conversion of the feed can be defined in terms of conversion of molecules that boil above a temperature threshold to molecules below that threshold. The conversion temperature can be any convenient temperature, such as approximately 700° F. (370° C.) or 1050° F. (566° C.). The amount of conversion can correspond to the total conversion of molecules within the combined hydrotreatment and hydrocracking stages for the deasphalted oil. Suitable amounts of conversion of molecules boiling above 1050° F. (566° C.) to molecules boiling below 566° C. include 30 wt % to 90 wt % conversion relative to 566° C., or 30 wt % to 80 wt %, or 30 wt % to 70 wt %, or 40 wt % to 90 wt %, or 40 wt % to 80 wt %, or 40 wt % to 70 wt %, or 50 wt % to 90 wt %, or 50 wt % to 80 wt %, or 50 wt % to 70 wt %. In particular, the amount of conversion relative to 566° C. can be 30 wt % to 90 wt %, or 30 wt % to 70 wt %, or 50 wt % to 90 wt %. Additionally or alternatively, suitable amounts of conversion of molecules boiling above approximately 700° F. (370° C.) to molecules boiling below 370° C. include 10 wt % to 70 wt % conversion relative to 370° C., or 10 wt % to 60 wt %, or 10 wt % to 50 wt %, or 20 wt % to 70 wt %, or 20 wt % to 60 wt %, or 20 wt % to 50 wt %, or 30 wt % to 70 wt %, or 30 wt % to 60 wt %, or 30 wt % to 50 wt %. In particular, the amount of conversion relative to 370° C. can be 10 wt % to 70 wt %, or 20 wt % to 50 wt %, or 30 wt % to 60 wt %.

The hydroprocessed deasphalted oil can also be characterized based on the product quality. After hydroprocessing (hydrotreating and/or hydrocracking), the hydroprocessed deasphalted oil can have a sulfur content of 200 wppm or less, or 100 wppm or less, or 50 wppm or less (such as down to ~0 wppm). Additionally or alternatively, the hydroprocessed deasphalted oil can have a nitrogen content of 200 wppm or less, or 100 wppm or less, or 50 wppm or less (such as down to about 0 wppm). Additionally or alternatively, the hydroprocessed deasphalted oil can have a Conradson Carbon residue content of 1.5 wt % or less, or 1.0 wt % or less, or 0.7 wt % or less, or 0.1 wt % or less, or 0.02 wt % or less (such as down to approximately 0 wt %). Conradson Carbon residue content can be determined according to ASTM D4530.

In various aspects, a feed can initially be exposed to a demetallization catalyst prior to exposing the feed to a hydrotreating catalyst. Deasphalted oils can have metals concentrations (Ni+V+Fe) on the order of 10-100 wppm. Exposing a conventional hydrotreating catalyst to a feed having a metals content of 10 wppm or more can lead to catalyst deactivation at a faster rate than may desirable in a commercial setting. Exposing a metal containing feed to a demetallization catalyst prior to the hydrotreating catalyst can allow at least a portion of the metals to be removed by the demetallization catalyst, which can reduce or minimize the deactivation of the hydrotreating catalyst and/or other subsequent catalysts in the process flow. Commercially available demetallization catalysts can be suitable, such as large pore amorphous oxide catalysts that may include Group VI and/or Group VIII non-noble metals to provide some hydrogenation activity.

In various aspects, the deasphalted oil can be exposed to a hydrotreating catalyst under effective hydrotreating conditions. The catalysts used can include conventional hydroprocessing catalysts, such as those comprising at least one Group VIII non-noble metal (Columns 8-10 of IUPAC periodic table), such as Fe, Co, and/or Ni; and at least one Group VI metal (Column 6 of IUPAC periodic table), such as Mo and/or W. Such hydroprocessing catalysts may include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 m$^2$/g, or 150 to 250 m$^2$/g; and a pore volume of from 0.25 to 1.0 cm$^3$/g, or 0.35 to 0.8 cm$^3$/g. More generally, any convenient size, shape, and/or pore size distribution for a catalyst suitable for hydrotreatment of a distillate (including lubricant base stock) boiling range feed in a conventional manner may be used. In some embodiments, the support or carrier material is an amorphous support, such as a refractory oxide. In some embodiments, the support or carrier material can be free or substantially free of the presence of molecular sieve, where substantially free of molecular sieve is defined as having a content of molecular sieve of less than about 0.01 wt %.

The at least one Group VIII non-noble metal, in oxide form, can typically be present in an amount ranging from about 2 wt % to about 40 wt %, such as from about 4 wt % to about 15 wt %. The at least one Group VI metal, in oxide form, can typically be present in an amount ranging from about 2 wt % to about 70 wt %, for example for supported catalysts from about 6 wt % to about 40 wt % or from about 10 wt % to about 30 wt %. These weight percentages are based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to herein, can be either pure hydrogen or a hydrogen-containing gas, which is a gas stream containing hydrogen in an amount that is sufficient for the intended reaction(s), and may include one or more other gasses (e.g., nitrogen and light hydrocarbons such as methane). The treat gas stream introduced into a reaction stage may contain at least about 50 vol. %, such as at least about 75 vol. % hydrogen. In some embodiments, the hydrogen treat gas can be substantially free (less than 1 vol. %) of impurities such as $H_2S$ and $NH_3$ and/or such impurities can be substantially removed from a treat gas prior to use.

Hydrogen can be supplied at a rate of from about 100 SCF/B (standard cubic feet of hydrogen per barrel of feed) (17 Nm$^3$/m$^3$) to about 10000 SCF/B (1700 Nm$^3$/m$^3$). In some embodiments, the hydrogen is provided in a range of from about 200 SCF/B (34 Nm$^3$/m$^3$) to about 2500 SCF/B (420 Nm$^3$/m$^3$). Hydrogen can be supplied co-currently with the input feed to the hydrotreatment reactor and/or reaction zone or separately via a separate gas conduit to the hydrotreatment zone.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.8 MPag); liquid hourly space velocities (LHSV) of 0.1 hr$^{-1}$ to 10 hr$^{-1}$; and hydrogen treat rates of 200 scf/B (35.6 m$^3$/m$^3$) to 10,000 scf/B (1781 m$^3$/m$^3$), or 500 (89 m$^3$/m$^3$) to 10.000 scf/B (1781 m$^3$/m$^3$).

In various aspects, the deasphalted oil can be exposed to a hydrocracking catalyst under effective hydrocracking conditions. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophosphates. One example of suitable zeolite is USY, such as a USY zeolite with cell size of 24.30 Angstroms or less. Additionally or alternatively, the catalyst can be a low acidity molecular sieve, such as a USY zeolite with a Si to Al ratio of at least about 20, and may be at least about 40 or 50. ZSM-48, such as ZSM-48 with a SiO$_2$ to Al$_2$O$_3$ ratio of about 110 or less, such as about 90 or less, is another example of a potentially suitable hydrocracking catalyst. Still another option is to use a combination of USY and ZSM-48. Still other options include using one or more of zeolite Beta, ZSM-5, ZSM-35, or ZSM-23, either alone or in combination with a USY catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternatively, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common.

When only one hydrogenation metal is present on a hydrocracking catalyst, the amount of that hydrogenation metal can be at least about 0.1 wt % based on the total weight of the catalyst, for example at least about 0.5 wt % or at least about 0.6 wt %. Additionally or alternatively when only one hydrogenation metal is present, the amount of that hydrogenation metal can be about 5.0 wt % or less based on the total weight of the catalyst, for example about 3.5 wt % or less, about 2.5 wt % or less, about 1.5 wt % or less, about 1.0 wt % or less, about 0.9 wt % or less, about 0.75 wt % or less, or about 0.6 wt % or less. Further additionally or alternatively when more than one hydrogenation metal is present, the collective amount of hydrogenation metals can be at least about 0.1 wt % based on the total weight of the catalyst, for example at least about 0.25 wt %, at least about 0.5 wt %, at least about 0.6 wt %, at least about 0.75 wt %, or at least about 1 wt %. Still further additionally or alternatively when more than one hydrogenation metal is present, the collective amount of hydrogenation metals can be about 35 wt % or less based on the total weight of the catalyst, for example about 30 wt % or less, about 25 wt % or less, about 20 wt % or less, about 15 wt % or less, about 10 wt % or less, or about 5 wt % or less. In embodiments wherein the supported metal comprises a noble metal, the amount of noble metal(s) is typically less than about 2 wt %, for example less than about 1 wt % about 0.9 wt % or less, about 0.75 wt % or less, or about 0.6 wt % or less. It is noted that hydrocracking under sour conditions is typically performed using a base metal (or metals) as the hydrogenation metal.

In various aspects, the conditions selected for hydrocracking for lubricant base stock production can depend on the desired level of conversion, the level of contaminants in the input feed to the hydrocracking stage, and potentially other factors. For example, hydrocracking conditions in a single stage, or in the first stage and/or the second stage of a multi-stage system, can be selected to achieve a desired level of conversion in the reaction system. Hydrocracking conditions can be referred to as sour conditions or sweet conditions, depending on the level of sulfur and/or nitrogen present within a feed. For example, a feed with 100 wppm or less of sulfur and 50 wppm or less of nitrogen, such as less than 25 wppm sulfur and/or less than 10 wppm of nitrogen, represent a feed for hydrocracking under sweet conditions. In various aspects, hydrocracking can be performed on a thermally cracked resid, such as a deasphalted oil derived from a thermally cracked resid. In some aspects, such as aspects where an optional hydrotreating step is used prior to hydrocracking, the thermally cracked resid may correspond to a sweet feed. In other aspects, the thermally cracked resid may represent a feed for hydrocracking under sour conditions.

A hydrocracking process under sour conditions can be carried out at temperatures of about 550° F. (288° C.) to about 840° F. (449° C.), hydrogen partial pressures of from about 1500 psig to about 5000 psig (10.3 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 m$^3$/m$^3$ to about 1068 m$^3$/m$^3$ (1200 SCF/B to 6000 SCF/B). The LHSV can be from about 0.25 h$^{-1}$ to about 50 h$^{-1}$, or from about 0.5 h$^{-1}$ to about 20 h$^{-1}$, such as from about 1.0 h$^{-1}$ to about 4.0 h$^{-1}$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as about 350° F. (177° C.) or about 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least about 350° F. (177° C.) or at least about 400° F. (204° C.) to having an upper end cut point temperature of about 700° F. (371° C.) or less or 650° F. (343° C.) or less. In some embodiments, the distillate fuel range can be extended to include additional kerosene, such as by selecting a lower end cut point temperature of at least about 300° F. (149° C.).

In aspects where the inter-stage separator is also used to produce a distillate fuel fraction, the portion boiling below the distillate fuel fraction includes, naphtha boiling range molecules, light ends, and contaminants such as H$_2$S. These different products can be separated from each other in any convenient manner. Similarly, one or more distillate fuel fractions can be formed, if desired, from the distillate boiling range fraction. The portion boiling above the distillate fuel range represents the potential lubricant base stocks. In such aspects, the portion boiling above the distillate fuel range is subjected to further hydroprocessing in a second hydroprocessing stage.

A hydrocracking process under sweet conditions can be performed under conditions similar to those used for a sour hydrocracking process, or the conditions can be different. In an embodiment, the conditions in a sweet hydrocracking stage can have less severe conditions than a hydrocracking process in a sour stage. Suitable hydrocracking conditions for a non-sour stage can include, but are not limited to, conditions similar to a first or sour stage. Suitable hydrocracking conditions can include temperatures of about 500° F. (260° C.) to about 840° F. (449° C.), hydrogen partial pressures of from about 1500 psig to about 5000 psig (10.3 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 m$^3$/m$^3$ to about 1068 m$^3$/m$^3$ (1200 SCF/B to 6000 SCF/B). The LHSV can be from about 0.25 h$^{-1}$ to about 50 h$^{-1}$, or from about 0.5 h$^{-1}$ to about 20 h$^{-1}$, such as from about 1.0 h$^{-1}$ to about 4.0 h$^{-1}$.

In still another aspect, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

In yet another aspect, a hydroprocessing reaction system may include more than one hydrocracking stage. If multiple hydrocracking stages are present, at least one hydrocracking stage can have effective hydrocracking conditions as described above, including a hydrogen partial pressure of at least about 1500 psig (10.3 MPag). In such an aspect, other hydrocracking processes can be performed under conditions that may include lower hydrogen partial pressures. Suitable hydrocracking conditions for an additional hydrocracking stage can include, but are not limited to, temperatures of about 500° F. (260° C.) to about 840° F. (449° C.), hydrogen partial pressures of from about 250 psig to about 5000 psig (1.8 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions for an additional hydrocracking stage can include temperatures in the range of about 600° F. (343° C.) to about 815° F. (435° C.), hydrogen partial pressures of from about 500 psig to about 3000 psig (3.5 MPag-20.9 MPag), and hydrogen treat gas rates of from about 213 m$^3$/m$^3$ to about 1068 m$^3$/m$^3$ (1200 SCF/B to 6000 SCF/B). The LHSV can be from about 0.25 h$^{-1}$ to about 50 h$^{-1}$, or from about 0.5 h$^{-1}$ to about 20 h$^{-1}$, such as from about 1.0 h$^{-1}$ to about 4.0 h$^{-1}$.

Additional Hydroprocessing—Catalytic Dewaxing, Hydrofinishing, and Optional Hydrocracking In some alternative aspects, at least a lubricant boiling range portion of the hydroprocessed deasphalted oil can be exposed to further hydroprocessing (including catalytic dewaxing) to form either Group I and/or Group II base stocks, including Group I and/or Group II bright stock. In some aspects, a first lubricant boiling range portion of the hydroprocessed deasphalted oil can be solvent dewaxed as described above while a second lubricant boiling range portion can be exposed to further hydroprocessing. In other aspects, only solvent dewaxing or only further hydroprocessing can be used to treat a lubricant boiling range portion of the hydroprocessed deasphalted oil.

In some embodiments, the further hydroprocessing of the lubricant boiling range portion of the hydroprocessed deasphalted oil can also include exposure to hydrocracking conditions before and/or after the exposure to the catalytic dewaxing conditions. At this point in the process, the hydrocracking can be considered "sweet" hydrocracking, as the hydroprocessed deasphalted oil can have a sulfur content of 200 wppm or less.

Suitable hydrocracking conditions can include exposing the feed to a hydrocracking catalyst as previously described above. In some embodiments, it can be preferable to use a USY zeolite with a silica to alumina ratio of at least 30 and a unit cell size of less than 24.32 Angstroms as the zeolite for the hydrocracking catalyst, in order to improve the VI uplift from hydrocracking and/or to improve the ratio of distillate fuel yield to naphtha fuel yield in the fuels boiling range product.

Suitable hydrocracking conditions can also include temperatures of about 500° F. (260° C.) to about 840° F. (449° C.), hydrogen partial pressures of from about 1500 psig to about 5000 psig (10.3 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of about 600° F. (343° C.) to about 815° F. (435° C.), hydrogen partial pressures of from about 1500 psig to about 3000 psig (10.3 MPag-20.9 MPag), and hydrogen treat gas rates of from about 213 m$^3$/m$^3$ to about 1068 m$^3$/m$^3$ (1200 SCF/B to 6000 SCF/B). The LHSV can be from about 0.25 h$^{-1}$ to about 50 h$^{-1}$, or from about 0.5 h$^{-1}$ to about 20 h$^{-1}$, such as from about 1.0 h$^{-1}$ to about 4.0 h$^{-1}$.

For catalytic dewaxing, suitable dewaxing catalysts can include molecular sieves such as crystalline aluminosilicates (zeolites). In an embodiment, the molecular sieve can comprise, consist essentially of, or be ZSM-22, ZSM-23, ZSM-48. In some embodiments, molecular sieves that are selective for dewaxing by isomerization as opposed to cracking can be used, such as ZSM-48, ZSM-23, or a combination thereof. Additionally or alternatively, the molecular sieve can comprise, consist essentially of, or be a 10-member ring 1-D molecular sieve, such as EU-2, EU-11, ZBM-30, ZSM-48, or ZSM-23. In some embodiments, ZSM-48 is used. Note that a zeolite having the ZSM-23 structure with a silica to alumina ratio of from about 20:1 to about 40:1 can sometimes be referred to as SSZ-32. In some embodiments, the dewaxing catalyst can include a binder for the molecular sieve, such as alumina, titania, silica, silica-alumina, zirconia, or a combination thereof, for example alumina and/or titania or silica and/or zirconia and/or titania.

In some embodiments, the dewaxing catalysts used in processes according to the present disclosure are catalysts with a low ratio of silica to alumina. For example, for ZSM-48, the ratio of silica to alumina in the zeolite can be about 100:1 or less, such as about 90:1 or less, or about 75:1 or less, or about 70:1 or less. Additionally or alternatively, the ratio of silica to alumina in the ZSM-48 can be at least about 50:1, such as at least about 60:1, or at least about 65:1.

In various embodiments, the catalysts according to the present disclosure further include a metal hydrogenation component. The metal hydrogenation component is typically a Group VI and/or a Group VIII metal. In some embodiments, the metal hydrogenation component can be a combination of a non-noble Group VIII metal with a Group VI metal. Suitable combinations can include Ni, Co, or Fe with Mo or W, such as Ni with Mo or W.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least 0.1 wt % based on catalyst, or at least 0.5 wt %, or at least 1.0 wt %, or at least 2.5 wt %, or at least 5.0 wt %, based on catalyst. The amount of metal in the catalyst can be 20 wt % or less based on catalyst, or 10 wt % or less, or 5 wt % or less, or 2.5 wt % or less, or 1 wt % or less. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The dewaxing catalysts useful in processes according to the present disclosure can also include a binder. In some embodiments, the dewaxing catalysts used in process according to the present disclosure are formulated using a low surface area binder, a low surface area binder represents a binder with a surface area of 100 $m^2/g$ or less, or 80 $m^2/g$ or less, or 70 $m^2/g$ or less. Additionally or alternatively, the binder can have a surface area of at least about 25 $m^2/g$. The amount of zeolite in a catalyst formulated using a binder can be from about 30 wt % zeolite to 90 wt % zeolite relative to the combined weight of binder and zeolite. In some embodiments, the amount of zeolite is at least about 50 wt % of the combined weight of zeolite and binder, such as at least about 60 wt % or from about 65 wt % to about 80 wt %.

Without being bound by any particular theory, it is believed that use of a low surface area binder reduces the amount of binder surface area available for the hydrogenation metals supported on the catalyst. This leads to an increase in the amount of hydrogenation metals that are supported within the pores of the molecular sieve in the catalyst.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst may range from 0.1 to 3.33 wt %, or 0.1 to 2.7 wt %, or 0.2 to 2 wt %, or 0.3 to 1 wt %.

Effective conditions for catalytic dewaxing of a feedstock in the presence of a dewaxing catalyst can include a temperature of from 280° C. to 450° C., such as 343° C. to 435° C., a hydrogen partial pressure of from 3.5 MPag to 34.6 MPag (500 psig to 5000 psig), such as 4.8 MPag to 20.8 MPag, and a hydrogen circulation rate of from 178 $m^3/m^3$ (1000 SCF/B) to 1781 $m^3/m^3$ (10,000 scf/B), such as 213 $m^3/m^3$ (1200 SCF/B) to 1068 $m^3/m^3$ (6000 SCF/B). The LHSV can be from about 0.2 $h^{-1}$ to about 10 $h^{-1}$, such as from about 0.5 $h^{-1}$ to about 5 $h^{-1}$ and/or from about 1 $h^{-1}$ to about 4 $h^{-1}$.

Before and/or after catalytic dewaxing, the hydroprocessed deasphalted oil (i.e., at least a lubricant boiling range portion thereof) can be exposed to an aromatic saturation catalyst, which can alternatively be referred to as a hydrofinishing catalyst. Exposure to the aromatic saturation catalyst can occur either before or after fractionation. If aromatic saturation occurs after fractionation, the aromatic saturation can be performed on one or more portions of the fractionated product. Alternatively, the entire effluent from the last hydrocracking or dewaxing process can be hydrofinished and/or undergo aromatic saturation.

Hydrofinishing and/or aromatic saturation catalysts can include catalysts containing Group VI metals, Group VIII metals, and mixtures thereof. In some embodiments, metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is about 30 wt. % or greater based on catalyst. For supported hydrotreating catalysts, suitable metal oxide supports include low acidic oxides such as silica, alumina, silica-aluminas or titania, such as alumina. Exemplary hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as about 20 weight percent for non-noble metals. In some embodiments, a hydrofinishing catalyst can include a crystalline material belonging to the M41S class or family of catalysts. The M41S family of catalysts are mesoporous materials having high silica content. Examples include MCM-41, MCM-48 and MCM-50. An exemplary member of this class is MCM-41.

Hydrofinishing conditions can include temperatures from about 125° C. to about 425° C., such as about 180° C. to about 280° C., a hydrogen partial pressure from about 500 psig (3.4 MPa) to about 3000 psig (20.7 MPa), such as about 1500 psig (10.3 MPa) to about 2500 psig (17.2 MPa), and liquid hourly space velocity from about 0.1 $hr^{-1}$ to about 5 $hr^{-1}$ LHSV, such as about 0.5 $hr^{-1}$ to about 1.5 $hr^{-1}$. Additionally, a hydrogen treat gas rate of from 35.6 $m^3/m^3$ to 1781 $m^3/m^3$ (200 SCF/B to 10,000 SCF/B) can be used.

Solvent Processing of Catalytically Dewaxed Effluent or Input Flow to Catalytic Dewaxing For deasphalted oils derived from propane deasphalting, the further hydroprocessing (including catalytic dewaxing) can be sufficient to form lubricant base stocks with low haze formation and unexpected compositional properties. For deasphalted oils derived from $C_{4+}$ deasphalting, after the further hydroprocessing (including catalytic dewaxing), the resulting catalytically dewaxed effluent can be solvent processed to form one or more lubricant base stock products with a reduced or eliminated tendency to form haze. The type of solvent processing can be dependent on the nature of the initial hydroprocessing (hydrotreatment and/or hydrocracking) and the nature of the further hydroprocessing (including dewaxing).

In aspects where the initial hydroprocessing is less severe, corresponding to 10 wt % to 40 wt % conversion relative to approximately 700° F. (370° C.), the subsequent solvent processing can correspond to solvent dewaxing. The solvent dewaxing can be performed in a manner similar to the solvent dewaxing described above. However, this solvent dewaxing can be used to produce a Group II lubricant base stock. In some aspects, when the initial hydroprocessing corresponds to 10 wt % to 40 wt % conversion relative to 370° C., the catalytic dewaxing during further hydroprocessing can also be performed at lower severity, so that at least 6 wt % wax remains in the catalytically dewaxed effluent, or at least 8 wt %, or at least 10 wt %, or at least 12 wt %, or at least 15 wt %, such as up to 20 wt % The solvent dewaxing can then be used to reduce the wax content in the catalytically dewaxed effluent by 2 wt % to 10 wt %. This can produce a solvent dewaxed oil product having a wax content of 0.1 wt % to 12 wt %, or 0.1 wt % to 10 wt %, or 0.1 wt % to 8 wt %, or 0.1 wt % to 6 wt %, or 1 wt % to 12 wt %, or 1 wt % to 10 wt %, or 1 wt % to 8 wt %, or 4 wt % to 12 wt %, or 4 wt % to 10 wt %, or 4 wt % to 8 wt %, or 6 wt % to 12 wt %, or 6 wt % to 10 wt %. In particular, the solvent dewaxed oil can have a wax content of 0.1 wt % to 12 wt %, or 0.1 wt % to 6 wt %, or 1 wt % to 10 wt %, or 4 wt % to 12 wt %.

In various aspects, the subsequent solvent processing can correspond to solvent extraction. Solvent extraction can be used to reduce the aromatics content and/or the amount of polar molecules. The solvent extraction process selectively dissolves aromatic components to form an aromatics-rich extract phase while leaving the more paraffinic components in an aromatics-poor raffinate phase. Naphthenes are distributed between the extract and raffinate phases. Typical solvents for solvent extraction include phenol, furfural and N-methyl pyrrolidone. By controlling the solvent to oil ratio, extraction temperature and method of contacting distillate to be extracted with solvent, one can control the degree of separation between the extract and raffinate phases. Any convenient type of liquid-liquid extractor can be used, such as a counter-current liquid-liquid extractor. Depending on the initial concentration of aromatics in the deasphalted oil, the raffinate phase can have an aromatics content of 5 wt % to 25 wt % and/or a saturates content of 75 wt % to 95 wt % (or more). For typical feeds, the aromatics contents can be at least 10 wt % and/or the saturates content can be 90 wt % or less. In various aspects, the raffinate yield from solvent extraction can be at least 40 wt %, or at least 50 wt %, or at least 60 wt %, or at least 70 wt %.

In some embodiments, the raffinate from the solvent extraction can be under-extracted. In such aspects, the extraction is carried out under conditions such that the raffinate yield is maximized while still removing most of the lowest quality molecules from the feed. Raffinate yield may be maximized by controlling extraction conditions, for example, by lowering the solvent to oil treat ratio and/or decreasing the extraction temperature.

The solvent processed oil (solvent dewaxed or solvent extracted) can have a pour point of −6° C. or less, or −10° C. or less, or −15° C. or less, or −20° C. or less, depending on the nature of the target lubricant base stock product. Additionally or alternatively, the solvent processed oil (solvent dewaxed or solvent extracted) can have a cloud point of −2° C. or less, or −5° C. or less, or −10° C. or less, depending on the nature of the target lubricant base stock product. Pour points and cloud points can be determined according to ASTM D97 and ASTM D2500, respectively. The resulting solvent processed oil can be suitable for use in forming one or more types of Group II base stocks. The resulting solvent dewaxed oil can have a viscosity index of at least 80, or at least 90, or at least 95, or at least 100, or at least 110, or at least 120. Viscosity index can be determined according to ASTM D2270. In some embodiments, at least 10 wt % of the resulting solvent processed oil (or at least 20 wt %, or at least 30 wt %) can correspond to a Group II bright stock having a kinematic viscosity at 100° C. of at least 14 cSt, or at least 15 cSt, or at least 20 cSt, or at least 25 cSt, or at least 30 cSt, or at least 32 cSt, such as up to 50 cSt or more. Additionally or alternatively, the Group II bright stock can have a kinematic viscosity at 40° C. of at least 300 cSt, or at least 320 cSt, or at least 340 cSt, or at least 350 cSt, such as up to 500 cSt or more. Kinematic viscosity can be determined according to ASTM D445. Additionally or alternatively, the Conradson Carbon residue content can be about 0.1 wt % or less, or about 0.02 wt % or less. Conradson Carbon residue content can be determined according to ASTM D4530. Additionally or alternatively, the resulting base stock can have a turbidity of at least 1.5 (in combination with a cloud point of less than 0° C.), or can have a turbidity of at least 2.0, and/or can have a turbidity of 4.0 or less, or 3.5 or less, or 3.0 or less. In particular, the turbidity can be 1.5 to 4.0, or 1.5 to 3.0, or 2.0 to 4.0, or 2.0 to 3.5.

The reduced or eliminated tendency to form haze for the lubricant base stocks formed from the solvent processed oil can be demonstrated by the reduced or minimized difference between the cloud point temperature and pour point temperature for the lubricant base stocks. In various aspects, the difference between the cloud point and pour point for the resulting solvent dewaxed oil and/or for one or more Group II lubricant base stocks, including one or more bright stocks, formed from the solvent processed oil, can be 22° C. or less, or 20° C. or less, or 15° C. or less, or 10° C. or less, such as down to about 1° C. of difference.

In some alternative aspects, the above solvent processing can be performed prior to catalytic dewaxing.

Group II Base Stock Products

For deasphalted oils derived from propane, butane, pentane, hexane and higher or mixtures thereof, the further hydroprocessing (including catalytic dewaxing) and potentially solvent processing can be sufficient to form lubricant base stocks with low haze formation (or no haze formation) and improved compositional properties. Traditional products manufactured today with kinematic viscosity of about 32 cSt at 100° C. contain aromatics that make up more than 10 wt % and/or sulfur that makes up more than >0.03 wt % of the base oil.

In various aspects, base stocks produced according to methods of the present disclosure can have a kinematic viscosity of at least 14 cSt, or at least 20 cSt, or at least 25 cSt, or at least 30 cSt, or at least 32 cSt at 100° C. and can contain less than 10 wt % aromatics/greater than 90 wt % saturates and less than 0.03 wt % sulfur. In some embodiments, the saturates content can be still higher, such as greater than 95 wt %, or greater than 97 wt %. In addition, detailed characterization of the "branchiness" (branching) of the molecules by C-NMR reveals a high degree of branch points, which can be quantified by examining the absolute number of methyl branches, or ethyl branches, or propyl branches individually or as combinations thereof. Branch points can also be quantified by looking at the ratio of branch points (methyl, ethyl, or propyl) compared to the number of internal carbons, labeled as epsilon carbons by C-NMR. Quantification of branching by epsilon carbons can be used to determine whether a base stock will be stable against haze formation over time. For $^{13}$C-NMR results reported herein, samples can be prepared to be 25-30 wt % in $CDCl_3$ with 7% Chromium (III)-acetylacetonate added as a relaxation agent. $^{13}$C NMR experiments can be performed on a JEOL ECS NMR spectrometer for which the proton resonance frequency is 400 MHz. Quantitative $^{13}$C NMR experiments can be performed at 27° C. using an inverse gated decoupling experiment with a 45° flip angle, 6.6 seconds between pulses, 64 K data points and 2400 scans. Spectra can be referenced to TMS at 0 ppm. Spectra can be processed with 0.2-1 Hz of line broadening and baseline correction was applied prior to manual integration. The entire spectrum can be integrated to determine the mole % of the different integrated areas as follows: 170-190 PPM (aromatic C); 30-29.5 PPM (epsilon carbons); 15-14.5 PPM (terminal and pendant propyl groups) 14.5-14 PPM—Methyl at the end of a long chain (alpha); 12-10 PPM (pendant and terminal ethyl groups). Total methyl content can be obtained from proton NMR. The methyl signal at 0-1.1 PPM can be integrated. The entire spectrum can be integrated to determine the mole % of methyls. Average carbon numbers obtained from gas chromatography can be used to convert mole % methyls to total methyls.

It has also been discovered that, using Fourier Transform Ion Cyclotron Resonance-Mass Spectrometry (FTICR-MS)

and/or Field Desorption Mass Spectrometry (FDMS), the prevalence of smaller naphthenic ring structures below 6 or below 7 or below 8 naphthene rings can be similar but the residual numbers of larger naphthenic rings structures with 7 or more rings or 8+ rings or 9+ rings or 10+ rings is diminished in base stocks that are stable against haze formation.

For FTICR-MS results reported herein, the results were generated according to the method described in U.S. Pat. No. 9,418,828. The method described in U.S. Pat. No. 9,418,828 generally involves using laser desorption with Ag ion complexation (LDI-Ag) to ionize petroleum saturates molecules (including 538° C.+ molecules) without fragmentation of the molecular ion structure. Ultra-high resolution Fourier Transform Ion Cyclotron Resonance Mass Spectrometry is applied to determine exact elemental formula of the saturates-Ag cations and corresponding abundances. The saturates fraction composition can be arranged by homologous series and molecular weights. The portion of U.S. Pat. No. 9,418,828 related to determining the content of saturate ring structures in a sample is incorporated herein by reference.

For FDMS results reported herein, Field Desorption (FD) is a soft ionization method in which a high-potential electric field is applied to an emitter (a filament from which tiny "whiskers" have formed) that has been coated with a diluted sample resulting in the ionization of gaseous molecules of the analyte. Mass spectra produced by FD are dominated by molecular radical cations M+ or in some cases protonated molecular ions [M+H]+. Because FDMS cannot distinguish between molecules with 'n' naphthene rings and molecules with 'n+7' rings, the FDMS data was "corrected" by using the FTICR-MS data from the most similar sample. The FDMS correction was performed by applying the resolved ratio of "n" to "n+7" rings from the FTICR-MS to the unresolved FDMS data for that particular class of molecules.

Base oils of the compositions described above have further been found to provide the advantage of being haze free upon initial production and remaining haze free for extended periods of time. This is an advantage over the prior art of high saturates heavy base stocks.

Additionally, it has been found that base stocks of the present disclosure can be blended with additives to form formulated lubricants, such as but not limited to marine oils, engine oils, greases, paper machine oils, and gear oils. These additives may include, but are not restricted to, detergents, dispersants, antioxidants, viscosity modifiers, and pour point depressants. When so blended, the performance as measured by standard low temperature tests such as the Mini-Rotary Viscometer (MRV) and Brookfield test has been shown to be superior to formulations blended with traditional base oils.

It has also been found that the oxidation performance, when blended into industrial oils using common additives such as, but not restricted to, defoamants, pour point depressants, antioxidants, rust inhibitors, has exemplified superior oxidation performance in standard oxidation tests such as the US Steel Oxidation test compared to traditional base stocks.

Other performance parameters such as interfacial properties, deposit control, storage stability, and toxicity have also been examined and are similar to or better than traditional base oils.

In addition to being blended with additives, the base stocks of the present disclosure may be blended with other base stocks to make a base oil. These other base stocks may include solvent processed base stocks, hydroprocessed base stocks, synthetic base stocks, base stocks derived from Fisher-Tropsch processes, PAO, and naphthenic base stocks. Additionally or alternatively, the other base stocks may include Group I base stocks, Group II base stocks, Group III base stocks, Group IV base stocks, and/or Group V base stocks. Additionally or alternatively, one or more low viscosity base stock may be combined with a high viscosity base stock of the present disclosure to create an extreme bimodal blend. In some embodiments, the low viscosity base stock may be any one or more of a light neutral base stock, a medium neutral base stock, a heavy neutral base stock, a Group I base stock, a Group II base stock, a Group III base stock, a Group IV base stock, a Group V base stock, or any combination thereof. The low viscosity base stock may have a kinematic viscosity at 100° C. of up to 2 cSt, up to 3 cSt, up to 4 cSt, up to 5 cSt, up to 6 cSt, up to 7 cSt, up to 8 cSt, up to 9 cSt, up to 10 cSt, up to 11 cSt, or up to 12 cSt. In some embodiments, a ratio of the quantity of low viscosity base stock relative to the quantity of a high viscosity base stock of the present disclosure may be up to 1:99, up to 5:95, up to 10:90, up to 20:80, up to 30:70, up to 40:60, up to 50:50, up to 60:40, up to 70:30, up to 80:20, up to 90:10, up to 95:5, or up to 99:1.

Additionally or alternatively, still other types of base stocks for blending can include hydrocarbyl aromatics, alkylated aromatics, esters (including synthetic and/or renewable esters), and or other non-conventional or unconventional base stocks. Such base oil blends of a base stock of the present disclosure and other base stocks may also be combined with additives, such as those mentioned herein, to make formulated lubricants.

A formulated fluid of the present disclosure may contain one or more performance additives including, but not limited to, anti-wear additives, detergents, dispersants, viscosity modifiers, corrosion inhibitors, rust inhibitors, metal deactivators, extreme pressure additives, anti-seizure agents, wax modifiers, viscosity index improvers, fluid-loss additives, seal compatibility agents, friction modifiers, lubricity agents, anti-staining agents, chromophoric agents, defoamers, demulsifiers, emulsifiers, densifiers, wetting agents, gelling agents, tackiness agents, colorants, and others. Such additives are commonly delivered with varying amounts of diluent oil that may range from 5 weight percent (wt %) to 50 wt %.

The additives useful in fluids of the present disclosure do not have to be soluble in the fluids. Insoluble additives, such as zinc stearate in oil, may be dispersed as a suspension in the fluids of this disclosure.

Additionally, it has been found that base stocks of the present disclosure can be used as thickening agents in formulated fluids to achieve desired viscometrics. Base stocks of the present disclosure may be used as thickening agents in combination with other thickening agents. Base stocks of the present disclosure may be used as thickening agents in place of other thickening agents. The use of a base stock of the present disclosure as a thickening agent provides for the use of other thickening agents to be reduced or eliminated. For example, the quantity of another thickening agent in a formulated fluid may be reduced by up to 0.1%, up to 1%, up to 5%, up to 10%, up to 20%, up to 30%, up to 40%, up to 50%, up to 60%, up to 70%, up to 80%, up to 90%, up to 95%, or up to 100%.

Formulated fluids including a base stock of the present disclosure as a thickening agent may exhibit viscometric properties similar to equivalent formulated fluids having one or more other thickening agent without a base stock of the present disclosure. Formulated fluids including a base stock of the present disclosure as a thickening agent may exhibit enhanced properties (such as oxidation resistance, low temperature fluidity, and/or deposit control) compared to equivalent formulated fluids having one or more other thickening agent without a base stock of the present disclosure. Formulated fluids including a base stock of the present disclosure as a thickening agent may be blended at lower cost compared to equivalent formulated fluids having one or more other thickening agent without a base stock of the present disclosure.

Examples of other thickening agents include viscosity index improvers and other high viscosity base stocks. An illustrative viscosity index improver is a polyisobutylene polymer that can be used for thickening a formulated fluid to achieve a desired lubricant viscosity. Polyisobutylene may be present in the formulated fluid at treat rates of 1 wt % to 20 wt %. Usage of the polyisobutylene may be reduced or eliminated by using the base stocks of the present disclosure.

Additionally, usage of other high viscosity base stocks in formulated fluids can be reduced or eliminated by using the base stocks of the present disclosure. Illustrative high viscosity base stocks include Group I bright stock and high viscosity PAO. By using a base stock of the present disclosure in a formulated fluid, the quantity of another high viscosity base stock in the formulated fluid may be reduced by up to 0.1%, up to 1%, up to 5%, up to 10%, up to 20%, up to 30%, up to 40%, up to 50%, up to 60%, up to 70%, up to 80%, up to 90%, up to 95%, or up to 100%.

In some fluid formulations, multiple PAO components may be present, and the base stocks of the present disclosure may reduce or replace a single PAO component, leaving other PAO components remaining in the formulated fluid. In other embodiments, the base stock of the present disclosure may partially or fully replace multiple PAO components, and still retain other PAO components in the formulated lubricant.

The types and quantities of performance additives used in combination with the instant disclosure in lubricant compositions are not limited by the examples shown herein as illustrations.

Other Additives—Detergents

Illustrative detergents useful in this disclosure include, for example, alkali metal detergents, alkaline earth metal detergents, or mixtures of one or more alkali metal detergents and one or more alkaline earth metal detergents. A typical detergent is an anionic material that contains a long chain hydrophobic portion of the molecule and a smaller anionic or oleophobic hydrophilic portion of the molecule. The anionic portion of the detergent is typically derived from an organic acid such as a sulfur acid, carboxylic acid, phosphorous acid, phenol, or mixtures thereof. The counterion is typically an alkaline earth or alkali metal.

Salts that contain a substantially stoichiometric amount of the metal are described as neutral salts and have a total base number (TBN, as measured by ASTM D2896) of from 0 to 80. Many compositions are overbased, containing large amounts of a metal base that is achieved by reacting an excess of a metal compound (a metal hydroxide or oxide, for example) with an acidic gas (such as carbon dioxide). Useful detergents can be neutral, mildly overbased, or highly overbased. These can be used in mixtures of neutral, overbased, highly overbased calcium salicylate, sulfonates, phenates and/or magnesium salicylate, sulfonates, phenates. The TBN ranges can vary from low, medium to high TBN products, including as low as 0 to as high as 600. Mixtures of low, medium, high TBN can be used, along with mixtures of calcium and magnesium metal based detergents, and including sulfonates, phenates, salicylates, and carboxylates. A detergent mixture with a metal ratio of 1, in conjunction of a detergent with a metal ratio of 2, and as high as a detergent with a metal ratio of 5, can be used. Borated detergents can also be used.

Alkaline earth phenates are another useful class of detergent. These detergents can be made by reacting alkaline earth metal hydroxide or oxide (CaO, Ca(OH)$_2$, BaO, Ba(OH)$_2$, MgO, Mg(OH)$_2$, for example) with an alkyl phenol or sulfurized alkylphenol. Useful alkyl groups include straight chain or branched C$_1$-C$_{30}$ alkyl groups, for example, C$_4$-C$_{20}$ or mixtures thereof. Examples of suitable phenols include isobutylphenol, 2-ethylhexylphenol, nonylphenol, dodecyl phenol, and the like. It should be noted that starting alkylphenols may contain more than one alkyl substituent that are each independently straight chain or branched and can be used from 0.5 to 6 weight percent. When a non-sulfurized alkylphenol is used, the sulfurized product may be obtained by methods well known in the art. These methods include heating a mixture of alkylphenol and sulfurizing agent (including elemental sulfur, sulfur halides such as sulfur dichloride, and the like) and then reacting the sulfurized phenol with an alkaline earth metal base.

Metal salts of carboxylic acids are also useful as detergents. These carboxylic acid detergents may be prepared by reacting a basic metal compound with at least one carboxylic acid and removing free water from the reaction product. These compounds may be overbased to produce the desired TBN level. Detergents made from salicylic acid are one class of detergents derived from carboxylic acids. Useful salicylates include long chain alkyl salicylates. One useful family of compositions is of the formula

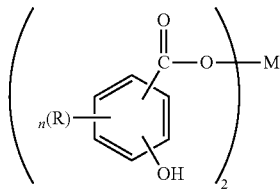

where R is an alkyl group having 1 to 30 carbon atoms, n is an integer from 1 to 4, and M is an alkaline earth metal. Example R groups include alkyl chains of at least C$_{11}$, such as C$_{13}$ or greater. R may be substituted with substituents that do not interfere with the detergent's function. M can be calcium, magnesium, or barium. For example, M is calcium.

Hydrocarbyl-substituted salicylic acids may be prepared from phenols by the Kolbe reaction (see U.S. Pat. No. 3,595,791). The metal salts of the hydrocarbyl-substituted salicylic acids may be prepared by double decomposition of a metal salt in a polar solvent such as water or alcohol.

Alkaline earth metal phosphates are also used as detergents and are known in the art.

Detergents may be simple detergents or what is known as hybrid or complex detergents. The latter detergents can provide the properties of two detergents without the need to blend separate materials. See U.S. Pat. No. 6,034,039.

Exemplary detergents include calcium phenates, calcium sulfonates, calcium salicylates, magnesium phenates, magnesium sulfonates, magnesium salicylates and other related components (including borated detergents), and mixtures thereof. Exemplary mixtures of detergents include magnesium sulfonate and calcium salicylate, magnesium sulfonate and calcium sulfonate, magnesium sulfonate and calcium phenate, calcium phenate and calcium salicylate, calcium phenate and calcium sulfonate, calcium phenate and magnesium salicylate, calcium phenate and magnesium phenate.

Another family of detergents is oil soluble ashless nonionic detergent. Typical nonionic detergents are polyoxyethylene, polyoxypropylene, polyoxybutylene alkyl ethers, or nonylphenol ethoxylates. For reference, see "Nonionic Surfactants: Physical Chemistry" Martin J. Schick, CRC Press; 2 edition (Mar. 27, 1987). These detergents are less common in engine lubricant formulations, but offer a number of advantages such as improved solubility in ester base stocks. The nonionic detergents that are soluble in hydrocarbons generally have a Hydrophilic-Lipophilic Balance (HLB) value of 10 or below.

To minimize the effect of ash deposit on engine knock and pre-ignition, including low speed pre-ignition, exemplary detergents may be an ashless nonionic detergent with a Hydrophilic-Lipophilic Balance (HLB) value of 10 or below. These detergents are commercially available from for example, Croda Inc., under the trade designations "Alarmol PS11E" and "Alarmol PS15E", from for example the Dow Chemical Co. the trade designation "Ecosurf EH-3", "Tergitol 15-S-3", "Tergitol L-61", "Tergitol L-62", "Tergitol NP-4", "Tergitol NP-6", "Tergitol NP-7", "Tergitol NP-8", "Tergitol NP-9", "Triton X-15", and "Triton X-35".

The detergent concentration in the lubricating oils of this disclosure can range from 0.5 to 6.0 weight percent, such as 0.6 to 5.0 weight percent, or from 0.8 weight percent to 4.0 weight percent, based on the total weight of the lubricating oil.

Other Additives—Dispersants

During engine operation, oil-insoluble oxidation byproducts are produced. Dispersants help keep these byproducts in solution, thus diminishing their deposition on metal surfaces. Dispersants used in the formulation of the lubricating oil may be ashless or ash-forming in nature. In some embodiments, the dispersant is ashless. So called ashless dispersants are organic materials that form substantially no ash upon combustion. For example, non-metal-containing or borated metal-free dispersants are considered ashless. In contrast, metal-containing detergents discussed above form ash upon combustion.

Suitable dispersants typically contain a polar group attached to a relatively high molecular weight hydrocarbon chain. The polar group typically contains at least one element of nitrogen, oxygen, or phosphorus. Typical hydrocarbon chains contain 50 to 400 carbon atoms.

A particularly useful class of dispersants are the alkenylsuccinic derivatives, typically produced by the reaction of a long chain hydrocarbyl substituted succinic compound, usually a hydrocarbyl substituted succinic anhydride, with a polyhydroxy or polyamino compound. The long chain hydrocarbyl group constituting the oleophilic portion of the molecule which confers solubility in the oil, is normally a polyisobutylene group.

Hydrocarbyl-substituted succinic acid and hydrocarbyl-substituted succinic anhydride derivatives are useful dispersants. In particular, succinimide, succinate esters, or succinate ester amides prepared by the reaction of a hydrocarbon-substituted succinic acid compound can have at least 50 carbon atoms in the hydrocarbon substituent, with at least one equivalent of an alkylene amine are particularly useful, although on occasion, having a hydrocarbon substituent between 20-50 carbon atoms can be useful.

Succinimides are formed by the condensation reaction between hydrocarbyl substituted succinic anhydrides and amines. Molar ratios can vary depending on the polyamine. For example, the molar ratio of hydrocarbyl substituted succinic anhydride to TEPA can vary from 1:1 to 5:1.

Succinate esters are formed by the condensation reaction between hydrocarbyl substituted succinic anhydrides and alcohols or polyols. Molar ratios can vary depending on the alcohol or polyol used. For example, the condensation product of a hydrocarbyl substituted succinic anhydride and pentaerythritol is a useful dispersant.

Succinate ester amides are formed by condensation reaction between hydrocarbyl substituted succinic anhydrides and alkanol amines. For example, suitable alkanol amines include ethoxylated polyalkylpolyamines, propoxylated polyalkylpolyamines and polyalkenylpolyamines such as polyethylene polyamines. One example is propoxylated hexamethylenediamine.

The molecular weight of the hydrocarbyl substituted succinic anhydrides used in the preceding paragraphs will typically range between 800 and 2,500 or more. The above products can be post-reacted with various reagents such as sulfur, oxygen, formaldehyde, carboxylic acids such as oleic acid. The above products can also be post reacted with boron compounds such as boric acid, borate esters or highly borated dispersants, to form borated dispersants generally having from 0.1 to 5 moles of boron per mole of dispersant reaction product.

Mannich base dispersants are made from the reaction of alkylphenols, formaldehyde, and amines. See U.S. Pat. No. 4,767,551. Process aids and catalysts, such as oleic acid and sulfonic acids, can also be part of the reaction mixture. Molecular weights of the alkylphenols range from 800 to 2.500.

Typical high molecular weight aliphatic acid modified Mannich condensation products useful in this disclosure can be prepared from high molecular weight alkyl-substituted hydroxyaromatics or HNR2 group-containing reactants.

Exemplary dispersants include borated and non-borated succinimides, including those derivatives from mono-succinimides, bis-succinimides, and/or mixtures of mono- and bis-succinimides, wherein the hydrocarbyl succinimide is derived from a hydrocarbylene group such as polyisobutylene having a Mn of from 500 to 5000, or from 1000 to 3000, or 1000 to 2000, or a mixture of such hydrocarbylene groups, often with high terminal vinylic groups. Other exemplary dispersants include succinic acid-esters and amides, alkylphenol-polyamine-coupled Mannich adducts, their capped derivatives, and other related components.

Polymethacrylate or polyacrylate derivatives are another class of dispersants. These dispersants are typically prepared by reacting a nitrogen containing monomer and a methacrylic or acrylic acid esters containing 5-25 carbon atoms in the ester group. Representative examples are shown in U.S. Pat. Nos. 2,100,993, and 6,323,164. Polymethacrylate and polyacrylate dispersants are normally used as multifunctional viscosity index improvers. The lower molecular weight versions can be used as lubricant dispersants or fuel detergents.

The use of polymethacrylate or polyacrylate dispersants may be preferred in polar esters of a non-aromatic dicarboxylic acid, such as adipate esters, since many other conventional dispersants are less soluble. Exemplary dispersants for polyol esters in this disclosure include polymethacrylate and polyacrylate dispersants.

Such dispersants may be used in an amount of 0.1 to 20 weight percent, such as 0.5 to 8 weight percent or 0.5 to 4 weight percent. The hydrocarbon numbers of the dispersant atoms can range from $C_{60}$ to $C_{1000}$, or from $C_{70}$ to $C_{300}$, or from $C_{70}$ to $C_{200}$. These dispersants may contain both neutral and basic nitrogen, and mixtures of both. Dispersants can be end-capped by borates and/or cyclic carbonates.

Still other potential dispersants can include polyalkenyls, such as polyalkenyls with a molecular weight of at least 900 and an average of 1.3 to 1.7 functional groups per polyalkenyl moiety. Yet other suitable polymers can include polymers formed by cationic polymerization of monomers such as isobutene and/or styrene.

Other Additives—Anti-Wear Agent

A metal alkylthiophosphate and more particularly a metal dialkyl dithio phosphate in which the metal constituent is zinc, or zinc dialkyl dithio phosphate (ZDDP) is a useful component of the lubricating oils of this disclosure. ZDDP can be derived from primary alcohols, secondary alcohols or mixtures thereof. ZDDP compounds generally are of the formula

$$Zn[SP(S)(OR^1)(OR^2)]_2$$

where $R^1$ and $R^2$ are $C_1$-$C_{18}$ alkyl groups, such as $C_2$-$C_{12}$ alkyl groups. These alkyl groups may be straight chain or branched. Alcohols used in the ZDDP can be 2-propanol, butanol, secondary butanol, pentanols, hexanols such as 4-methyl-2-pentanol, n-hexanol, n-octanol, 2-ethyl hexanol, alkylated phenols, and the like. Mixtures of secondary alcohols or of primary and secondary alcohol may be preferred. Alkyl aryl groups may also be used.

Exemplary zinc dithiophosphates which are commercially available include secondary zinc dithiophosphates such as those available from for example, The Lubrizol Corporation under the trade designations "LZ 677A", "LZ 1095" and "LZ 1371", from for example Chevron Oronite under the trade designation "OLOA 262" and from for example Afton Chemical under the trade designation "HITEC 7169".

ZDDP is typically used in amounts of from 0.4 weight percent to 1.2 weight percent, such as from 0.5 weight percent to 1.0 weight percent, such as from 0.6 weight percent to 0.8 weight percent, based on the total weight of the lubricating oil, although more or less can often be used advantageously. In some embodiments, the ZDDP is a secondary ZDDP and present in an amount of from 0.6 to 1.0 weight percent of the total weight of the lubricating oil.

More generally, other types of suitable anti-wear additives can include, for example, metal salts of a carboxylic acid. The metal can be a transition metal or a mixture of transition metals, such as one or more metals from Group 10, 11, or 12 of the IUPAC periodic table. The carboxylic acid can be an aliphatic carboxylic acid, a cycloaliphatic carboxylic acid, an aromatic carboxylic acid, or a mixture thereof.

Low phosphorus engine oil formulations are included in this disclosure. For such formulations, the phosphorus content is typically less than 0.12 weight percent, such as less than 0.10 weight percent or less than 0.085 weight percent. Low phosphorus may be preferred in combination with the friction modifier.

Other Additives—Extreme Pressure Additives

Extreme pressure additives may be incorporated into fluids of this disclosure. The extreme pressure additives may include organic sulfur compounds, organic phosphorus compounds, organic boron compounds, organic sulfur-phosphorus compounds, organic sulfur-phosphorus-boron compounds, organic chloride compounds, or any combination thereof. Some examples of such organic compounds include esters, triglycerides, paraffins, and olefins. Suitable extreme pressure additives for use in fluids of this disclosure include temperature-dependent extreme pressure additives that are configured to react with metallic surfaces under localized high temperature conditions that may exist in mechanisms in which one component of a mechanism exerts sufficient pressure on another component to cause a boundary condition of lubrication. Suitable extreme pressure additives for use in fluids of this disclosure include non-temperature-dependent extreme pressure additives. In some embodiments, the extreme pressure additive content of fluids of the present disclosure may be from about 0.1 wt % to about 30 wt %, or from about 0.1 wt % to about 25 wt %, or from about 0.1 wt % to about 20 wt %.

Other Additives—Viscosity Index Improvers

Viscosity index improvers (also known as VI improvers, viscosity modifiers, and viscosity improvers) can be included in the lubricant compositions of this disclosure. Viscosity index improvers provide lubricants with high and low temperature operability. These additives impart shear stability at elevated temperatures and acceptable viscosity at low temperatures.

Suitable viscosity index improvers include high molecular weight hydrocarbons, polyesters and viscosity index improver dispersants that function as both a viscosity index improver and a dispersant. Typical molecular weights of these polymers are between about 10,000 to 1,500,000, more typically about 20,000 to 1,200,000, and even more typically between about 50,000 and 1,000,000. The typical molecular weight for polymethacrylate or polyacrylate viscosity index improvers is less than about 50,000.

Examples of suitable viscosity index improvers are linear or star-shaped polymers and copolymers of methacrylate, butadiene, olefins, or alkylated styrenes. Polyisobutylene is a commonly used viscosity index improver. Another suitable viscosity index improver is polymethacrylate (copolymers of various chain length alkyl methacrylates, for example), some formulations of which also serve as pour point depressants. Other suitable viscosity index improvers include copolymers of ethylene and propylene, hydrogenated block copolymers of styrene and isoprene, and polyacrylates (copolymers of various chain length acrylates, for example). Specific examples include styrene-isoprene or styrene-butadiene based polymers of 50,000 to 200,000 molecular weight.

Olefin copolymers, are commercially available from Chevron Oronite Company LLC under the trade designation "PARATONE®" (such as "PARATONE® 8921" and "PARATONE® 8941"), from Afton Chemical Corporation under the trade designation "HiTEC®" (such as "HiTEC®, 5850B"; and from The Lubrizol Corporation under the trade designation "Lubrizol® 7067C". Hydrogenated polyisoprene star polymers are commercially available from Infineum International Limited, e.g., under the trade designation "SV200" and "SV600". Hydrogenated diene-styrene block copolymers are commercially available from Infineum International Limited, e.g., under the trade designation "SV 50".

In an embodiment of this disclosure, the viscosity index improvers may be used in an amount of from 1.0 to about 20 weight percent, such as 5 to about 15 weight percent, or 8.0 to about 12 weight percent, based on the total weight of the formulated oil or lubricating engine oil.

Other Additives—Antioxidants

Antioxidants retard the oxidative degradation of base stocks during service. Such degradation may result in deposits on metal surfaces, the presence of sludge, or a viscosity increase in the lubricant. One skilled in the art knows a wide variety of oxidation inhibitors that are useful in lubricating oil compositions.

Useful antioxidants include hindered phenols. These phenolic antioxidants may be ashless (metal-free) phenolic compounds or neutral or basic metal salts of certain phenolic compounds. Typical phenolic antioxidant compounds are the hindered phenolics which are the ones which contain a sterically hindered hydroxyl group, and these include those derivatives of dihydroxy aryl compounds in which the hydroxyl groups are in the o- or p-position to each other. Typical phenolic antioxidants include the hindered phenols substituted with $C_{6+}$ alkyl groups and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; and 2-methyl-6-t-butyl-4-dodecyl phenol. Other useful hindered mono-phenolic antioxidants may include for example hindered 2,6-di-alkyl-phenolic propionic ester derivatives. Bis-phenolic antioxidants may also be advantageously used in combination with the instant disclosure. Examples of ortho-coupled phenols include: 2,2'-bis(4-heptyl-6-t-butyl-phenol); 2,2'-bis(4-octyl-6-t-butyl-phenol); and 2,2'-bis(4-dodecyl-6-t-butyl-phenol). Para-coupled bisphenols include for example 4,4'-bis(2,6-di-t-butyl phenol) and 4,4'-methylene-bis(2,6-di-t-butyl phenol).

Effective amounts of one or more catalytic antioxidants may also be used. The catalytic antioxidants comprise an effective amount of a) one or more oil soluble polymetallic organic compounds; and, effective amounts of b) one or more substituted N,N'-diaryl-o-phenylenediamine compounds or c) one or more hindered phenol compounds; or a combination of both b) and c).

Non-phenolic oxidation inhibitors which may be used include aromatic amine antioxidants and these may be used either as such or in combination with phenolics. Typical examples of non-phenolic antioxidants include: alkylated and non-alkylated aromatic amines such as aromatic mono-amines of the formula $R^8R^9R^{10}N$ where $R^8$ is an aliphatic, aromatic or substituted aromatic group, $R^9$ is an aromatic or a substituted aromatic group, and $R^{10}$ is H, alkyl, aryl or $R^{11}S(O)_xR^{12}$ where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ may contain from 1 to 20 carbon atoms, such as from 6 to 12 carbon atoms. The aliphatic group is an aliphatic group. In some embodiments, both $R^8$ and $R^9$ are aromatic or substituted aromatic groups, and the aromatic group may be a fused ring aromatic group such as naphthyl. Aromatic groups $R^8$ and $R^9$ may be joined together with other groups such as S.

Typical aromatic amines antioxidants have alkyl substituent groups of at least 6 carbon atoms. Examples of aliphatic groups include hexyl, heptyl, octyl, nonyl, and decyl. Generally, the aliphatic groups will not contain more than 14 carbon atoms. The general types of amine antioxidants useful in the present compositions include diphenylamines, phenyl naphthylamines, phenothiazines, imidodibenzyls and diphenyl phenylene diamines. Mixtures of two or more aromatic amines are also useful. Polymeric amine antioxidants can also be used. Particular examples of aromatic amine antioxidants useful in the present disclosure include: p,p'-dioctyldiphenylamine; t-octylphenyl-alpha-naphthylamine; phenyl-alphanaphthylamine; and p-octylphenyl-alpha-naphthylamine.

Exemplary amine antioxidants in this disclosure include polymeric or oligomeric amines which are the polymerization reaction products of one or more substituted or hydrocarbyl-substituted diphenyl amines, one or more unsubstituted or hydrocarbyl-substituted phenyl naphthyl amines, or both one or more of unsubstituted or hydrocarbyl-substituted diphenylamine with one or more unsubstituted or hydrocarbyl-substituted phenyl naphthylamine.

Polymeric or oligomeric amines are commercially available from Nyco S.A. under the trade designation of Nycoperf AO337. The polymeric or oligomeric amine antioxidant is present in an amount in the range 0.5 to 10 wt % (active ingredient), such as 2 to 5 wt % (active ingredient) of polymerized aminic antioxidant exclusive of any unpolymerized aryl amine which may be present or any added antioxidants. Sulfurized alkyl phenols and alkali or alkaline earth metal salts thereof also are useful antioxidants.

Exemplary antioxidants also include hindered phenols, arylamines. These antioxidants may be used individually by type or in combination with one another. Such additives may be used in an amount of 0.01 to 5 weight percent, such as 0.01 to 1.5 weight percent, 0.01 to 1.0 weight percent, or 0.01 to 0.5 weight percent.

Other Additives—Pour Point Depressants (PPDs)

One or more pour point depressant (also known as lube oil flow improvers) may be added to the compositions of the present disclosure if desired. A pour point depressant may be added to lubricating compositions of the present disclosure to lower the minimum temperature at which the fluid will flow or can be poured. Examples of suitable pour point depressants include poly alkyl methacrylates, polymethacrylates, polyacrylates, polyarylamides, acrylate-styrene copolymers, esterified olefin copolymers, alkylated polystyrene, vinyl acetate-fumarate copolymers, condensation products of haloparaffin waxes and aromatic compounds, vinyl carboxylate polymers, and terpolymers of dialkylfumarates, vinyl esters of fatty acids and allyl vinyl ethers. Such additives may be used in an amount of about 0.01 to 5 weight percent, such as about 0.01 to 1.5 weight percent.

Other Additives—Seal Compatibility Agents

Seal compatibility agents help to swell elastomeric seals by causing a chemical reaction in the fluid or physical change in the elastomer. Suitable seal compatibility agents for lubricating oils include organic phosphates, aromatic esters, aromatic hydrocarbons, esters (butylbenzyl phthalate, for example), and polybutenyl succinic anhydride. Such additives may be used in an amount of about 0.01 to 3 weight percent, such as about 0.01 to 2 weight percent.

Other Additives—Antifoam Agents

Anti-foam agents may advantageously be added to lubricant compositions. These agents retard the formation of stable foams. Silicones and organic polymers are typical anti-foam agents. For example, polysiloxanes, such as silicon oil or polydimethyl siloxane, provide antifoam properties. Anti-foam agents are commercially available and may be used in conventional minor amounts along with other additives such as demulsifiers, usually the amount of these additives combined is less than 1 weight percent and often less than 0.1 weight percent.

Other Additives—Inhibitors and Antirust Additives

Antirust additives (or corrosion inhibitors) are additives that protect lubricated metal surfaces against chemical attack by water or other contaminants. A wide variety of these are commercially available.

One type of antirust additive is a polar compound that wets the metal surface preferentially, protecting it with a film of oil. Another type of antirust additive absorbs water by incorporating it in a water-in-oil emulsion so that only the oil touches the metal surface. Yet another type of antirust additive chemically adheres to the metal to produce a non-reactive surface. Examples of suitable additives include zinc dithiophosphates, metal phenolates, basic metal sulfonates, fatty acids and amines. Such additives may be used in an amount of about 0.01 to 5 weight percent, such as about 0.01 to 1.5 weight percent.

Other Additives—Friction Modifiers

A friction modifier is any material or materials that can alter the coefficient of friction of a surface lubricated by any lubricant or fluid containing such material(s). Friction modifiers, also known as friction reducers, or lubricity agents or oiliness agents, and other such agents that change the ability of base stocks, formulated lubricant compositions, or functional fluids, to modify the coefficient of friction of a lubricated surface may be effectively used in combination with the base stocks or lubricant compositions of the present disclosure if desired. Friction modifiers that lower the coefficient of friction are particularly advantageous in combination with the base stocks and lube compositions of this disclosure.

Illustrative friction modifiers may include, for example, organometallic compounds or materials, or mixtures thereof. Illustrative organometallic friction modifiers useful in the lubricating engine oil formulations of this disclosure include, for example, molybdenum amine, molybdenum diamine, an organotungstenate, a molybdenum dithiocarbamate, molybdenum dithiophosphates, molybdenum amine complexes, molybdenum carboxylates, and the like, and mixtures thereof. Similar tungsten based compounds may be preferable.

Other illustrative friction modifiers useful in the lubricating engine oil formulations of this disclosure include, for example, alkoxylated fatty acid esters, alkanolamides, polyol fatty acid esters, borated glycerol fatty acid esters, fatty alcohol ethers, and mixtures thereof.

Illustrative alkoxylated fatty acid esters include, for example, polyoxyethylene stearate, fatty acid polyglycol ester, and the like. These can include polyoxypropylene stearate, polyoxybutylene stearate, polyoxyethylene isostearate, polyoxypropylene isostearate, polyoxyethylene palmitate, and the like.

Illustrative alkanolamides include, for example, lauric acid diethylalkanolamide, palmic acid diethylalkanolamide, and the like. These can include oleic acid diethylalkanolamide, stearic acid diethylalkanolamide, oleic acid diethylalkanolamide, polyethoxylated hydrocarbyl amides, polypropoxylated hydrocarbylamides, and the like.

Illustrative polyol fatty acid esters include, for example, glycerol mono-oleate, saturated mono-, di-, and tri-glyceride esters, glycerol mono-stearate, and the like. These can include polyol esters, hydroxyl-containing polyol esters, and the like.

Illustrative borated glycerol fatty acid esters include, for example, borated glycerol mono-oleate, borated saturated mono-, di-, and tri-glyceride esters, borated glycerol mono-stearate, and the like. In addition to glycerol polyols, these can include trimethylolpropane, pentacrythritol, sorbitan, and the like. These esters can be polyol monocarboxylate esters, polyol dicarboxylate esters, and on occasion polyol-tricarboxylate esters. Examples can be the glycerol mono-oleates, glycerol dioleates, glycerol trioleates, glycerol monostearates, glycerol distearates, and glycerol tristearates and the corresponding glycerol monopalmitates, glycerol dipalmitates, and glycerol tripalmitates, and the respective isostearates, linoleates, and the like. On occasion the glycerol esters may be preferred as well as mixtures containing any of these. Ethoxylated, propoxylated, butoxylated fatty acid esters of polyols, especially using glycerol as underlying polyol may be preferred. Illustrative fatty alcohol ethers include, for example, stearyl ether, myristyl ether, and the like. Alcohols, including those that have carbon numbers from $C_3$ to $C_5$, can be ethoxylated, propoxylate, or butoxylated to form the corresponding fatty alkyl ethers. The underlying alcohol portion can be stearyl, myristyl, $C_{11}$-$C_{13}$ hydrocarbon, oleyl, isosteryl, and the like.

Useful concentrations of friction modifiers may range from 0.01 weight percent to 5 weight percent, or about 0.1 weight percent to about 2.5 weight percent, or about 0.1 weight percent to about 1.5 weight percent, or about 0.1 weight percent to about 1 weight percent. Concentrations of molybdenum-containing materials are often described in terms of Mo metal concentration. Advantageous concentrations of Mo may range from 25 ppm to 2000 ppm or more, and sometimes with a range of 50-1500 ppm. Friction modifiers of all types may be used alone or in mixtures with the materials of this disclosure. Often mixtures of two or more friction modifiers, or mixtures of friction modifier(s) with alternate surface active material(s), are also desirable.

When fluid compositions contain one or more additives, each additive is blended into the composition in an amount sufficient for it to perform its intended function for an application. Additives typically are present in finished lubricant compositions as a minor component, usually in an amount of less than 50 wt %, such as less than about 30 wt %, and such as less than about 15 wt %, based on the total weight of the composition. Each additive is usually present in finished lubricant compositions in an amount of at least 0.01 wt %, such as at least 1 wt %, such as at least 5 wt %. Some additives, such as a detergent package may be present in a finished lubricant composition in an amount of at least 10 wt %. Amounts of additives that may be useful in finished lubricants of the present disclosure are shown in Table 3, below.

Many additives are shipped from the additive manufacturer as a concentrate, containing one or more additives together, with a certain amount of base oil diluents. Accordingly, the weight amounts in the Table 3 below, as well as other amounts mentioned herein, are directed to the amount of active ingredient (that is the non-diluent portion of the ingredient). The weight percent (wt %) indicated below is based on the total weight of the finished lubricant composition.

TABLE 3

| Compound | Approximate wt % (Useful) | Approximate wt % (Example) |
|---|---|---|
| Dispersant | 0.1-20 | 0.1-8 |
| Detergent | 0.1-20 | 0.1-8 |
| Friction Modifier | 0.01-5 | 0.01-1.5 |
| Antioxidant | 0.01-5 | 0.1-1.5 |
| Pour Point Depressant (PPD) | 0.0-5 | 0.01-1.5 |
| Anti-foam Agent | 0.001-3 | 0.001-0.15 |
| Viscosity Modifier (solid polymer basis) | 0.1-2 | 0.1-1 |
| Anti-wear | 0.2-3 | 0.5-1 |
| Corrosion, Rust Inhibitor | 0.01-5 | 0.01-1.5 |

The foregoing additives are typically available as commercially available materials. These additives may be added independently, but are usually combined into packages that can be obtained from suppliers of lubricant oil additives. Additive packages with a variety of ingredients, proportions, and characteristics are available; selection of the appropriate package will take into account the requisite use of the ultimate composition.

Because additives for many types of lubricants usually are provided in pre-packaged cocktails, the adjustment of the relative amount of one additive within a finished engine oil lubricant would normally involve making a similar adjustment to all the other additives of a given additive package. Such an adjustment may be detrimental to the effectiveness of at least some of the other additives. For example, the reducing of the quantity of an antioxidant may lead to a commensurate reduction of the quantity of an anti-wear additive, with the result that the fluid possesses less capability than before with respect to wear protection. Nevertheless, it is contemplated that the performance benefits afforded by formulating fluids with a Group II high viscosity base stock of the present disclosure in place of existing Group I bright stock provides the opportunity to reformulate additive packages such that individual additives may be provided within these reformulated packages at different relative quantities than in current additive packages. Therefore, it is contemplated that additive packages can provide fluids to be formulated such that the aforementioned adjustments to the relative quantities of individual additives may be achieved without sacrificing other properties of the fluids.

Example Finished Fluids

Group II high viscosity base stock of the present disclosure are well suited as lubricant base stocks without blending limitations, and further, the lubricant base stocks are also compatible with lubricant additives for lubricant formulations. The lubricant base stocks of the present disclosure may be blended with other lubricant base stocks to form finished lubricants. Useful co-base lubricant base stocks include Group I, II, III, IV and V base stocks and gas-to-liquid (GTL) oils. One or more of the co-base stocks may be blended into a lubricant composition including a new Group II high viscosity base stock of the present disclosure at from 0.1 to 50 wt %, or 0.5 to 40 wt %, 1 to 35 wt %, or 2 to 30 wt %, or 5 to 25 wt %, or 10 to 20 wt %, based on the total finished lubricant composition.

Examples of a Group II high viscosity base stock and fluid compositions of the present disclosure can be employed in a variety of lubricant-related end uses, such as a lubricant oil or grease for a device or apparatus requiring lubrication of moving and/or interacting mechanical parts, components, or surfaces. Useful apparatuses include engines and machines. The new Group II high viscosity base stocks of the present disclosure may be suitable for use in the formulation of automotive crank case lubricants, automotive gear oils, transmission oils, marine cylinder oils, marine trunk piston engine oils, passenger vehicle engine oils, commercial vehicle engine oils, lubricants for hybrid vehicles, lubricants for plug-in hybrid vehicles, lubricants for battery electric vehicles, automotive greases, and many industrial lubricants including—but not limited to—circulation lubricant, industrial gear lubricants, onshore wind turbine lubricants, offshore wind turbine lubricants, paper machine oils, industrial greases, compressor oils, pump oils, refrigeration lubricants, hydraulic lubricants, and metal working fluids.

Four properties that are desired of lubricants for such applications as those listed above are oxidation stability, good deposit control, high viscosity indexes, and a fluid rheology that facilitates pumping of the fluid at low temperatures.

Oxidation concerns chemical reactions between a lubricant and oxygen that lead to the forming of varnish and sludge deposits, causing fouling of machinery. Also, oxidation can detrimentally increase the lubricant's viscosity. Thus, a lubricant possessing good oxidation stability would have a longer useful life than one with poor oxidation stability, which allows for longer time intervals between oil changes, thereby reducing downtime costs. Although a lubricant's oxidation stability may be enhanced by certain additives, additives are consumed during operation of the lubricant, and thus a lubricant's effectiveness lasts only as long as there remain sufficient additives in the lubricant. Therefore, it may be desirable to formulate lubricants whose oxidation stability is derived at least in part from the indigenous properties of the lubricants' base stock(s).

Deposit control properties concern the capability of a fluid to deter the unwanted deposition of oxidation products and other contaminants on the surfaces of components. Oxidation products include the products of reactions between oxygen and some fluid additives, such as anti-wear chemicals. The unwanted deposition of materials leads to fouling of components, and therefore it may be preferable for a fluid to prevent such deposition. While a fluid may possess good oxidation stability, it does not follow that such a fluid would also possess good deposit control. Oxidation concerns the reactions between a fluid's constituents and oxidation, whereas deposition concerns what happens to the products of these reactions. Deposition control in one aspect may involve the maintaining of reaction products and other solid contaminants in suspension in the fluid, which commonly is achieved by the use of additives, such as dispersants. Generally, a dispersant works by becoming attached to a solid contaminant particle such that dispersant molecules substantially surround each solid contaminant particle, and thereby prevent the agglomeration of solid contaminant particles. Thus, dispersants remain effective only for as long as unused dispersant molecules remain in the fluid. Deposition control in another aspect may involve the dissolution of reaction products and other solid contaminants in the fluid. Generally, fluids containing greater proportions of aromatic hydrocarbons may be more effective than fluids containing lesser proportions of aromatic hydrocarbons at dissolving some reaction products and other solid contaminants. From the above two aspects of deposition control, it may be desirable to formulate lubricants whose capability to dissolve and/or prevent the agglomeration and deposition of solid contaminants is derived at least in part from the indigenous properties of the lubricants' base stock(s).

A lubricant's viscosity index provides an indication of how much the lubricant's viscosity changes with changing temperature. A lubricant possessing a high viscosity index would experience less change in its viscosity with temperature than would a lubricant possessing a low viscosity index. Hence, lubricants for equipment that operates under wide-ranging environmental conditions, such as extreme high and low temperature conditions, should possess high viscosity indexes. Although high viscosity indexes may be achieved by including viscosity index improvers in a lubricant's formulation, the use of such additives is not always beneficial. For example, technological advances in engines, mechanisms, and pumps have led to smaller engines producing more power, mechanisms operating at faster speeds, and smaller pumps generating higher pressures than their predecessors. Such operational improvements as these place increased needs on lubricants to operate effectively at higher temperatures, higher pressures, and under more severe shear conditions. A reduction gear box, for example, may operate with components that are rapidly rotating, potentially causing detrimental shearing of viscosity index improvers in the lubricating oil. Once a viscosity index improver molecule has been sheared, it is no longer effective, and thus the lubricant's viscosity profile and efficacy worsen, eventually to the detriment of the equipment. Thus, it may be desirable to formulate lubricants having high viscosity indexes that are derived at least in part from the indigenous properties of the lubricants' base stock(s).

Fluid rheology at low temperatures may be considered to concern "fluidity" or "pumpability"—a measure of the ease (or difficulty) to pump a fluid at low temperatures. Low temperature rheological performance is most critical for mechanical devices, such as machines and vehicles, operating in cold environments, and particularly when such mechanical devices are started in motion from rest. When at rest, a mechanical device may not have lubricant effectively distributed to its moving parts, and therefore contacting surfaces may experience levels of friction and wear upon start-up of the mechanical device that are greater than those experienced during normal running. Such greater levels of friction and wear may be detrimental to the mechanical device's operating efficiency and longevity. The ability of a lubricant to counter this wear may be compromised at low temperatures. Firstly, a lubricant's viscosity tends to increase with decreasing temperature, and thus it becomes difficult to distribute the lubricant effectively at low temperatures. Secondly, the lubricant may experience the onset of wax crystallization at low temperatures, which may compound the effective distribution problem. Thirdly, these two effects hinder the migration of additive chemicals through the lubricant. Many anti-wear and extreme pressure additives designed to mitigate metal-on-metal wear operate by reacting with metal surfaces. Thus, the additives' effectiveness depends at least in part on the additives coming into contact with the metal surfaces. The hindrance of migration of additives within a fluid inhibits the contacting of metal surfaces by the additives, and therefore the additives may be less effective than when operating at higher temperatures.

To combat the above effects, a lubricant may be formulated so that it can be relatively easily pumped upon cold start-up of the mechanical device so that the lubricant and the necessary additives may become effectively distributed to the moving parts within a short time interval. A typical rheological measure for a lubricant is it's viscosity at low temperatures. Generally, the lower the viscosity at a given cold temperature, the more effectively the lubricant will be distributed upon start-up of the mechanical device, and the less detrimental a cold start-up will be to that device. For machines such as motor vehicle engines that rely on electrical energy from a battery to start up, there can be a problem in that the energy needed for start-up at cold temperatures is compounded by the energy needed to pump a highly viscous lubricant fluid, but the battery itself suffers from reduced power output at cold temperatures. Thus, a lubricant having lower viscosities at cold temperatures may at least partially compensate for the battery's reduced power output at cold temperatures.

Although various additives may be used to enhance a lubricant's low temperature rheology, such usage may have a detrimental on the lubricant's other performance attributes, such as viscosity index or oxidation performance. Furthermore, a greater use of additives tends to increase the cost of the lubricant. Thus, it may be desirable to formulate lubricants having improved low temperature rheology properties that are derived at least in part from the indigenous properties of the lubricants' base stock(s).

Various tests, documented in the examples that follow, provide side-by-side performance comparisons between lubricant fluids blended from a Group II high viscosity base stock of the present disclosure and equivalent fluids blended from a Group I high viscosity base stock. The performance comparisons include tests indicative of at least one of oxidation stability, deposit control, and low temperature rheology. Each side-by-side comparison is made in which the only significant difference between the test fluids of each example pair is the type of high viscosity base stock used in the blends. For some side-by-side comparisons, slight variations in a co-blended base stock as a minor component were necessary in order to obtain equivalent viscometrics properties of the side-by-side test samples. In each side-by-side comparison, the same additives in the same weight percentage quantities were blended into each fluid of an example pair of comparative fluids. Thus for each pair of comparative test samples, the overall weight percentage of base stock is identical, and the only significant difference between the two fluids of each pair is the use of a Group II high viscosity base stock of the present disclosure in one fluid and a Group I high viscosity base stock in the other.

With respect to oxidation stability, the test results, quoted below, show that the fluids blended from Group II high viscosity base stocks of the present disclosure exhibited superior oxidation stability than comparative fluids blended from Group I high viscosity base stocks. For Group I base stocks, the aromatic content may contribute to worse oxidation performance, but the sulfur content may contribute to better oxidation performance. The presence of sufficient quantities of antioxidant additives in finished lubricants blended from Group I base stocks provides acceptable oxidation stability. Although the Group II high viscosity base stocks of the present disclosure lack the aromatics content of Group I base stocks, blends of the Group II high viscosity base stocks of the present disclosure containing a significant quantity of Group I base stock would be expected to exhibit equivalent or marginally improved oxidation stability over comparative fluids blended from only Group I base stocks having the same antioxidant content. However, it has been discovered that the magnitude of the improvement in oxidation stability of fluids blended from Group II high viscosity base stocks of the present disclosure is significant.

With respect to deposit control, the test results, quoted below, show that the fluids blended from Group II high viscosity base stocks of the present disclosure exhibited deposit control capabilities similar to comparative fluids blended from Group I high viscosity base stocks. Group I base stocks contain significantly more aromatic hydrocarbons than do Group II base stocks, and particularly the Group II high viscosity base stocks of the present disclosure. With comparative pairs of fluids containing the same additives in the same proportions, it would be expected that the fluid containing more aromatic hydrocarbons would exhibit the better deposit control. Despite the dearth of aromatic hydrocarbons in Group II high viscosity base stocks of the present disclosure, it has been discovered that fluids blended from Group II high viscosity base stocks of the present disclosure may have equivalent or superior deposit control capabilities.

With respect to low temperature rheology, the test results, quoted below, show that the fluids blended from Group II high viscosity base stocks of the present disclosure exhibited far superior low temperature rheology than comparative fluids blended from Group I high viscosity base stocks. Although Group I base stocks may contain more waxes than may Group II high viscosity base stocks of the present disclosure, the additives used in the comparative tests would be expected offset the effects of the waxes present in fluids blended from Group I base stocks. With comparative pairs of fluids containing the same additives in the same proportions, it would be expected that with wax crystallization being controlled by the additives, then fluids blended from Group I high viscosity base stocks would exhibit similar (or only slightly worse) low temperature rheological performance compared to fluids blended from Group II high viscosity base stocks of the present disclosure. Despite the presence of equivalent quantities of wax controlling additives in comparative fluids blended from Group I high viscosity base stocks, it has been discovered that fluids blended from Group II high viscosity base stocks of the present disclosure may have superior—and particularly, significantly superior—low temperature rheological performance.

Group II high viscosity base stocks of the present disclosure may be used to formulate fluids to help fulfill the above needs for oxidation stability, deposit control, high viscosity indexes, and appropriate fluid rheology at low temperatures. For example, a finished lubricant formulation comprising a Group II high viscosity base stock of the present disclosure may have improved oxidation performance over existing comparative formulations, providing the end user to benefit from longer drain intervals, thereby reducing equipment downtime and reducing the operating expense associated with lubricant draining and change-out. Additionally, or alternatively, a finished lubricant formulation comprising a Group II high viscosity base stock of the present disclosure and having lower concentrations of one or more additives compared to existing comparative formulations may achieve a performance at least equivalent to the existing comparative formulation. The substitution of a Group II high viscosity base stock of the present disclosure in place of a conventional Group I bright stock in a finished lubricant may provide the end user to achieve at least an equivalent operational performance while also satisfying applicable health, safety, and/or environmental regulations.

Other benefits of finished lubricant formulations having a Group II high viscosity base stock of the present disclosure may be realized in situations where the lubricant is in a hotter environment or subjected to more severe operating conditions. Finished lubricant formulations having a Group II high viscosity base stock of the present disclosure may be effective with reduced amounts of viscosity index improvers compared to existing comparative lubricant formulations. Finished lubricant formulations having a Group II high viscosity base stock of the present disclosure may be effective with reduced amounts of antioxidants compared to existing comparative lubricant formulations. Additionally, improved low temperature performance of a finished lubricant formulation having a Group II high viscosity base stock of the present disclosure may enable a reduction or even an elimination of pour point depressant additive treat rates, thereby reducing cost, compared with existing comparative formulations blended from Group I bright stock. For example, whereas a SAE Grade 80W-90 automotive gear oil formulated with a Group I bright stock may typically contain 1.0-2.0 wt % pour point depressant, an equivalent formulation having a Group II high viscosity base stock of the present disclosure in place of at least some of the Group I bright stock may require only 0.1-0.5 wt % pour point depressant to achieve a comparable low temperature performance. For some high viscosity automotive gear oils (such as SAE Grade 85W-140) formulated with a Group II high viscosity base stock of the present disclosure, the pour point depressant additive may be reduced to less than 0.1 wt %, less than 0.05 wt %, or eliminated. Furthermore, because of the performance attributes of finished lubricant formulations having a Group II high viscosity base stock of the present disclosure, these finished lubricants may be more cost-effective compared to lubricants formulated from more expensive Group III, IV, and V base stocks.

Commensurate with the above, a method for improving oxidation performance of a fluid may involve blending the fluid using a Group II high viscosity base stock of the present disclosure with one or more additives. The Group II high viscosity base stock may have any one or more of the following: a viscosity index of at least 80, an aromatics content of less than 10 wt %, a sulfur content of less than 300 wppm, a kinematic viscosity at 100° C. of at least 14 cSt, a kinematic viscosity at 40° C. of at least 320 cSt, a pour point of −9° C. or less, a cloud point of −2° C. or less, and combination(s) thereof. The Group II high viscosity base stock may have an emulsion time at 82° C. according to ASTM D1401 of about 15 minutes. The Group II high viscosity base stock may have a sum of terminal/pendant propyl groups and terminal/pendant ethyl groups of at least 1.7 per 100 carbon atoms. The Group II high viscosity base stock may have an aromatics content of less than 8 wt %, less than 6 wt %, less than 4 wt %, or less than 2 wt %. The Group II high viscosity base stock may have a kinematic viscosity at 40° C. of at least 350 cSt, at least 400 cSt, at least 450 cSt, at least 500 cSt, or at least 550 cSt. The Group II high viscosity base stock may have a T10 distillation point of at least 482° C.

The fluid may contain 20 wt % or more, 30 wt % or more, 40 wt % or more, 50 wt % or more, 60 wt % or more, 70 wt % or more, 75% or more, 80 wt % or more, 85 wt % or more, 90 wt % or more, 93 wt % or more, 95 wt % or more, 97 wt %, or 99 wt % or more of the Group II high viscosity base stock. The fluid may have a saturates content of at least 60 wt %, at least 70 wt %, 80 wt %, at least 85 wt %, at least 90 wt %, at least 95 wt %, or at least 98 wt %. The fluid may have a KV100 increase measured according to ASTM D2893 of 6% or less, 5% or less, 4% or less, 3% or less, or of about 2%. The fluid may have an oxidation performance indicated by a kinematic viscosity at 100° C. (KV100) increase measured according to the L-60-1 rig test (ASTM D5704) of 30% or less, 25% or less, 20% or less, or of about 5% to 15%.

Additionally, or alternatively, the fluid may exhibit excellent deposit control properties. The fluid may have an Average Carbon/Varnish rating as measured under ASTM D5704 of from 8 to 10, with 10 being the maximum rating under the test. The fluid may have an Average Sludge rating as measured under ASTM D5704 of from 8 to 10, with 10 being the maximum rating according to the test. The fluid may have an Average Sludge rating as measured under ASTM D5704 of from 9 to 10.

Additionally, or alternatively, a fluid may have an antioxidant additive content of 5 wt % or less, 2 wt % or less, or from 0.01 wt % to 1 wt %. Additionally, or alternatively, the fluid contemplated above may have a viscosity index improver additive content of 10 wt % or less, 5 wt % or less, 2 wt % or less, or from 0.01 wt % to 1 wt %. Additionally, or alternatively, the fluid contemplated above may have a polyalphaolefin content of 10 wt % or less, 5 wt % or less, 2 wt % or less, or from 0.01 wt % to 1 wt %. Additionally, or alternatively, the fluid may have a pour point depressant additive content of 5 wt % or less, 3 wt % or less, or from 0.01 wt % to 1 wt %. In one embodiment, the fluid contemplated above may be suitable for use as an automotive gear oil.

A method for improving low temperature rheological performance of a fluid may involve blending the fluid using a Group II high viscosity base stock of the present disclosure with one or more additives. The Group II high viscosity base stock may have any one or more of the following: a viscosity index of at least 80, an aromatics content of less than 10 wt %, a sulfur content of less than 300 wppm, a kinematic viscosity at 100° C. of at least 14 cSt, a kinematic viscosity at 40° C. of at least 320 cSt, a pour point of −9° C. or less, a cloud point of −2° C. or less, and combination(s) thereof. The Group II high viscosity base stock may have an emulsion time at 82° C. according to ASTM D1401 of about 15 minutes. The Group II high viscosity base stock may have a sum of terminal/pendant propyl groups and terminal/pendant ethyl groups of at least 1.7 per 100 carbon atoms. The Group II high viscosity base stock may have an aromatics content of less than 8 wt %, less than 6 wt %, less than 4 wt %, or less than 2 wt %. The Group II high viscosity base stock may have a kinematic viscosity at 40° C. of at least 350 cSt, at least 400 cSt, at least 450 cSt, at least 500 cSt, or at least 550 cSt. The Group II high viscosity base stock may have a T10 distillation point of at least 482° C.

The fluid may contain 20 wt % or more, 30 wt % or more, 40 wt % or more, 50 wt % or more, 60 wt % or more, 70 wt % or more, 75% or more, 80 wt % or more, 85 wt % or more, 90 wt % or more, 93 wt % or more, 95 wt % or more, 97 wt %, or 99 wt % or more of the Group II high viscosity base stock. The fluid may have a saturates content of at least 60 wt %, at least 70 wt %, 80 wt %, at least 85 wt %, at least 90 wt %, at least 95 wt %, or at least 98 wt %.

The fluid may have a Brookfield viscosity measured according to ASTM D2983 at −12° C. of 70,000 mPa·s or less, 60,000 mPa·s or less, 50,000 mPa·s or less, 40,000 mPa·s or less or from 30,000 mPa·s to 40,000 mPa·s.

Additionally, or alternatively, the fluid contemplated above may have a Brookfield viscosity measured according to ASTM D2983 at −26° C. of 150,000 mPa·s or less, 140,000 mPa·s or less, 130,000 mPa·s or less, 120,000 mPa·s or less, 110,000 mPa·s or less, 100,000 mPa·s or less, 90,000 mPa·s or less, 80,000 mPa·s or less or from 70,000 mPa·s to 80,000 mPa·s.

Additionally, or alternatively, the fluid may have a MRV apparent viscosity measured according to ASTM D4684 at −15° C. of 17,000 mPa·s or less, 16,000 mPa·s or less, 15,000 mPa·s or less, or from 14,000 mPa·s to 15,000 mPa·s.

Additionally, or alternatively, a fluid may have an antioxidant additive content of 5 wt % or less, 2 wt % or less, or from 0.01 wt % to 1 wt %. Additionally, or alternatively, the fluid contemplated above may have a viscosity index improver additive content of 10 wt % or less, 5 wt % or less, 2 wt % or less, or from 0.01 wt % to 1 wt %. Additionally, or alternatively, the fluid contemplated above may have a polyalphaolefin content of 10 wt % or less, 5 wt % or less, 2 wt % or less, or from 0.01 wt % to 1 wt %. Additionally, or alternatively, the fluid may have a pour point depressant additive content of 5 wt % or less, 3 wt % or less, or from 0.01 wt % to 1 wt %. In one embodiment, the fluid contemplated above may be suitable for use as an automotive gear oil %. In one embodiment, the fluid contemplated above may be suitable for use as an engine oil.

Group II high viscosity base stocks of the present disclosure may be used to formulate fluids possessing a combination of any two or more properties related to oxidation stability, deposit control, high viscosity indexes, and a fluid rheology that facilitates pumping of the fluid at low temperatures.

Therefore, a method for improving the longevity and operational performance of a fluid may involve blending the fluid using a Group II high viscosity base stock of the present disclosure with one or more additives. The Group II high viscosity base stock may have any one or more of the following: a viscosity index of at least 80, an aromatics content of less than 10 wt %, a sulfur content of less than 300 wppm, a kinematic viscosity at 100° C. of at least 14 cSt, a kinematic viscosity at 40° C. of at least 320 cSt, a pour point of −9° C. or less, a cloud point of −2° C. or less, and combination(s) thereof. The Group II high viscosity base stock may have an emulsion time at 82° C. according to ASTM D1401 of about 15 minutes. The Group II high viscosity base stock may have a sum of terminal/pendant propyl groups and terminal/pendant ethyl groups of at least 1.7 per 100 carbon atoms. The Group II high viscosity base stock may have an aromatics content of less than 8 wt %, less than 6 wt %, less than 4 wt %, or less than 2 wt %. The Group II high viscosity base stock may have a kinematic viscosity at 40° C. of at least 350 cSt, at least 400 cSt, at least 450 cSt, at least 500 cSt, or at least 550 cSt. The Group II high viscosity base stock may have a T10 distillation point of at least 482° C.

The fluid may contain 20 wt % or more, 30 wt % or more, 40 wt % or more, 50 wt % or more, 60 wt % or more, 70 wt % or more, 75% or more, 80 wt % or more, 85 wt % or more, 90 wt % or more, 93 wt % or more, 95 wt % or more, 97 wt %, or 99 wt % or more of the Group II high viscosity base stock. The fluid may have a saturates content of at least 60 wt %, at least 70 wt %, 80 wt %, at least 85 wt %, at least 90 wt %, at least 95 wt %, or at least 98 wt %. The fluid may have a KV100 increase measured according to ASTM D2893 of 6% or less, 5% or less, 4% or less, 3% or less, or of about 2%. The fluid may have a KV100 increase measured according to the L-60-1 rig test (ASTM D5704) of 30% or less, 25% or less, 20% or less, or of about 5% to 15%.

Additionally, or alternatively, the fluid may exhibit excellent deposit control properties. The fluid may have an Average Carbon/Varnish rating as measured under ASTM D5704 of from 8 to 10, with 10 being the maximum rating under the test. The fluid may have an Average Sludge rating as measured under ASTM D5704 of from 8 to 10, with 10 being the maximum rating under the test. The fluid may have an Average Sludge rating as measured under ASTM D5704 of from 9 to 10.

Additionally, or alternatively, the fluid may have a Brookfield viscosity measured according to ASTM D2983 at −12° C. of 70,000 mPa·s or less, 60,000 mPa·s or less, 50,000 mPa·s or less, 40,000 mPa·s or less or from 30,000 mPa·s to 40,000 mPa·s.

Additionally, or alternatively, the fluid contemplated above may have a Brookfield viscosity measured according to ASTM D2983 at −26° C. of 150,000 mPa·s or less, 140,000 mPa·s or less, 130,000 mPa·s or less, 120,000 mPa·s or less, 110,000 mPa·s or less, 100,000 mPa·s or less, 90,000 mPa·s or less, 80,000 mPa·s or less or from 70,000 mPa·s to 80,000 mPa·s.

Additionally, or alternatively, the fluid may have a MRV apparent viscosity measured according to ASTM D4684 at −15° C. of 17,000 mPa·s or less, 16,000 mPa·s or less, 15,000 mPa·s or less, or from 14,000 mPa·s to 15,000 mPa·s.

Additionally, or alternatively, a fluid may have an antioxidant additive content of 5 wt % or less, 2 wt % or less, or from 0.01 wt % to 1 wt %. Additionally, or alternatively, the fluid contemplated above may have a viscosity index improver additive content of 10 wt % or less, 5 wt % or less, 2 wt % or less, or from 0.01 wt % to 1 wt %. Additionally, or alternatively, the fluid contemplated above may have a polyalphaolefin content of 10 wt % or less, 5 wt % or less, 2 wt % or less, or from 0.01 wt % to 1 wt %. Additionally, or alternatively, the fluid may have a pour point depressant additive content of 5 wt % or less, 3 wt % or less, or from 0.01 wt % to 1 wt %. In one embodiment, the fluid contemplated above may be suitable for use as an automotive gear oil. In one embodiment, the fluid contemplated above may be suitable for use as an engine oil.

A fluid of the present disclosure suitable for use as an industrial lubricant may contain about 90 wt % of a Group II high viscosity base stock of the present disclosure, whereby the base stock has a saturates content of about 90 wt % (i.e. such that the fluid itself has a saturates content of at least 80 wt %). The Group II high viscosity base stock may have any one or more of the following: a viscosity index of at least 80, an aromatics content of less than 10 wt %, a sulfur content of less than 300 wppm, a kinematic viscosity at 100° C. of at least 14 cSt, a kinematic viscosity at 40° C. of at least 320 cSt, a pour point of −9° C. or less, a cloud point of −2° C. or less, and combination(s) thereof. The Group II high viscosity base stock may have an emulsion time at 82° C. according to ASTM D1401 of about 15 minutes. The Group II high viscosity base stock may have a sum of terminal/pendant propyl groups and terminal/pendant ethyl groups of at least 1.7 per 100 carbon atoms. The Group II high viscosity base stock may have an aromatics content of less than 8 wt %, less than 6 wt %, less than 4 wt %, or less than 2 wt %. The Group II high viscosity base stock may have a kinematic viscosity at 40° C. of at least 350 cSt, at least 400 cSt, at least 450 cSt, at least 500 cSt, or at least 550 cSt. The Group II high viscosity base stock may have a T10 distillation point of at least 482° C.

The fluid may contain 20 wt % or more, 30 wt % or more, 40 wt % or more, 50 wt % or more, 60 wt % or more, 70 wt % or more, 75% or more, 80 wt % or more, 85 wt % or more, 90 wt % or more, 93 wt % or more, 95 wt % or more, 97 wt %, or 99 wt % or more of the Group II high viscosity base stock. The fluid may have a saturates content of at least 85 wt %, at least 90 wt %, at least 95 wt %, or at least 98 wt %. The fluid may have a KV100 increase measured according to ASTM D2893 of 6% or less, 5% or less, 4% or less, 3% or less, or of about 2%.

Additionally, or alternatively, a fluid may have an antioxidant additive content of 5 wt % or less, 2 wt % or less, or from 0.01 wt % to 1 wt %. Additionally, or alternatively, the fluid contemplated above may have a viscosity index improver additive content of 10 wt % or less, 5 wt % or less, 2 wt % or less, or from 0.01 wt % to 1 wt %. Additionally, or alternatively, the fluid contemplated above may have a polyalphaolefin content of 10 wt % or less, 5 wt % or less, 2 wt % or less, or from 0.01 wt % to 1 wt %. Additionally, or alternatively, the fluid may have a pour point depressant additive content of 5 wt % or less, 3 wt % or less, or from 0.01 wt % to 1 wt %. In one embodiment, the fluid contemplated above may be suitable for use as. In one embodiment, the fluid contemplated above may be suitable for use as an industrial gear oil. In one embodiment, the fluid contemplated above may be suitable for use as an industrial gear oil of the type of a paper machine oil.

A fluid of the present disclosure suitable for use as an automotive gear oil may contain 20 wt % or more, 30 wt % or more, 40 wt % or more, 50 wt % or more, 60 wt % or more, 70 wt % or more, 75% or more, 80 wt % or more, 85 wt % or more, 90 wt % or more, 93 wt % or more, 95 wt % or more, 97 wt %, or 99 wt % or more of the Group II high viscosity base stock. For example, a fluid of the present disclosure may contain about 70 wt % of a Group II high viscosity base stock of the present disclosure, whereby the base stock has a saturates content of about 90 wt % (i.e. such that the fluid itself has a saturates content of at least 60 wt %). The Group II high viscosity base stock may have any one or more of the following: a viscosity index of at least 80, an aromatics content of less than 10 wt %, a sulfur content of less than 300 wppm, a kinematic viscosity at 100° C. of at least 14 cSt, a kinematic viscosity at 40° C. of at least 320 cSt, a pour point of −9° C. or less, a cloud point of −2° C. or less, and combination(s) thereof. The Group II high viscosity base stock may have an emulsion time at 82° C. according to ASTM D1401 of about 15 minutes. The Group II high viscosity base stock may have a sum of terminal/pendant propyl groups and terminal/pendant ethyl groups of at least 1.7 per 100 carbon atoms. The Group II high viscosity base stock may have an aromatics content of less than 8 wt %, less than 6 wt %, less than 4 wt %, or less than 2 wt %. The Group II high viscosity base stock may have a kinematic viscosity at 40° C. of at least 350 cSt, at least 400 cSt, at least 450 cSt, at least 500 cSt, or at least 550 cSt. The Group II high viscosity base stock may have a T10 distillation point of at least 482° C.

The fluid may contain about 80 wt % or more, 85 wt % or more, 90 wt % or more, or 95 wt % or more of the Group II high viscosity base stock. The fluid may have a saturates content of at least 70 wt %, at least 80 wt %, at least 85 wt %, at least 90 wt %, or at least 95 wt %. The fluid may have a Brookfield viscosity measured according to ASTM D2983 at −12° C. of 70,000 mPa·s or less, 60,000 mPa·s or less, 50,000 mPa·s or less, 40,000 mPa·s or less or from 30,000 mPa·s to 40,000 mPa·s.

Additionally, or alternatively, the fluid contemplated above may have a Brookfield viscosity measured according to ASTM D2983 at −26° C. of 150,000 mPa·s or less, 140,000 mPa·s or less, 130,000 mPa·s or less, 120,000 mPa·s or less, 110,000 mPa·s or less, 100,000 mPa·s or less, 90,000 mPa·s or less, 80,000 mPa·s or less or from 70,000 mPa·s to 80,000 mPa·s.

Additionally, or alternatively, a fluid may have an antioxidant additive content of 5 wt % or less, 2 wt % or less, or from 0.01 wt % to 1 wt %. Additionally, or alternatively, the fluid contemplated above may have a viscosity index improver additive content of 10 wt % or less, 5 wt % or less, 2 wt % or less, or from 0.01 wt % to 1 wt %. Additionally, or alternatively, the fluid contemplated above may have a polyalphaolefin content of 10 wt % or less, 5 wt % or less, 2 wt % or less, or from 0.01 wt % to 1 wt %. Additionally, or alternatively, the fluid may have a pour point depressant additive content of 5 wt % or less, 3 wt % or less, or from 0.01 wt % to 1 wt %. In one embodiment, the fluid contemplated above may be suitable for use as an automotive gear oil.

Fluids of the present disclosure may be suitable for use as engine oils. Engine oils are intended for use in gasoline engines and diesel engines, and generally contain base stock(s) and additives. Commonly, the base stock is the major component in these fluids, and therefore contributes significantly to the properties of the engine oil. Generally, the wide variety of today's engine oils contain blends of a small number of individual lubricant base stocks and individual additives. Engine oils typically contain 80 wt % or more base oil, the remainder being various additives. Engine oils may contain 85 wt % or more base oil, 90 wt % or more base oil, or 95 wt % or more base oil. One base stock or two or more base stocks may comprise the base oil. In general, a greater percentage of a Group II high viscosity base stock would be utilized in a higher viscosity engine oils. However, because the base oil may include multiple base stocks, a Group II high viscosity base stock may also be blended into a relatively lighter viscosity engine oil product. In such a case, an extreme bimodal blend may be obtained where the Group II high viscosity base stock is blended with a light base stock to achieve a blended base oil in the desired viscosity range.

A fluid of the present disclosure may contain about 20 wt % or more, 30 wt % or more, or 40 wt % or more of a Group II high viscosity base stock of the present disclosure. The Group II high viscosity base stock may have a saturates content of about 90 wt % or more. The Group II high viscosity base stock may have any one or more of the following: a viscosity index of at least 80, an aromatics content of less than 10 wt %, a sulfur content of less than 300 wppm, a kinematic viscosity at 100° C. of at least 14 cSt, a kinematic viscosity at 40° C. of at least 320 cSt, a pour point of −9° C. or less, a cloud point of −2° C. or less, and combination(s) thereof. The Group II high viscosity base stock may have an emulsion time at 82° C. according to ASTM D1401 of about 15 minutes. The Group II high viscosity base stock may have a sum of terminal/pendant propyl groups and terminal/pendant ethyl groups of at least 1.7 per 100 carbon atoms. The Group II high viscosity base stock may have an aromatics content of less than 8 wt %, less than 6 wt %, less than 4 wt %, or less than 2 wt %. The Group II high viscosity base stock may have a kinematic viscosity at 40° C. of at least 350 cSt, at least 400 cSt, at least 450 cSt, at least 500 cSt, or at least 550 cSt. The Group II high viscosity base stock may have a T10 distillation point of at least 482° C.

The fluid may contain about 50 wt % or more, 60 wt % or more, or 70 wt % or more of the Group II high viscosity base stock. The fluid may have a saturates content of at least 80 wt %, at least 85 wt %, or at least 90 wt %. The fluid may have a MRV apparent viscosity measured according to ASTM D4684 at −15° C. of 17,000 mPa·s or less, 16,000 mPa·s or less, 15,000 mPa·s or less, or from 14,000 mPa·s to 15,000 mPa·s.

Additionally, or alternatively, a fluid may have an antioxidant additive content of 5 wt % or less, 2 wt % or less, or from 0.01 wt % to 1 wt %. Additionally, or alternatively, the fluid contemplated above may have a viscosity index improver additive content of 10 wt % or less, 5 wt % or less, 2 wt % or less, or from 0.01 wt % to 1 wt %. Additionally, or alternatively, the fluid contemplated above may have a polyalphaolefin content of 10 wt % or less, 5 wt % or less, 2 wt % or less, or from 0.01 wt % to 1 wt %. Additionally, or alternatively, the fluid may have a pour point depressant additive content of 5 wt % or less, 3 wt % or less, or from 0.01 wt % to 1 wt %. In one embodiment, the fluid contemplated above may be suitable for use as an engine oil.

In another embodiment, a fluid of the present disclosure may contain about 20 wt % or more, 30 wt % or more, 40 wt % or more of a Group II high viscosity base stock of the present disclosure. The Group II high viscosity base stock may have a saturates content of about 90 wt % or more. The Group II high viscosity base stock may have any one or more of the following: a viscosity index of at least 80, an aromatics content of less than 10 wt %, a sulfur content of less than 300 wppm, a kinematic viscosity at 100° C. of at least 14 cSt, a kinematic viscosity at 40° C. of at least 320 cSt, a pour point of −9° C. or less, a cloud point of −2° C. or less, and combination(s) thereof. The Group II high viscosity base stock may have an emulsion time at 82° C. according to ASTM D1401 of about 15 minutes. The Group II high viscosity base stock may have a sum of terminal/pendant propyl groups and terminal/pendant ethyl groups of at least 1.7 per 100 carbon atoms. The Group II high viscosity base stock may have an aromatics content of less than 8 wt %, less than 6 wt %, less than 4 wt %, or less than 2 wt %. The Group II high viscosity base stock may have a kinematic viscosity at 40° C. of at least 350 cSt, at least 400 cSt, at least 450 cSt, at least 500 cSt, or at least 550 cSt. The Group II high viscosity base stock may have a T10 distillation point of at least 482° C.

The fluid may contain about 50 wt % or more, 60 wt % or more, 70 wt % or more, 75% or more, 80 wt % or more, 85 wt % or more, 90 wt % or more, or 95 wt % or more of the Group II high viscosity base stock. The fluid may have a saturates content of at least 70 wt %, at least 80 wt %, at least 85 wt %, at least 90 wt %, or at least 95 wt %. The fluid may have a KV100 increase measured according to the L-60-1 rig test (ASTM D5704) of 30% or less, 25% or less, 20% or less, or of about 5% to 15%.

Additionally, or alternatively, the fluid may have a Carbon/Varnish rating measured according to the L-60-1 rig test (ASTM D5704) of 10 or less. Additionally, or alternatively, the fluid contemplated above may have a Carbon/Varnish rating measured according to the L-60-1 rig test (ASTM D5704) from about 8 to about 9. Additionally, or alternatively, the fluid contemplated above may have a Sludge rating measured according to the L-60-1 rig test (ASTM D5704) of 10 or less.

Additionally, or alternatively, a fluid may have an antioxidant additive content of 5 wt % or less, 2 wt % or less, or from 0.01 wt % to 1 wt %. Additionally, or alternatively, the fluid contemplated above may have a viscosity index improver additive content of 10 wt % or less, 5 wt % or less, 2 wt % or less, or from 0.01 wt % to 1 wt %. Additionally, or alternatively, the fluid contemplated above may have a polyalphaolefin content of 10 wt % or less, 5 wt % or less, 2 wt % or less, or from 0.01 wt % to 1 wt %. Additionally, or alternatively, the fluid may have a pour point depressant additive content of 5 wt % or less, 3 wt % or less, or from 0.01 wt % to 1 wt %. In one embodiment, the fluid contemplated above may be suitable for use as an automotive gear oil.

In another embodiment, a fluid of the present disclosure may contain about 20 wt % or more, 30 wt % or more, 40 wt % or more of a Group II high viscosity base stock of the present disclosure. The Group II high viscosity base stock may have a saturates content of about 90 wt % or more. The Group II high viscosity base stock may have any one or more of the following: a viscosity index of at least 80, an aromatics content of less than 10 wt %, a sulfur content of less than 300 wppm, a kinematic viscosity at 100° C. of at least 14 cSt, a kinematic viscosity at 40° C. of at least 320 cSt, a pour point of −9° C. or less, a cloud point of −2° C. or less, and combination(s) thereof. The Group II high viscosity base stock may have an emulsion time at 82° C. according to ASTM D1401 of about 15 minutes. The Group II high viscosity base stock may have a sum of terminal/pendant propyl groups and terminal/pendant ethyl groups of at least 1.7 per 100 carbon atoms. The Group II high viscosity base stock may have an aromatics content of less than 8 wt %, less than 6 wt %, less than 4 wt %, or less than 2 wt %. The Group II high viscosity base stock may have a kinematic viscosity at 40° C. of at least 350 cSt, at least 400 cSt, at least 450 cSt, at least 500 cSt, or at least 550 cSt.

The fluid may contain about 75 wt % or more, 80 wt % or more, 85 wt % or more, 90 wt % or more, or 95 wt % or more of the Group II high viscosity base stock. The fluid may have a saturates content of at least 70 wt %, at least 80 wt %, at least 85 wt %, at least 90 wt %, or at least 95 wt %. The fluid may have a thermal conductivity measured according to ASTM D7896 at 140° C. of greater than 0.128

W/m·K Additionally, or alternatively, the fluid may have a thermal conductivity measured according to ASTM D7896 at 70° C. of greater than 0.138 W/m·K. Additionally, or alternatively, the fluid may have a thermal conductivity measured according to ASTM D7896 at 0° C. of greater than 0.149 W/m·K.

Additionally, or alternatively, the fluid may have a specific heat capacity measured according to ASTM E1269 at 50° C. of 1.95 J/g·C or greater. Additionally, or alternatively, the fluid may have a specific heat capacity measured according to ASTM E1269 at 100° C. of 2.1 J/g·C or greater. Additionally, or alternatively, the fluid may have a specific heat capacity measured according to ASTM E1269 at 150° C. of 2.2 J/g·C or greater.

Additionally, or alternatively, a fluid may have an antioxidant content of less than 0.1 wt %, or from 0.01 wt % to 0.05 wt %. Additionally, or alternatively, the fluid contemplated above may have a viscosity index improver additive content of 10 wt % or less, 5 wt % or less, 2 wt % or less, or from 0.01 wt % to 1 wt %. Additionally, or alternatively, the fluid contemplated above may have a polyalphaolefin content of 10 wt % or less, 5 wt % or less, 2 wt % or less, or from 0.01 wt % to 1 wt %. Additionally, or alternatively, the fluid may have a pour point depressant additive content of 5 wt % or less, 3 wt % or less, or from 0.01 wt % to 1 wt %. Additionally, or alternatively, when the fluid is at a temperature of 0° C., the fluid may be substantially free of crystallized wax. In one embodiment, the fluid contemplated above may be suitable for use as an automotive gear oil.

In an additional aspect, a method is contemplated for using a fluid of the present disclosure in an electric vehicle. The method includes introducing the fluid into the electric vehicle and causing the fluid to contact a drivetrain of the electric vehicle. The method may further include causing the fluid to contact an electric traction motor within the electric vehicle. The method involves the fluid having a saturates content of at least 60 wt %, a viscosity index of at least 90, and a thermal conductivity measured according to ASTM D7896 at 140° C. of greater than 0.128 W/m·K. The fluid may contain about 80 wt % or more, 85 wt % or more, 90 wt % or more, or 95 wt % or more of a Group II high viscosity base stock of the present disclosure. The Group II high viscosity base stock may have any one or more of the following: a viscosity index of at least 80, an aromatics content of less than 10 wt %, a sulfur content of less than 300 wppm, a kinematic viscosity at 100° C. of at least 14 cSt, a kinematic viscosity at 40° C. of at least 320 cSt, a pour point of −9° C. or less, a cloud point of −2° C. or less, and combination(s) thereof. The Group II high viscosity base stock may have an emulsion time at 82° C. according to ASTM D1401 of about 15 minutes. The Group II high viscosity base stock may have a sum of terminal/pendant propyl groups and terminal/pendant ethyl groups of at least 1.7 per 100 carbon atoms. The Group II high viscosity base stock may have an aromatics content of less than 8 wt %, less than 6 wt %, less than 4 wt %, or less than 2 wt %. The Group II high viscosity base stock may have a kinematic viscosity at 40° C. of at least 350 cSt, at least 400 cSt, at least 450 cSt, at least 500 cSt, or at least 550 cSt.

The fluid may have a saturates content of at least 70 wt %, at least 80 wt %, at least 85 wt %, at least 90 wt %, or at least 95 wt %. The fluid may have a thermal conductivity measured according to ASTM D7896 at 70° C. of greater than 0.138 W/m·K. Additionally, or alternatively, the fluid may have a thermal conductivity measured according to ASTM D7896 at 0° C. of greater than 0.149 W/m·K.

Additionally, or alternatively, the fluid may have a specific heat capacity measured according to ASTM E1269 at 50° C. of 1.95 J/g·C or greater. Additionally, or alternatively, the fluid may have a specific heat capacity measured according to ASTM E1269 at 100° C. of 2.1 J/g·C or greater. Additionally, or alternatively, the fluid may have a specific heat capacity measured according to ASTM E1269 at 150° C. of 2.2 J/g·C or greater.

Additionally, or alternatively, a fluid may have an antioxidant content of less than 0.1 wt %, or from 0.01 wt % to 0.05 wt %. Additionally, or alternatively, the fluid contemplated above may have a viscosity index improver additive content of 10 wt % or less, 5 wt % or less, 2 wt % or less, or from 0.01 wt % to 1 wt %. Additionally, or alternatively, the fluid contemplated above may have a polyalphaolefin content of 10 wt % or less, 5 wt % or less, 2 wt % or less, or from 0.01 wt % to 1 wt %. Additionally, or alternatively, the fluid may have a pour point depressant additive content of 5 wt % or less, 3 wt % or less, or from 0.01 wt % to 1 wt %. Additionally, or alternatively, when the fluid is at a temperature of 0° C., the fluid may be substantially free of crystallized wax. In one embodiment, the fluid contemplated above may be suitable for use as an automotive gear oil.

In an additional aspect, a method is contemplated for using a fluid of the present disclosure in an electric vehicle. The method includes introducing the fluid into the electric vehicle and causing the fluid to contact a battery pack of the electric vehicle. The method may further include causing the fluid to directly contact the battery pack within the electric vehicle. The method may further include causing the fluid to directly contact battery cells within the battery pack. The method involves the fluid having a saturates content of at least 60 wt %, a viscosity index of at least 90, and a thermal conductivity measured according to ASTM D7896 at 140° C. of greater than 0.128 W/m·K. The fluid may contain about 80 wt % or more, 85 wt % or more, 90 wt % or more, or 95 wt % or more of a Group II high viscosity base stock of the present disclosure. The Group II high viscosity base stock may have any one or more of the following: a viscosity index of at least 80, an aromatics content of less than 10 wt %, a sulfur content of less than 300 wppm, a kinematic viscosity at 100° C. of at least 14 cSt, a kinematic viscosity at 40° C. of at least 320 cSt, a pour point of −9° C. or less, a cloud point of −2° C. or less, and combination(s) thereof. The Group II high viscosity base stock may have an emulsion time at 82° C. according to ASTM D1401 of about 15 minutes. The Group II high viscosity base stock may have a sum of terminal/pendant propyl groups and terminal/pendant ethyl groups of at least 1.7 per 100 carbon atoms. The Group II high viscosity base stock may have an aromatics content of less than 8 wt %, less than 6 wt %, less than 4 wt %, or less than 2 wt %. The Group II high viscosity base stock may have a kinematic viscosity at 40° C. of at least 350 cSt, at least 400 cSt, at least 450 cSt, at least 500 cSt, or at least 550 cSt.

The fluid may have a saturates content of at least 70 wt %, at least 80 wt %, at least 85 wt %, at least 90 wt %, or at least 95 wt %. The fluid may have a thermal conductivity measured according to ASTM D7896 at 70° C. of greater than 0.138 W/m·K. Additionally, or alternatively, the fluid may have a thermal conductivity measured according to ASTM D7896 at 0° C. of greater than 0.149 W/m·K.

Additionally, or alternatively, the fluid may have a specific heat capacity measured according to ASTM E1269 at 50° C. of 1.95 J/g·C or greater. Additionally, or alternatively, the fluid may have a specific heat capacity measured according to ASTM E1269 at 100° C. of 2.1 J/g·C or greater.

Additionally, or alternatively, the fluid may have a specific heat capacity measured according to ASTM E1269 at 150° C. of 2.2 J/g·C or greater.

Additionally, or alternatively, the fluid may have an antioxidant content of less than 0.1 wt %, or from 0.01 wt % to 0.05 wt %. Additionally, or alternatively, the fluid contemplated above may have a viscosity index improver additive content of 10 wt % or less, 5 wt % or less, 2 wt % or less, or from 0.01 wt % to 1 wt %. Additionally, or alternatively, the fluid contemplated above may have a polyalphaolefin content of 10 wt % or less, 5 wt % or less, 2 wt % or less, or from 0.01 wt % to 1 wt %. Additionally, or alternatively, the fluid may have a pour point depressant additive content of 5 wt % or less, 3 wt % or less, or from 0.01 wt % to 1 wt %. Additionally, or alternatively, when the fluid is at a temperature of 0° C., the fluid may be substantially free of crystallized wax. In one embodiment, the fluid contemplated above may be suitable for use as an automotive gear oil.

In another embodiment, a method for producing a deposit resistant fluid may include combining a base stock and one or more additives to form a blended fluid configured to resist forming deposits in an oxidizing environment. The base stock may have a viscosity index of at least 80, and either a kinematic viscosity at 40° C. of at least 320 cSt or a kinematic viscosity at 100° C. of at least 14 cSt. The base stock may include greater than or equal to about 90 wt % saturates, less than or equal to about 10 wt % aromatics, and a sum of terminal/pendant propyl groups and terminal/pendant ethyl groups of at least 1.7 per 100 carbon atoms.

Additionally, or alternatively, the base stock may have a T10 distillation point of at least 482° C. Additionally, or alternatively, the base stock may have a pour point of −9° C. or less, and/or a cloud point of −2° C. or less.

The blended fluid may be selected from a group consisting of: a base oil, a lubricant, a process fluid, a hydraulic fluid, an industrial fluid, an automotive fluid, and combination(s) thereof.

The blended fluid may be configured to resist oxidation in the oxidizing environment. The oxidizing environment may include a temperature of up to 250° F. (121° C.), or up to 302° F. (150° C.), or up to 325° F. (163° C.). The oxidizing environment may include air. The oxidizing environment may include water. The blended fluid may be configured to resist forming deposits for at least 50 hours in the presence of a metal reagent at a temperature of up to 325° F. (163° C.). The metal reagent may be any one of copper, steel, iron, and combination(s) thereof.

The blended fluid may be configured to maintain fluidity in a low temperature environment. The blended fluid may have a MRV apparent viscosity measured according to ASTM D4684 at −15° C. of 17,000 mPa·s or less, 16,000 mPa·s or less, 15,000 mPa·s or less, or from 14,000 mPa·s to 15,000 mPa·s. Additionally, or alternatively, the blended fluid may have a Brookfield viscosity measured according to ASTM D2983 at −12° C. of 70,000 mPa·s or less, 60,000 mPa·s or less, 50,000 mPa·s or less, 40,000 mPa·s or less or from 30,000 mPa·s to 40,000 mPa·s. Additionally, or alternatively, the blended fluid may have a Brookfield viscosity measured according to ASTM D2983 at −26° C. of 150,000 mPa·s or less, 140,000 mPa·s or less, 130,000 mPa·s or less, 120,000 mPa·s or less, 110,000 mPa·s or less, 100,000 mPa·s or less, 90,000 mPa·s or less, 80,000 mPa·s or less or from 70,000 mPa·s to 80,000 mPa·s.

In another embodiment, a method for reducing deposit formation may include introducing a base stock to a blended fluid. The base stock may have a viscosity index of at least 80, and either a kinematic viscosity at 40° C. of at least 320 cSt or a kinematic viscosity at 100° C. of at least 14 cSt. The base stock may include greater than or equal to about 90 wt % saturates, less than or equal to about 10 wt % aromatics, and a sum of terminal/pendant propyl groups and terminal/pendant ethyl groups of at least 1.7 per 100 carbon atoms. The addition of the base stock to the blended fluid may increase the capability of the blended fluid to resist deposit formation in an oxidizing environment.

Additionally, or alternatively, the base stock may have a T10 distillation point of at least 482° C. Additionally, or alternatively, the base stock may have a pour point of −9° C. or less, and/or a cloud point of −2° C. or less.

The blended fluid may be selected from a group consisting of: a base oil, a lubricant, a process fluid, a hydraulic fluid, an industrial fluid, an automotive fluid, and combination(s) thereof. The blended fluid after the introduction of the base stock may be configured to resist oxidation in the oxidizing environment. The oxidizing environment may include a temperature of up to 250° F. (121° C.), or up to 302° F. (150° C.), or up to 325° F. (163° C.). The oxidizing environment may include air. The oxidizing environment may include water. The blended fluid after the introduction of the base stock may be configured to resist forming deposits for at least 50 hours in the presence of a metal reagent at a temperature of up to 325° F. (163° C.). The metal reagent may be any one of copper, steel, iron, and combination(s) thereof.

In another embodiment, a method for mitigating deposit formation in an apparatus may include introducing a blended fluid to a metal member of the apparatus. The blended fluid may include a base stock and one or more additives. The base stock may have a viscosity index of at least 80, and either a kinematic viscosity at 40° C. of at least 320 cSt or a kinematic viscosity at 100° C. of at least 14 cSt. The base stock may include greater than or equal to about 90 wt % saturates, less than or equal to about 10 wt % aromatics, and a sum of terminal/pendant propyl groups and terminal/pendant ethyl groups of at least 1.7 per 100 carbon atoms. The blended fluid may be configured to resist forming deposits in an oxidizing environment.

Additionally, or alternatively, the base stock may have a T10 distillation point of at least 482° C. Additionally, or alternatively, the base stock may have a pour point of −9° C. or less, and/or a cloud point of −2° C. or less.

The blended fluid may be selected from a group consisting of: a base oil, a lubricant, a process fluid, a hydraulic fluid, an industrial fluid, an automotive fluid, and combination(s) thereof. The blended fluid may be configured to resist oxidation in the oxidizing environment. The oxidizing environment may include a temperature of up to 250° F. (121° C.), or up to 302° F. (150° C.), or up to 325° F. (163° C.). The oxidizing environment may include air. The oxidizing environment may include water. The blended fluid may be configured to resist forming deposits for at least 50 hours in the presence of a metal reagent at a temperature of up to 325° F. (163° C.). The metal reagent may be any one of copper, steel, iron, and combination(s) thereof.

In another embodiment, a deposit resistant fluid may include a base stock and one or more additives. The base stock may have a viscosity index of at least 80, and either a kinematic viscosity at 40° C. of at least 320 cSt or a kinematic viscosity at 100° C. of at least 14 cSt. The base stock may include greater than or equal to about 90 wt % saturates, less than or equal to about 10 wt % aromatics, and a sum of terminal/pendant propyl groups and terminal/pendant ethyl groups of at least 1.7 per 100 carbon atoms.

The deposit resistant fluid may be configured to maintain fluidity in a low temperature environment and to resist forming deposits in an oxidizing environment.

Additionally, or alternatively, the base stock may have a T10 distillation point of at least 482° C. Additionally, or alternatively, the base stock may have a pour point of −9° C. or less, and/or a cloud point of −2° C. or less.

The deposit resistant fluid may be selected from a group consisting of: a base oil, a lubricant, a process fluid, a hydraulic fluid, an industrial fluid, an automotive fluid, and combination(s) thereof. The deposit resistant fluid may be configured to resist oxidation in the oxidizing environment. The oxidizing environment may include a temperature of up to 250° F. (121° C.), or up to 302° F. (150° C.), or up to 325° F. (163° C.). The oxidizing environment may include air. The oxidizing environment may include water. The deposit resistant fluid may be configured to resist forming deposits for at least 50 hours in the presence of a metal reagent at a temperature of up to 325° F. (163° C.). The metal reagent may be any one of copper, steel, iron, and combination(s) thereof.

The deposit resistant fluid may be configured to maintain fluidity in a low temperature environment. The deposit resistant fluid may have a MRV apparent viscosity measured according to ASTM D4684 at −15° C. of 17,000 mPa·s or less, 16,000 mPa·s or less, 15,000 mPa·s or less, or from 14,000 mPa·s to 15,000 mPa·s. Additionally, or alternatively, the deposit resistant fluid may have a Brookfield viscosity measured according to ASTM D2983 at −12° C. of 70,000 mPa·s or less, 60,000 mPa·s or less, 50,000 mPa·s or less, 40,000 mPa·s or less or from 30,000 mPa·s to 40,000 mPa·s. Additionally, or alternatively, the deposit resistant fluid may have a Brookfield viscosity measured according to ASTM D2983 at −26° C. of 150,000 mPa·s or less, 140,000 mPa·s or less, 130,000 mPa·s or less, 120,000 mPa·s or less, 110,000 mPa·s or less, 100,000 mPa·s or less, 90,000 mPa·s or less, 80,000 mPa·s or less or from 70,000 mPa·s to 80,000 mPa·s.

In another embodiment, a fluid may include a base stock and one or more additives. The base stock may have a viscosity index of at least 80, and either a kinematic viscosity at 40° C. of at least 320 cSt or a kinematic viscosity at 100° C. of at least 14 cSt. The base stock may include greater than or equal to about 90 wt % saturates, less than or equal to about 10 wt % aromatics, and a sum of terminal/pendant propyl groups and terminal/pendant ethyl groups of at least 1.7 per 100 carbon atoms.

Additionally, or alternatively, the base stock may have a T10 distillation point of at least 482° C. Additionally, or alternatively, the base stock may have a pour point of −9° C. or less, and/or a cloud point of −2° C. or less.

The fluid may have a thermal conductivity measured according to ASTM D7896 at 140° C. of 0.12 W/m·K or greater. Additionally, or alternatively, the fluid may have a thermal conductivity measured according to ASTM D7896 at 140° C. of 0.125 W/m·K or greater. Additionally, or alternatively, the fluid may have a thermal conductivity measured according to ASTM D7896 at 140° C. of 0.128 W/m·K to 0.135 W/m·K. Additionally, or alternatively, the fluid may have a thermal conductivity measured according to ASTM D7896 at 0° C. of 0.14 W/m·K or greater. Additionally, or alternatively, the fluid may have a thermal conductivity measured according to ASTM D7896 at 0° C. of 0.145 W/m·K or greater. Additionally, or alternatively, the fluid may have a thermal conductivity measured according to ASTM D7896 at 0° C. of 0.148 W/m·K to 0.155 W/m·K.

Additionally, or alternatively, the fluid may have a specific heat capacity measured according to ASTM E1269 at 150° C. of 2.1 J/g·C or greater. Additionally, or alternatively, the fluid may have a specific heat capacity measured according to ASTM E1269 at 150° C. of 2.15 J/g·C or greater. Additionally, or alternatively, the fluid may have a specific heat capacity measured according to ASTM E1269 at 150° C. of 2.18 J/g·C to 2.3 J/g·C. Additionally, or alternatively, when the fluid is at a temperature of 0° C., the fluid may be substantially free of crystallized wax.

The fluid may be selected from a group consisting of: a base oil, a lubricant, a process fluid, a hydraulic fluid, an industrial fluid, an automotive fluid, and combination(s) thereof. Additionally, or alternatively, the fluid may be configured to resist oxidation in an oxidizing environment. The oxidizing environment may include a temperature of up to 250° F. (121° C.), or up to 302° F. (150° C.), or up to 325° F. (163° C.). The oxidizing environment may include air. The oxidizing environment may include water. Additionally, or alternatively, the fluid may be configured to resist forming deposits in an oxidizing environment. The oxidizing environment may include a temperature of up to 250° F. (121° C.), or up to 302° F. (150° C.), or up to 325° F. (163° C.). The oxidizing environment may include air. The oxidizing environment may include water. The fluid may be configured to resist forming deposits for at least 50 hours in the presence of a metal reagent at a temperature of up to 325° F. (163° C.). The metal reagent may be any one of copper, steel, iron, and combination(s) thereof.

Additionally, or alternatively, the fluid may have a kinematic viscosity at 100° C. (KV100) increase of 30% or less, 25% or less, 20% or less, or of about 5% to 15% measured according to an ASTM D5704 test. Additionally, or alternatively, the fluid may have an Average Carbon/Varnish rating as measured according to ASTM D5704 of from 8 to 10. Additionally, or alternatively, the fluid may have an Average Sludge rating as measured according to ASTM D5704 of from 8 to 10. Additionally, or alternatively, the fluid may have an Average Sludge rating as measured according to ASTM D5704 of from 9 to 10.

Additionally, or alternatively, the fluid may be configured to maintain fluidity in a low temperature environment. The fluid may have a MRV apparent viscosity measured according to ASTM D4684 at −15° C. of 17,000 mPa·s or less, 16,000 mPa·s or less, 15,000 mPa·s or less, or from 14,000 mPa·s to 15,000 mPa·s. Additionally, or alternatively, the fluid may have a Brookfield viscosity measured according to ASTM D2983 at −12° C. of 70,000 mPa·s or less, 60,000 mPa·s or less, 50,000 mPa·s or less, 40,000 mPa·s or less or from 30,000 mPa·s to 40,000 mPa·s.

Additionally, or alternatively, the fluid may have a Brookfield viscosity measured according to ASTM D2983 at −26° C. of 150,000 mPa·s or less, 140,000 mPa·s or less, 130,000 mPa·s or less, 120,000 mPa·s or less, 110,000 mPa·s or less, 100,000 mPa·s or less, 90,000 mPa·s or less, 80,000 mPa·s or less or from 70,000 mPa·s to 80,000 mPa·s.

In another embodiment, a method may include cooling a surface within an electrical machine by causing a fluid to contact the surface. The fluid may include a base stock and one or more additives. The base stock may have a viscosity index of at least 80, and either a kinematic viscosity at 40° C. of at least 320 cSt or a kinematic viscosity at 100° C. of at least 14 cSt. The base stock may include greater than or equal to about 90 wt % saturates, less than or equal to about 10 wt % aromatics, and a sum of terminal/pendant propyl groups and terminal/pendant ethyl groups of at least 1.7 per 100 carbon atoms.

Additionally, or alternatively, the base stock may have a T10 distillation point of at least 482° C. Additionally, or alternatively, the base stock may have a pour point of −9° C. or less, and/or a cloud point of −2° C. or less.

The electrical machine may be an electric vehicle. The surface may be part of a drivetrain of an electric vehicle. The method may further include causing the fluid to contact an electric traction motor within an electric vehicle. The surface may be part of a battery pack. The method may further include causing the lubricant to directly contact the battery pack. The method may further include causing the lubricant to directly contact battery cells within the battery pack. The method may further include immersing the battery cells in the lubricant.

The fluid may have a thermal conductivity measured according to ASTM D7896 at 140° C. of 0.12 W/m·K or greater. Additionally, or alternatively, the fluid may have a thermal conductivity measured according to ASTM D7896 at 140° C. of 0.125 W/m·K or greater. Additionally, or alternatively, the fluid may have a thermal conductivity measured according to ASTM D7896 at 140° C. of 0.128 W/m·K to 0.135 W/m·K. Additionally, or alternatively, the fluid may have a thermal conductivity measured according to ASTM D7896 at 0° C. of 0.14 W/m·K or greater. Additionally, or alternatively, the fluid may have a thermal conductivity measured according to ASTM D7896 at 0° C. of 0.145 W/m·K or greater. Additionally, or alternatively, the fluid may have a thermal conductivity measured according to ASTM D7896 at 0° C. of 0.148 W/m·K to 0.155 W/m·K.

Additionally, or alternatively, the fluid may have a specific heat capacity measured according to ASTM E1269 at 150° C. of 2.1 J/g·C or greater. Additionally, or alternatively, the fluid may have a specific heat capacity measured according to ASTM E1269 at 150° C. of 2.15 J/g·C or greater. Additionally, or alternatively, the fluid may have a specific heat capacity measured according to ASTM E1269 at 150° C. of 2.18 J/g·C to 2.3 J/g·C. Additionally, or alternatively, when the fluid is at a temperature of 0° C., the fluid may be substantially free of crystallized wax.

The fluid may be selected from a group consisting of: a base oil, a lubricant, a process fluid, a hydraulic fluid, an industrial fluid, an automotive fluid, and combination(s) thereof. Additionally, or alternatively, the fluid may be configured to resist oxidation in an oxidizing environment. The oxidizing environment may include a temperature of up to 250° F. (121° C.), or up to 302° F. (150° C.), or up to 325° F. (163° C.). The oxidizing environment may include air. The oxidizing environment may include water. Additionally, or alternatively, the fluid may be configured to resist forming deposits in an oxidizing environment. The oxidizing environment may include a temperature of up to 250° F. (121° C.), or up to 302° F. (150° C.), or up to 325° F. (163° C.). The oxidizing environment may include air. The oxidizing environment may include water. The fluid may be configured to resist forming deposits for at least 50 hours in the presence of a metal reagent at a temperature of up to 325° F. (163° C.). The metal reagent may be any one of copper, steel, iron, and combination(s) thereof.

Additionally, or alternatively, the fluid may have a kinematic viscosity at 100° C. (KV100) increase of 30% or less, 25% or less, 20% or less, or of about 5% to 15% measured according to an ASTM D5704 test. Additionally, or alternatively, the fluid may have an Average Carbon/Varnish rating as measured according to ASTM D5704 of from 8 to 10. Additionally, or alternatively, the fluid may have an Average Sludge rating as measured according to ASTM D5704 of from 8 to 10. Additionally, or alternatively, the fluid may have an Average Sludge rating as measured according to ASTM D5704 of from 9 to 10.

Additionally, or alternatively, the fluid may be configured to maintain fluidity in a low temperature environment. The fluid may have a MRV apparent viscosity measured according to ASTM D4684 at −15° C. of 17,000 mPa·s or less, 16,000 mPa·s or less, 15,000 mPa·s or less, or from 14,000 mPa·s to 15,000 mPa·s. Additionally, or alternatively, the fluid may have a Brookfield viscosity measured according to ASTM D2983 at −12° C. of 70,000 mPa·s or less, 60,000 mPa·s or less, 50,000 mPa·s or less, 40,000 mPa·s or less or from 30,000 mPa·s to 40,000 mPa·s. Additionally, or alternatively, the fluid may have a Brookfield viscosity measured according to ASTM D2983 at −26° C. of 150,000 mPa·s or less, 140,000 mPa·s or less, 130,000 mPa·s or less, 120,000 mPa·s or less, 110,000 mPa·s or less, 100,000 mPa·s or less, 90,000 mPa·s or less, 80,000 mPa·s or less or from 70,000 mPa·s to 80,000 mPa·s.

EXAMPLES

The foregoing benefits, and other benefits, of using Group II high viscosity base stocks in place of Group I base stock to formulate fluids are demonstrated in the following examples. Exemplary fluids blended with Group II base stocks of the present disclosure were tested for performance using a wide range of industry-standard bench and rig tests. Many performance benefits were observed in formulated fluids containing the new Group II high viscosity base stocks over blends containing Group I base stock. Additionally, other performance attributes were observed to be at least comparable to, and often better than, those of blends containing Group I base stock.

For the following examples, a Group II high viscosity base stock was derived from low severity deasphalting of resid fractions to form a deasphalted oil. The deasphalted oil was demetallated, hydrotreated, hydrocracked, hydrodewaxed, and hydrofinished to make a high saturates base stock in the same viscosity range as a traditional Group I bright stock.

Example 1: Paper Machine Oil; U.S. Steel Oxidation Test

In this example, a paper machine oil corresponding to the specifications of ISO 320 formulated with Group I bright stock (Sample 1) was tested for comparison against an equivalent paper machine oil corresponding to the specifications of ISO 320 formulated with a Group II high viscosity base stock of the present disclosure (Sample 2). In this example, the formulation of Sample 2 was very similar to that for Sample 1 except for the use of a Group II high viscosity base stock of the present disclosure in Sample 2 in place of the Group I bright stock of Sample 1. A minor adjustment in the amount of Group I Heavy Neutral base stock was made in order to match the viscometrics in the two formulated blends. Thus, the fluids of Samples 1 and 2 contained the same additives in the same proportions to the respective blended base stocks. Sample compositions are provided in Table 4.

TABLE 4

| | Sample 1 | Sample 2 |
|---|---|---|
| Group I High Viscosity Base Stock | 40 | |
| Group II High Viscosity Base Stock | | 43 |

TABLE 4-continued

|  | Sample 1 | Sample 2 |
| --- | --- | --- |
| Group I Heavy Neutral Base Stock | 48 | 45 |
| Additive Package | 12 | 12 |
| Total (wt %) | 100.0 | 100.0 |

Oxidation stability benefits of the samples were observed through the ASTM D2893 (U.S. Steel Oxidation) test. This test demonstrates an industrial lubricating oil's ability to resist oxidation at high temperature and in the presence of oxygen. The oil is subjected to 95-121° C. for 312 hours. The kinematic viscosity at 100° C. (KV100) of the oils was measured before and after the test; the viscosity increase provides an indication of the oil's resistance to oxidation. FIG. 1 illustrates the KV100 increase values for the two samples of this example. Sample 1 (fluid blended from Group I bright stock base) experienced a KV100 increase of 7%, whereas Sample 2 (fluid blended from a Group II high viscosity base stock of the present disclosure) experienced a KV100 increase of only 4%. An increase in KV100 in this test results from oxidation of the tested lubricant. Therefore, the greater the observed increase in KV100, the lesser the tested lubricant is resistant to oxidation. Thus, it may be desired for lubricants subjected to this test to demonstrate low values of KV100 increase. Here, Sample 2 experienced a KV100 increase much less than that experienced by Sample 1, and therefore Sample 2 is judged to possess a superior oxidation stability. Given that the only difference in the formulations between Sample 1 and Sample 2 was the type of base stock, it was concluded that the improved oxidation stability performance of Sample 2 resulted from the use of a Group II high viscosity base stock of the present disclosure in its formulation.

Example 2: Industrial Gear Oil; U.S. Steel Oxidation Test

In this example, an industrial gear oil corresponding to the specifications of ISO 460 formulated with Group I bright stock (Sample 3) was tested for comparison against the same industrial gear oil formulated with a Group II high viscosity base stock of the present disclosure (Sample 4). In this example, the formulation of Sample 4 was very similar to that for Sample 3 except for the use of a Group II high viscosity base stock of the present disclosure in Sample 4 in place of the Group I bright stock of Sample 3. A minor adjustment in the amount of Group I Heavy Neutral base stock was made in order to match the viscometrics in the two formulated blends. Thus, the fluids of Samples 3 and 4 contained the same additives in the same proportions to the respective blended base stocks. Sample compositions are provided in Table 5.

TABLE 5

|  | Sample 3 | Sample 4 |
| --- | --- | --- |
| Group I High Viscosity Base Stock | 95 |  |
| Group II High Viscosity Base Stock |  | 94 |
| Group I Heavy Neutral Base Stock | 3 | 4 |
| Additive Package | 1.7 | 1.7 |
| Pour Point Depressant | 0.3 | 0.3 |
| Total (wt %) | 100.0 | 100.0 |

Oxidation stability benefits of the samples were observed through the ASTM D2893 (U.S. Steel Oxidation) test. The test conditions were the same as those under which the tests in Example 1 were conducted. FIG. 1 illustrates the KV100 increase values for the two samples of this example. Sample 3 (fluid blended from Group I bright stock base) experienced a KV100 increase of 6%, whereas Sample 4 (fluid blended from a Group II high viscosity base stock of the present disclosure) experienced a KV100 increase of only 2%. Thus, Sample 4 experienced a KV100 increase much less than that experienced by Sample 3, and therefore Sample 4 is judged to possess a superior oxidation stability. Given that the only difference in the formulations between Sample 3 and Sample 4 was the type of base stock, it was concluded that the improved oxidation stability performance of Sample 4 resulted from the use of a Group II high viscosity base stock of the present disclosure in its formulation.

Example 3: Automotive Gear Oil; Brookfield Viscosity Test

In this example, an automotive gear oil corresponding to the specifications of 85W-140 formulated with Group I bright stock (Sample 5) was tested for comparison against an equivalent automotive gear oil corresponding to the specifications of 85W-140 formulated with a Group II high viscosity base stock (Sample 6). In this example, the formulation of Sample 6 was very similar to that for Sample 5 except for the use of a Group II high viscosity base stock of the present disclosure in Sample 6 in place of the Group I bright stock of Sample 5. A minor adjustment in the amount of Group I Low Viscosity base stock was made in order to match the viscometrics in the two formulated blends. Thus, the fluids of Samples 5 and 6 contained the same additives in the same proportions to the respective blended base stocks. Also in this example, an automotive gear oil corresponding to the specifications of 80W-90 formulated with Group I bright stock (Sample 7) was tested for comparison against an equivalent automotive gear oil corresponding to the specifications of 85W-140 formulated with a Group II high viscosity base stock of the present disclosure (Sample 8). In this example, the formulation of Sample 8 was very similar to that for Sample 7 except for the use of a Group II high viscosity base stock of the present disclosure in Sample 8 in place of the Group I bright stock of Sample 7. A minor adjustment in the amount of Group I Low Viscosity base stock was made in order to match the viscometrics in the two formulated blends. Thus, the fluids of Samples 7 and 8 contained the same additives in the same proportions to the respective blended base stocks. Sample compositions are provided in Table 6.

TABLE 6

|  | Sample 5 | Sample 6 | Sample 7 | Sample 8 |
| --- | --- | --- | --- | --- |
| Group I High Viscosity Base Stock | 90 |  | 59 |  |
| Group II High Viscosity Base Stock |  | 88 |  | 56 |
| Group I Low Viscosity Base Stock | 3 | 5 | 33 | 36 |
| Additive Package | 6.6 | 6.6 | 6.6 | 6.6 |
| Pour Point Depressant | 0.3 | 0.3 | 1.3 | 1.3 |
| Total (wt %) | 100.0 | 100.0 | 100.0 | 100.0 |

A low temperature test used for automotive gear oils, automatic transmission fluids, torque and tractor fluids, and industrial and automotive hydraulic oils is the ASTM D2983 Brookfield Viscosity test. In this test a sample is preheated and then allowed to come to room temperature. The sample is then cooled to a designated test temperature and then analyzed (along with a reference fluid) by a rotational viscometer. The test determines the sample's low shear rate viscosity at the designated test temperature. In this example, Samples 5 and 6 were tested at −12° C., and Samples 7 and 8 were tested at −26° C.

Figure 2:
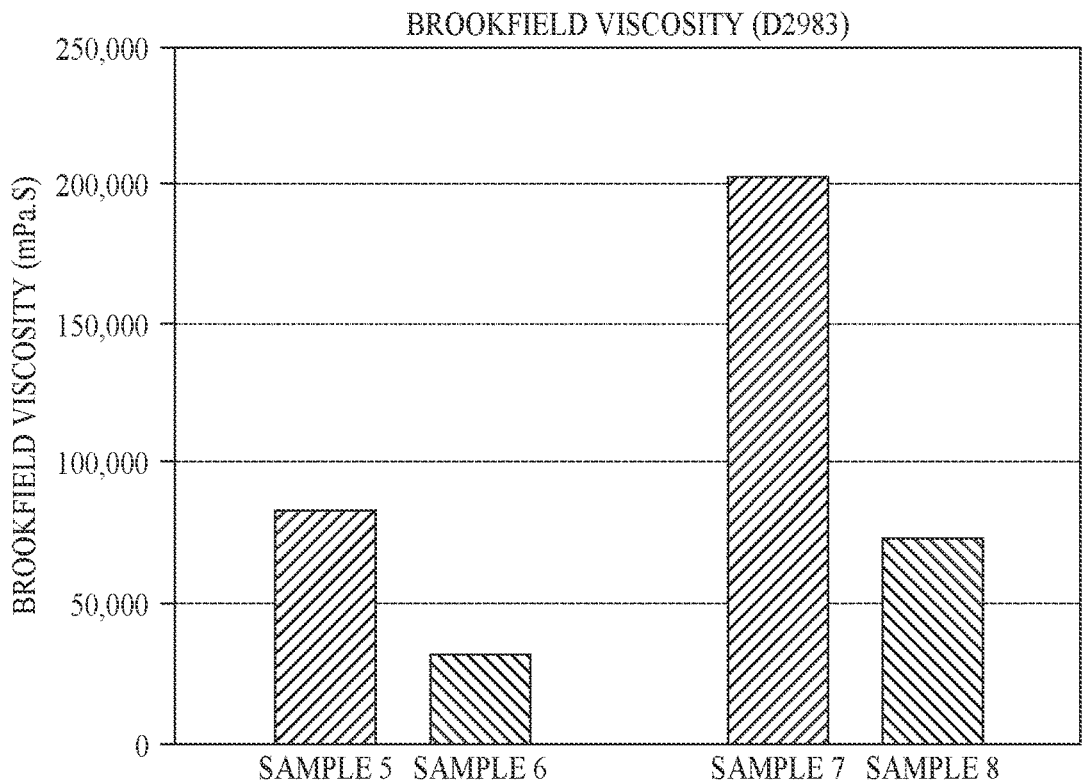
FIG. 2 is a graph illustrating comparative test results for fluids of the present disclosure and lubricants blended from a high viscosity Group I base stock, measured according to the ASTM D2983 Brookfield Viscosity Test, according to an embodiment.

FIG. 2 illustrates the Brookfield viscosity values for the four samples of this example. Sample 5 (fluid blended from Group I bright stock base) had a Brookfield viscosity of 83,600 mPa·s, whereas Sample 6 (fluid blended from a Group II high viscosity base stock of the present disclosure) had a Brookfield viscosity of 31,800 mPa·s. Thus, Sample 6 had a Brookfield viscosity much less than that of Sample 5, and therefore Sample 6 is judged to possess a superior low temperature performance. Given that the only difference in the formulations between Sample 5 and Sample 6 was the type of base stock, it was concluded that the improved low temperature performance of Sample 6 resulted from the use of a Group II high viscosity base stock of the present disclosure in its formulation.

Still with FIG. 2, Sample 7 (fluid blended from Group I bright stock base) had a Brookfield viscosity of 203,200 mPa·s, whereas Sample 8 (fluid blended from a Group II high viscosity base stock of the present disclosure) had a Brookfield viscosity of 74,400 mPa·s. Thus, Sample 8 had a Brookfield viscosity much less than that of Sample 7, and therefore Sample 8 is judged to possess a superior low temperature performance. Given that the only difference in the formulations between Sample 7 and Sample 8 was the type of base stock, it was concluded that the improved low temperature performance of Sample 8 resulted from the use of a Group II high viscosity base stock of the present disclosure in its formulation.

Example 4: Automotive Engine Oil; MRV Apparent Viscosity Test

In this example, an engine oil corresponding to the specifications of 25W-50 formulated with Group I bright stock (Sample 9) was tested for comparison against an equivalent engine oil corresponding to the specifications of 25W-50 formulated with a Group II high viscosity base stock of the present disclosure (Sample 10). In this example, the formulation of Sample 10 was very similar to that for Sample 9 except for the use of a Group II high viscosity base stock of the present disclosure in Sample 10 in place of the Group I bright stock of Sample 9. A minor adjustment in the amount of Group I Low Viscosity base stock was made in order to match the viscometrics in the two formulated blends. Thus, the fluids of Samples 9 and 10 contained the same additives in the same proportions to the respective base stocks. Sample compositions are provided in Table 7.

TABLE 7

| | Sample 9 | Sample 10 |
|---|---|---|
| Group I High Viscosity Base Stock | 54.5 | |
| Group II High Viscosity Base Stock | | 51.5 |
| Group I Low Viscosity Base Stock | 35.3 | 38.3 |
| Additive Package | 9.6 | 9.6 |
| Pour Point Depressant | 0.6 | 0.6 |
| Total (wt %) | 100.0 | 100.0 |

A low temperature test used for engine oils is the ASTM D4684 Mini-Rotary Viscometer (MRV) Apparent Viscosity test. This is a key test for automotive engine oils because it helps determine the viscosity grade and the capability for pumping the oil at low temperatures. This test is a low temperature, low shear test in which the oil is slowly cooled and then subjected to low shear viscosity testing. The cooling for Samples 9 and 10 was performed at a rate of 0.3° C. per hour in the range of −8 to −20° C., where most wax formation occurs. According to the SAE J300 engine oil classification standard, the test temperature for such 25W engine oil is at −15° C., and a passing standard is given as a maximum MRV apparent viscosity of 60,000 mPa·s.

Figure 3:
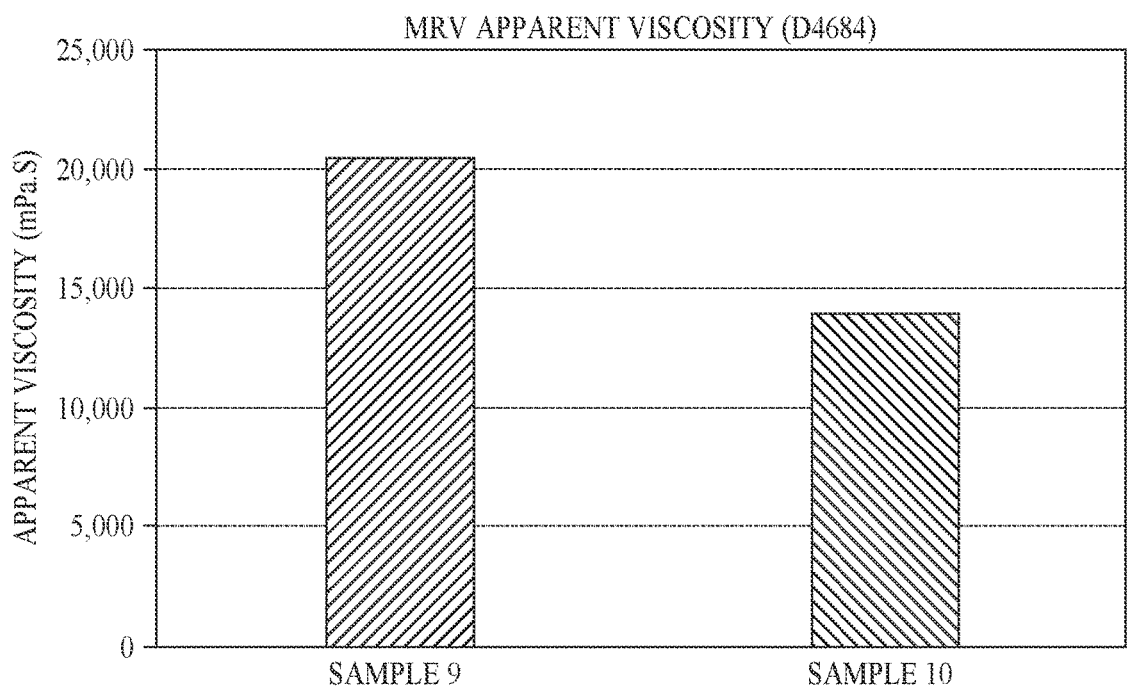
FIG. 3 is a graph illustrating comparative test results for a fluid of the present disclosure and a lubricant blended from a high viscosity Group I base stock, measured according to the ASTM D4684 MRV Apparent Viscosity Test, according to an embodiment.

FIG. 3 illustrates the MRV apparent viscosity values for the two samples of this example. Sample 9 (fluid blended from Group I bright stock base) had a MRV apparent viscosity of 20,500 mPa·s at a test temperature of −15° C., whereas Sample 10 (fluid blended from a Group II high viscosity base stock of the present disclosure) had a MRV viscosity of 14,000 mPa·s at the test temperature of −15° C. Thus, Sample 10 had a MRV apparent viscosity much less than that of Sample 9, and therefore Sample 10 is judged to possess a superior low temperature performance. Given that the only difference in the formulations between Sample 9 and Sample 10 was the type of base stock, it was concluded that the improved low temperature performance of Sample 10 resulted from the use of a Group II high viscosity base stock of the present disclosure in its formulation.

Example 5: Automotive Gear Oil; L-60-1 Rig Test

In this example, an automotive gear oil corresponding to the specifications of 85W-140 formulated with Group I bright stock (Sample 11) was tested for comparison against an equivalent automotive gear oil corresponding to the specifications of 85W-140 formulated with a new Group II high viscosity base stock (Sample 12). In this example, the formulation of Sample 12 was very similar to that for Sample 11 except for the use of a Group II high viscosity base stock of the present disclosure in Sample 12 in place of the Group I bright stock of Sample 11. A minor adjustment in the amount of Group I Low Viscosity base stock was made in order to match the viscometrics in the two formulated blends. Thus, the fluids of Samples 11 and 12 contained the same additives in the same proportions to the respective base stocks. Also in this example, another automotive gear oil corresponding to the specifications of 85W-140 formulated with Group I bright stock (Sample 13) was tested for comparison against another equivalent automotive gear oil corresponding to the specifications of 85W-140 formulated with a Group II high viscosity base stock of the present disclosure (Sample 14). In this example, the formulation of Sample 14 was the same as that for Sample 13 except for the use of a Group II high viscosity base stock of the present disclosure in Sample 14 in place of the Group I bright stock of Sample 13. Thus, the fluids of Samples 13 and 14 contained the same additives in the same proportions to the respective base stocks. Sample compositions are provided in Table 8.

TABLE 8

| | Sample 11 | Sample 12 | Sample 13 | Sample 14 |
|---|---|---|---|---|
| Group I High Viscosity Base Stock | 90.3 | | 92.7 | |
| Group II High Viscosity | | 87.5 | | 92.7 |

TABLE 8-continued

|  | Sample 11 | Sample 12 | Sample 13 | Sample 14 |
| --- | --- | --- | --- | --- |
| Base Stock | | | | |
| Group I Low Viscosity Base Stock | 2.7 | 5.5 | 2.0 | 2.0 |
| Additive Package | 6.7 | 6.7 | 4.5 | 4.5 |
| Pour Point Depressant | 0.3 | 0.3 | 0.8 | 0.8 |
| Total (wt %) | 100.0 | 100.0 | 100.0 | 100.0 |

Figure 4:
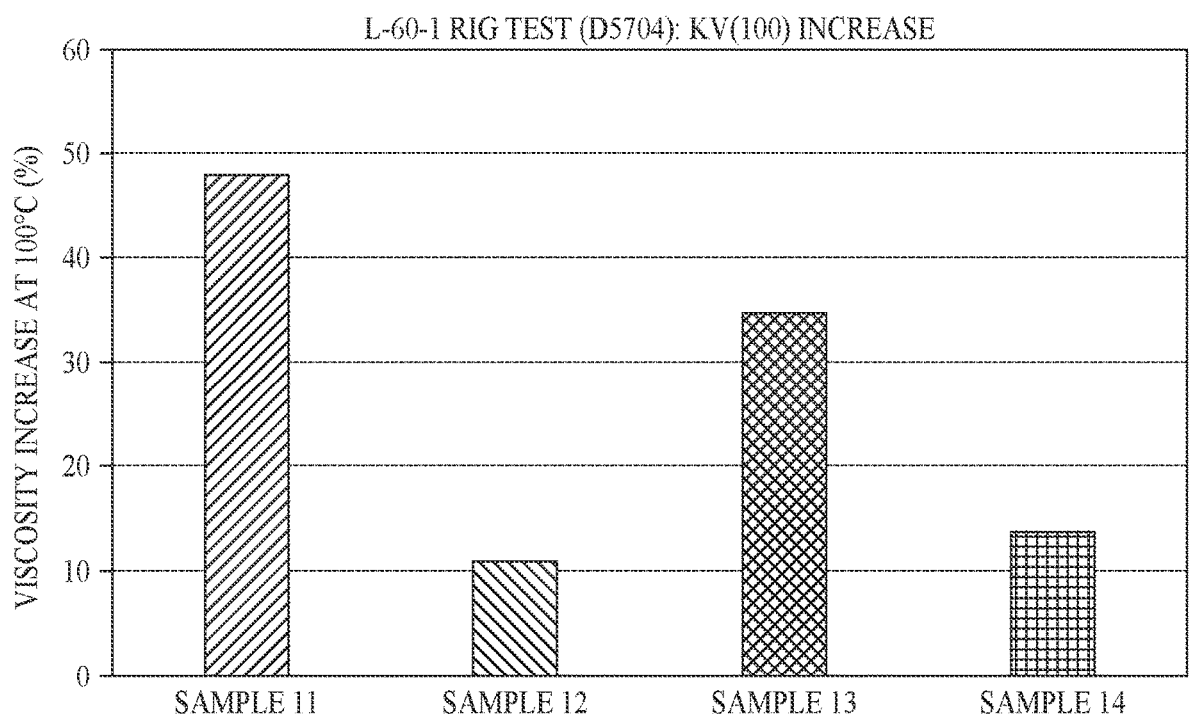
FIG. 4 is a graph illustrating comparative test results for fluids of the present disclosure and lubricants blended from a high viscosity Group I base stock, measured according to the ASTM D5704 L-60-1 Rig Test, according to an embodiment.

Samples 11, 12, 13, and 14 were subjected to the L-60-1 Rig Test (ASTM D5704), which examines the thermal and oxidative stability of automotive gear oils. Results of this test indicate the deposit control capabilities of automotive gear oil formulations. In this test, the sample oil and a catalyst are supplied into a gear box which is then heated to 325° F. (163° C.), and the test is run for 50 hours with the gears engaged. The kinematic viscosity at 100° C. (KV100) of the sample oil is measured before and after the test; the viscosity increase provides an indication of the oil's resistance to oxidation. FIG. 4 illustrates the KV100 increase values for the four samples of this example. Sample 11 (fluid blended from Group I bright stock base) experienced a KV100 increase of 48%, whereas Sample 12 (fluid blended from a Group II high viscosity base stock of the present disclosure) experienced a KV100 increase of only 11%. An increase in KV100 in this test results from oxidation of the tested lubricant. Therefore, the greater the observed increase in KV100, the lesser the tested lubricant is resistant to oxidation. Thus, it is desired for lubricants subjected to this test to demonstrate low values of KV100 increase. Here, Sample 12 experienced a KV100 increase much less than that experienced by Sample 11, and therefore Sample 12 is judged to possess a superior oxidation stability. Given that the only difference in the formulations between Sample 11 and Sample 12 was the type of base stock, it was concluded that the improved oxidation stability performance of Sample 12 resulted from the use of a Group II high viscosity base stock of the present disclosure in its formulation.

FIG. 4 illustrates also the KV100 increase values for Samples 13 and 14. Sample 13 (fluid blended from Group I bright stock base) experienced a KV100 increase of 35%, whereas Sample 14 (fluid blended from a Group II high viscosity base stock of the present disclosure) experienced a KV100 increase of only 14%. Sample 14 experienced a KV100 increase much less than that experienced by Sample 13, and therefore Sample 14 is judged to possess a superior oxidation stability. Given that the only difference in the formulations between Sample 13 and Sample 14 was the type of base stock, it was concluded that the improved oxidation stability performance of Sample 14 resulted from the use of a Group II high viscosity base stock of the present disclosure in its formulation.

The results provide also some insight into variations that might be expected between lubricants formulated from different batches of their components. For example, although both Sample 11 and Sample 13 had been formulated from Group I bright stock and exhibited properties consistent with the 85W-140 classification, the L-60-1 test results indicate that Sample 11 experienced greater degradation than did Sample 13. Similarly, Sample 12 and Sample 14—both formulated from a new Group II high viscosity base stock—experienced differing levels of degradation, though the difference here was less than that exhibited between Samples 11 and 13. Without being bound by any one particular theory, it is thought that such differences between apparently similar samples may be explained by any one or more of different additive chemicals within the additive packages, the differing concentrations of the additive packages, and/or detailed compositional differences between the base stocks.

Notwithstanding the above discussion, the results are consistent in that a like-for-like substitution of a Group II high viscosity base stock of the present disclosure in place of the Group I bright stock resulted in fluids having greater oxidation stability.

Figure 5:
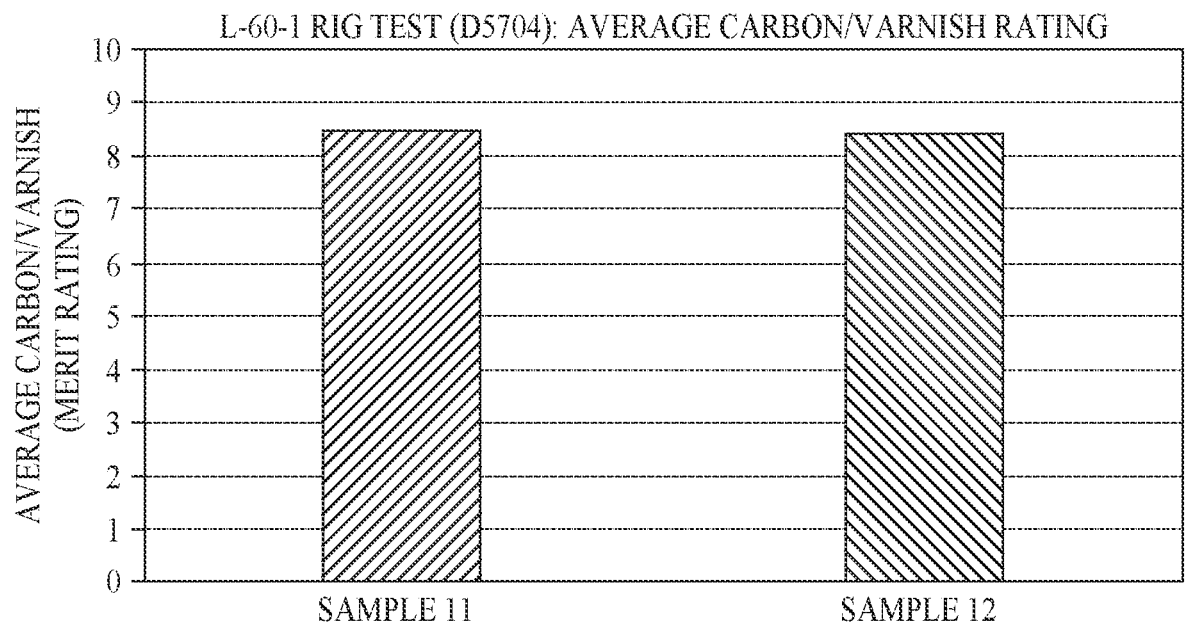
FIG. 5 is a graph illustrating additional comparative test results for a fluid of the present disclosure and a lubricant blended from a high viscosity Group I base stock, measured according to the ASTM D5704 L-60-1 Rig Test, according to an embodiment.
Figure 6:
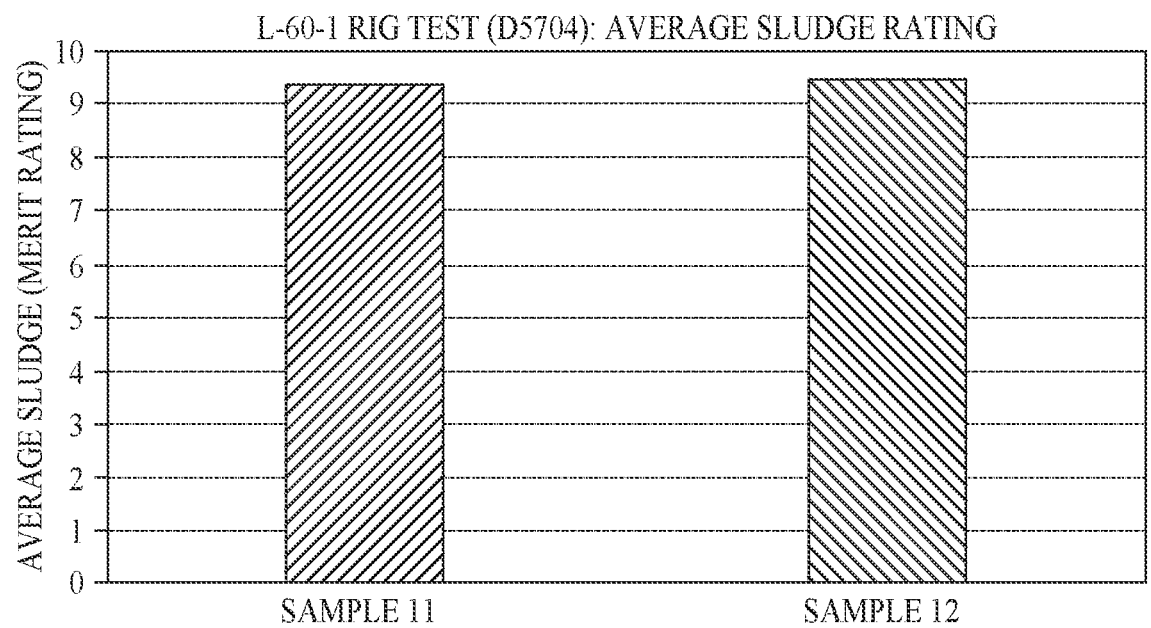
FIG. 6 is a graph illustrating additional comparative test results for a fluid of the present disclosure and a lubricant blended from a high viscosity Group I base stock, measured according to the ASTM D5704 L-60-1 Rig Test, according to an embodiment.

The L-60-1 rig test also has two key deposit testing parameters, a Carbon/Varnish Rating and a Sludge Rating. Samples 11 (fluid blended from Group I bright stock base) and 12 (fluid blended from a Group II high viscosity base stock of the present disclosure) were compared with respect to both ratings. Since Sample 11 contained a greater proportion of aromatics than Sample 12 by virtue of Sample 11's Group I bright stock base, it would be expected that Sample 11 would exhibit better Carbon/Varnish and Sludge ratings. Without being bound by any one particular theory, it is thought that the aromatics found in Group I base stocks provide solvency of early oxidation products and sludge, and thus the scarcity of aromatics in new Group II high viscosity base stock base would be expected to result in inferior deposit control. Nevertheless, as shown in FIGS. 5 and 6, respectively, Samples 11 and 12 exhibited virtually identical Carbon/Varnish and Sludge ratings. These results collectively indicate that lubricants formulated with a Group II high viscosity base stock of the present disclosure base in place of a Group I bright stock base possess greater oxidation stability without any loss of deposit control. Therefore, lubricants formulated with a Group II high viscosity base stock of the present disclosure base possess greater thermal stability than equivalent lubricants formulated with Group I bright stock.

Example 6: Automotive Gear Oil; Heat Transfer Tests

In this example, an automotive gear oil corresponding to the specifications of 85W-140 formulated with Group I bright stock (Sample 15) was tested for comparison against an equivalent automotive gear oil corresponding to the specifications of 85W-140 formulated with a new Group II high viscosity base stock (Sample 16). In this example, the formulation of Sample 16 was the same as that for Sample 15 except for the use of a Group II high viscosity base stock of the present disclosure in Sample 16 in place of the Group I bright stock of Sample 15. Thus, the fluids of Samples 15 and 16 contained the same additives in the same proportions to the respective base stocks. Additionally, Samples 17 and 18 were taken from the same batches as Samples 15 and 16, respectively. Sample compositions are provided in Table 9.

TABLE 9

|  | Sample 15 | Sample 16 | Sample 17 | Sample 18 |
| --- | --- | --- | --- | --- |
| Group I High Viscosity Base | 92.7 | — | 92.7 | — |
| Group II High Viscosity Base | — | 92.7 | — | 92.7 |
| Group I Low Viscosity Base | 2.0 | 2.0 | 2.0 | 2.0 |
| Additive Package | 4.5 | 4.5 | 4.5 | 4.5 |
| Pour Point Depressant | 0.8 | 0.8 | 0.8 | 0.8 |
| Total (wt %) | 100.0 | 100.0 | 100.0 | 100.0 |

Samples 15 and 16 were subjected to the ASTM D7896 test, which examines a liquid's thermal conductivity. Results of this test indicate the heat transfer capabilities of the sample formulations. In this test, a sensor is immersed in the sample oil, and an electrical current is applied for a very brief period. The passage of current through the wire causes the wire's temperature to rise due to resistive heating; this affects the wire's electrical resistance, which is measured over time in order to calculate the wire's temperature progression. The surrounding liquid's thermal conductivity is derived from the wire's rate of temperature rise. The sample's thermal conductivity is determined at a series of sample temperatures.

Figure 7:
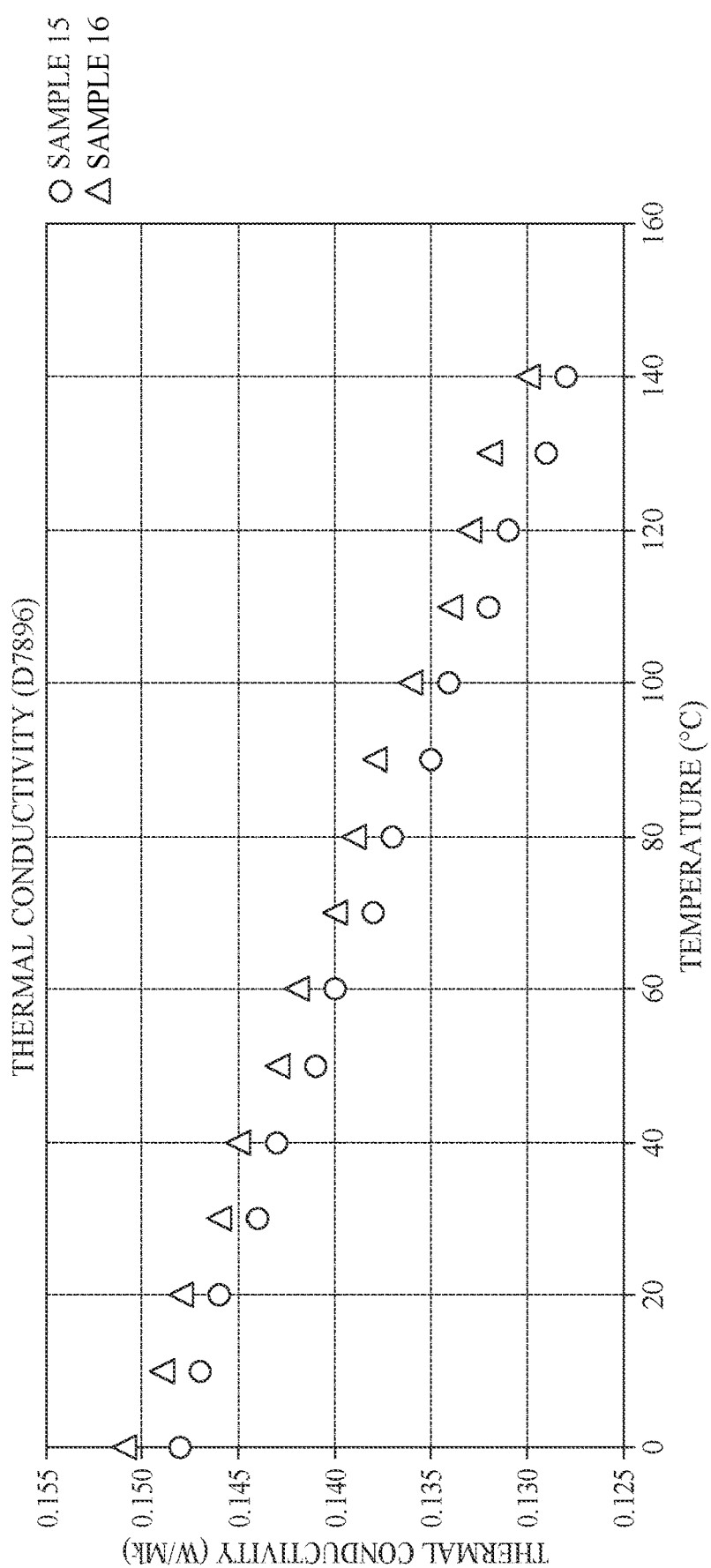
FIG. 7 is a graph illustrating comparative thermal conductivity test results for a fluid of the present disclosure and a lubricant blended from a high viscosity Group I base stock, measured according to the ASTM D7896 Test, according to an embodiment.

FIG. 7 illustrates the thermal conductivity values for the two samples of this example at sample temperatures from 0° C. to 140° C. While the testing had been conducted at temperatures within and outside the normal range for D7896, the trends of the results show the data to be representative of the samples' thermal conductivities at each temperature. Sample 15 (fluid blended from Group I bright stock base) had a thermal conductivity at every sample temperature consistently lower than that of Sample 16 (fluid blended from a Group II high viscosity base stock of the present disclosure). Therefore, Sample 16 was seen to possess a heat transfer capability superior to that of Sample 15. Given that the only difference in the formulations between Sample 15 and Sample 16 was the type of base stock, it was concluded that the improved thermal conductivity of Sample 16 resulted from the use of a Group II high viscosity base stock of the present disclosure in its formulation.

In an additional test, Sample 17, taken from the same batch as Sample 15 (fluid blended from Group I bright stock base), and Sample 18, taken from the same batch as Sample 16 (fluid blended from a Group II high viscosity base stock of the present disclosure), were subjected to the ASTM E1269 test, which examines a liquid's specific heat capacity. A sample of a Group II high viscosity base stock of the present disclosure base—Sample 19—was also tested. Results of this test indicate the heat absorption capabilities of the sample formulations. In this test, a sample's specific heat capacity is measured by differential scanning calorimetry at a series of sample temperatures.

Figure 8:
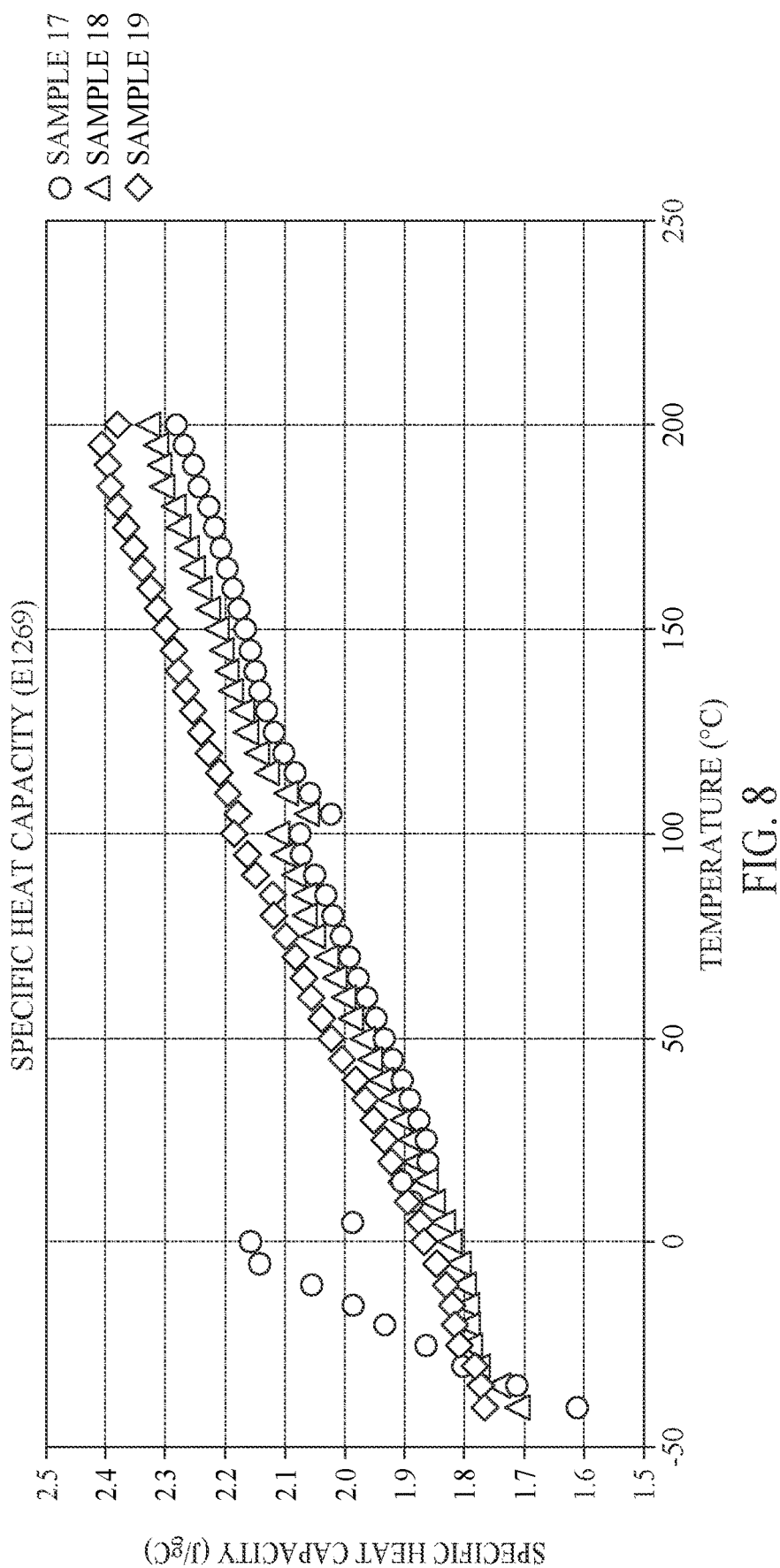
FIG. 8 is a graph illustrating comparative specific heat capacity test results for a fluid of the present disclosure and a lubricant blended from a high viscosity Group I base stock, measured according to the ASTM E1269 Test, according to an embodiment.

FIG. 8 illustrates the specific heat capacity values for the three samples of this example at sample temperatures from −40° C. to 200° C. At every temperature, Sample 19 (a Group II high viscosity base stock of the present disclosure in its pure form) had a specific heat capacity higher than that of Sample 18 (fluid blended from a Group II high viscosity base stock of the present disclosure). Without being bound by a particular theory, it is thought that the blending of a Group II high viscosity base stock of the present disclosure base with other components results in the blended mixture having a reduced specific heat capacity. At temperatures of 15° C. and higher, Sample 18 (fluid blended from a Group II high viscosity base stock of the present disclosure) had a specific heat capacity higher than that of Sample 17 (fluid blended from Group I bright stock). These data indicate that at those temperatures, Sample 18 possessed a specific heat capacity superior to that of Sample 17, in turn, indicating that Sample 18 possessed a superior heat absorption capacity to that of Sample 17. Given that the only difference in the formulations between Sample 17 and Sample 18 was the type of base stock, it was concluded that the improved heat absorption capacity of Sample 18 resulted from the use of a Group II high viscosity base stock of the present disclosure in its formulation.

FIG. 8 also indicates that from −30° C. to 15° C., the measured specific heat capacity of Sample 17 (fluid blended from Group I bright stock base) deviates sharply from the trend observed from 15° C. and higher, with a peak at around 0° C. Without being bound by a particular theory, it is thought that at least one constituent of Sample 17 underwent a phase change at these lower temperatures. It is speculated that such a phase change may have been the onset of wax crystallization. It is further speculated that the elevated values of specific heat capacity measured at the reported lower temperatures reflect the effect of such a phase change. Since, in practice, a phase change within a lubricant could be detrimental to the effectiveness of the lubricant for its intended functionality in other respects, the observed phase change indicates the lack of suitability of the fluid blended from Group I bright stock for applications at the indicated temperatures. Furthermore, it is noted that Sample 18 (fluid blended from a Group II high viscosity base stock of the present disclosure) did not exhibit a similar phase change. Given that the only difference in the formulations between Sample 17 and Sample 18 was the type of base stock, it was concluded that the superior and consistent specific heat capacity of Sample 18 resulted from the use of a Group II high viscosity base stock of the present disclosure in its formulation.

In addition, from 105° C. to 115° C., the measured specific heat capacities of both Samples 17 and 18 exhibit a sudden drop, followed by a recovery. It is noted that the measurements of Sample 19 (a Group II high viscosity base stock of the present disclosure in its pure form) did not exhibit this anomaly. Without being bound by a particular theory, it is thought that this anomaly in Samples 17 and 18 is due to the presence of water in the samples, which itself would undergo a phase change at or close to 100° C. The presence of water in Samples 17 and 18 despite the apparent lack of water in Sample 19 may be explained by the additives in Samples 17 and 18. These samples contain various additives. Several additives are polar molecules or comprise molecules having polar portions, and therefore these molecules have an affinity for water, and thus water likely was present with these additives at the time the additives were blended into the fluids of Samples 17 and 18. Nevertheless, the data indicate that despite the apparent anomaly at the noted temperatures, Sample 18 (fluid blended from a Group II high viscosity base stock of the present disclosure) possessed a superior specific heat capacity than did Sample 17 (fluid blended from Group I bright stock). Given that the only difference in the formulations between Sample 17 and Sample 18 was the type of base stock, it was concluded that the consistent superior specific heat capacity of Sample 18 resulted from the use of a Group II high viscosity base stock of the present disclosure in its formulation.

Thus, Sample 18 was seen to possess superior thermal transfer properties to Sample 17, not only with respect to its capability to transfer heat (thermal conductivity), but also with respect to its capability to absorb heat (specific heat capacity). Therefore, Sample 18, being a fluid formulated with a Group II high viscosity base stock of the present disclosure, represents a lubricant that is more suitable than one formulated with Group I bright stock for electric vehicle applications in which a lubricant is needed for heat removal in addition to its normal lubrication function.

Additional Embodiments

The present disclosure provides, among others, the following embodiments, each of which may be considered as optionally including any alternative embodiments.

Embodiment 1. A method of using a fluid in an electric vehicle, the method comprising: contacting the fluid with a drive train within the electric vehicle, wherein: the fluid comprises a base stock and one or more additives; the base stock has a T10 distillation point of at least 482° C., a viscosity index of at least 80, and either a kinematic viscosity at 40° C. of at least 320 cSt or a kinematic viscosity at 100° C. of at least 14 cSt; and comprises: greater than or equal to about 90 wt % saturates, less than or equal to about 10 wt % aromatics, and a sum of terminal/pendant propyl groups and terminal/pendant ethyl groups of at least 1.7 per 100 carbon atoms; and the fluid has a thermal conductivity measured according to ASTM D7896 at 140° C. of greater than 0.12 W/m·K.

Embodiment 2. The method of Embodiment 1, further comprising contacting the fluid with an electric traction motor within the electric vehicle.

Embodiment 3. The method of Embodiment 2, wherein the fluid is configured to absorb heat from the electric traction motor.

Embodiment 4. The method of any of the above embodiments, wherein the fluid has a thermal conductivity measured according to ASTM D7896 at 140° C. of from 0.12 W/m·K to 0.135 W/m·K.

Embodiment 5. The method of any of the above embodiments, wherein the fluid has a thermal conductivity measured according to ASTM D7896 at 0° C. of from 0.14 W/m·K to 0.155 W/m·K.

Embodiment 6. The method of any of the above embodiments, wherein the fluid has a specific heat capacity measured according to ASTM E1269 at 150° C. of from 2.1 J/g·C to 2.3 J/g·C.

Embodiment 7. The method of any of the above embodiments, wherein when the fluid is at a temperature of 0° C., the fluid is substantially free of crystallized wax.

Embodiment 8. The method of any of the above embodiments, wherein the fluid has an oxidation performance indicated by a kinematic viscosity at 100° C. (KV100) increase measured according to ASTM D5704 of 30% or less.

Embodiment 9. The method of any of the above embodiments, wherein the fluid has an oxidation performance indicated by a kinematic viscosity at 100° C. (KV100) increase measured according to ASTM D5704 of 20% or less.

Embodiment 10. The method of any of the above embodiments, wherein the fluid has an oxidation performance indicated by a kinematic viscosity at 100° C. (KV100) increase measured according to ASTM D5704 of 15% or less.

Embodiment 11. The method of any of the above embodiments, wherein the fluid has an Average Carbon/Varnish rating as measured under ASTM D5704 of from 8 to 10.

Embodiment 12. The method of any of the above embodiments, wherein the fluid has an Average Sludge rating as measured under ASTM D5704 of from 8 to 10.

Embodiment 13. The method of any of the above embodiments, wherein the fluid has an Average Sludge rating as measured under ASTM D5704 of from 9 to 10.

Embodiment 14. The method of any of the above embodiments, wherein the fluid has a Brookfield viscosity measured according to ASTM D2983 of 70,000 mPa·s or less at −12° C.

Embodiment 15. The method of any of the above embodiments, wherein the fluid has a Brookfield viscosity measured according to ASTM D2983 of from 30,000 mPa·s to 40,000 mPa·s at −12° C.

Embodiment 16. The method of any of the above embodiments, wherein the fluid has a Brookfield viscosity measured according to ASTM D2983 of 150,000 mPa·s or less at −26° C.

Embodiment 17. The method of any of the above embodiments, wherein the fluid has a Brookfield viscosity measured according to ASTM D2983 of from 70,000 mPa·s to 100,000 mPa·s at −26° C.

Embodiment 18. The method of any of the above embodiments, wherein the fluid has a pour point depressant additive content of 0.7 wt % or less.

Embodiment 19. The method of any of the above embodiments, wherein the fluid has a pour point depressant additive content of 0.3 wt % or less.

Embodiment 20. The method of any of the above embodiments, wherein the fluid has a polyalphaolefin content of 10 wt % or less.

Embodiment 21. The method of any of the above embodiments, wherein the fluid has a polyalphaolefin content of 5 wt % or less.

Embodiment 22. The method of any of the above embodiments, wherein the fluid has a polyalphaolefin content of from 0.01 wt % to 1 wt %.

Embodiment 23. The method of any of the above embodiments, wherein the base stock has a viscosity index of from 80 to 120.

Embodiment 24. The method of any of the above embodiments, wherein the fluid has a viscosity index improver additive content of 5 wt % or less.

Embodiment 25. The method of any of the above embodiments, wherein the fluid has a viscosity index improver additive content of from 0.01 wt % to 1 wt %.

Embodiment 26. The method of any of the above embodiments, wherein the fluid has a viscosity index improver additive selected from a group consisting of: polyacrylates, polymers of methacrylate, polymers of butadiene, polymers of olefins, polymers of alkylated styrenes, copolymers of methacrylate, copolymers of butadiene, copolymers of olefins, copolymers of alkylated styrenes, copolymers of ethylene, copolymers of propylene, hydrogenated block copolymers of styrene, hydrogenated block copolymers of isoprene, and combination(s) thereof.

Embodiment 27. The method of any of the above embodiments, wherein the fluid has a saturates content of at least 70 wt %.

Embodiment 28. The method of any of the above embodiments, wherein the fluid has a saturates content of at least 80 wt %.

Embodiment 29. The method of any of the above embodiments, wherein the fluid has an antioxidant additive content of 0.1 wt % or less.

Embodiment 30. The method of any of the above embodiments, wherein the fluid has an antioxidant additive content of from 0.01 wt % to 0.05 wt %.

Embodiment 31. A method for improving heat transfer performance of a fluid, the method comprising: blending a base stock and one or more additives to form the fluid, wherein: the base stock has a T10 distillation point of at least 482° C., a viscosity index of at least 80, and either a kinematic viscosity at 40° C. of at least 320 cSt or a kinematic viscosity at 100° C. of at least 14 cSt; and comprises: greater than or equal to about 90 wt % saturates, less than or equal to about 10 wt % aromatics, and a sum of terminal/pendant propyl groups and terminal/pendant ethyl groups of at least 1.7 per 100 carbon atoms; and the fluid has a thermal conductivity measured according to ASTM D7896 at 140° C. of greater than 0.12 W/m·K.

Embodiment 32. The method of Embodiment 31, wherein the fluid has a thermal conductivity measured according to ASTM D7896 at 140° C. of from 0.12 W/m·K to 0.135 W/m·K.

Embodiment 33. The method of any of Embodiments 31 to 32, wherein the fluid has a thermal conductivity measured according to ASTM D7896 at 0° C. of from 0.14 W/m·K to 0.155 W/m·K.

Embodiment 34. The method of any of Embodiments 31 to 33, wherein the fluid has a specific heat capacity measured according to ASTM E1269 at 150° C. of from 2.1 J/g·C to 2.3 J/g·C.

Embodiment 35. The method of any of Embodiments 31 to 34, wherein when the fluid is at a temperature of 0° C., the fluid is substantially free of crystallized wax.

Embodiment 36. The method of any of Embodiments 31 to 35, wherein the fluid has an oxidation performance indicated by a kinematic viscosity at 100° C. (KV100) increase measured according to ASTM D5704 of 30% or less.

Embodiment 37. The method of any of Embodiments 31 to 36, wherein the fluid has an oxidation performance indicated by a kinematic viscosity at 100° C. (KV100) increase measured according to ASTM D5704 of 20% or less.

Embodiment 38. The method of any of Embodiments 31 to 37, wherein the fluid has an oxidation performance indicated by a kinematic viscosity at 100° C. (KV100) increase measured according to ASTM D5704 of 15% or less.

Embodiment 39. The method of any of Embodiments 31 to 38, wherein the fluid has an Average Carbon/Varnish rating as measured under ASTM D5704 of from 8 to 10.

Embodiment 40. The method of any of Embodiments 31 to 39, wherein the fluid has an Average Sludge rating as measured under ASTM D5704 of from 8 to 10.

Embodiment 41. The method of any of Embodiments 31 to 40, wherein the fluid has an Average Sludge rating as measured under ASTM D5704 of from 9 to 10.

Embodiment 42. The method of any of Embodiments 31 to 41, wherein the fluid has a Brookfield viscosity measured according to ASTM D2983 of 70,000 mPa·s or less at −12° C.

Embodiment 43. The method of any of Embodiments 31 to 42, wherein the fluid has a Brookfield viscosity measured according to ASTM D2983 of from 30,000 mPa·s to 40,000 mPa·s at −12° C.

Embodiment 44. The method of any of Embodiments 31 to 43, wherein the fluid has a Brookfield viscosity measured according to ASTM D2983 of 150,000 mPa·s or less at −26° C.

Embodiment 45. The method of any of Embodiments 31 to 44, wherein the fluid has a Brookfield viscosity measured according to ASTM D2983 of from 70,000 mPa·s to 100,000 mPa·s at −26° C.

Embodiment 46. The method of any of Embodiments 31 to 45, wherein the fluid has a pour point depressant additive content of 0.7 wt % or less.

Embodiment 47. The method of any of Embodiments 31 to 46, wherein the fluid has a pour point depressant additive content of 0.3 wt % or less.

Embodiment 48. The method of any of Embodiments 31 to 47, wherein the fluid has a polyalphaolefin content of 10 wt % or less.

Embodiment 49. The method of any of Embodiments 31 to 48, wherein the fluid has a polyalphaolefin content of 5 wt % or less.

Embodiment 50. The method of any of Embodiments 31 to 49, wherein the fluid has a polyalphaolefin content of from 0.01 wt % to 1 wt %.

Embodiment 51. The method of any of Embodiments 31 to 50, wherein the base stock has a viscosity index of from 80 to 120.

Embodiment 52. The method of any of Embodiments 31 to 51, wherein the fluid has a viscosity index improver additive content of 5 wt % or less.

Embodiment 53. The method of any of Embodiments 31 to 52, wherein the fluid has a viscosity index improver additive content of from 0.01 wt % to 1 wt %.

Embodiment 54. The method of any of Embodiments 31 to 53, wherein the fluid has a viscosity index improver selected from a group consisting of: polyacrylates, polymers of methacrylate, polymers of butadiene, polymers of olefins, polymers of alkylated styrenes, copolymers of methacrylate, copolymers of butadiene, copolymers of olefins, copolymers of alkylated styrenes, copolymers of ethylene, copolymers of propylene, hydrogenated block copolymers of styrene, hydrogenated block copolymers of isoprene, and combination(s) thereof.

Embodiment 55. The method of any of Embodiments 31 to 54, wherein the fluid has a saturates content of at least 70 wt %.

Embodiment 56. The method of any of Embodiments 31 to 55, wherein the fluid has a saturates content of at least 80 wt %.

Embodiment 57. The method of any of Embodiments 31 to 56, wherein the fluid has an antioxidant additive content of 0.1 wt % or less.

Embodiment 58. The method of any of Embodiments 31 to 57, wherein the fluid has an antioxidant additive content of from 0.01 wt % to 0.05 wt %.

Embodiment 59. A fluid comprising: a base stock and one or more additives, wherein: the base stock has a T10 distillation point of at least 482° C., a viscosity index of at least 80, and either a kinematic viscosity at 40° C. of at least 320 cSt or a kinematic viscosity at 100° C. of at least 14 cSt; and comprises: greater than or equal to about 90 wt % saturates, less than or equal to about 10 wt % aromatics, and a sum of terminal/pendant propyl groups and terminal/pendant ethyl groups of at least 1.7 per 100 carbon atoms; and the fluid has a thermal conductivity measured according to ASTM D7896 at 140° C. of greater than 0.12 W/m·K.

Embodiment 60. The fluid of Embodiment 59, wherein the fluid has a thermal conductivity measured according to ASTM D7896 at 140° C. of from 0.12 W/m·K to 0.135 W/m·K.

Embodiment 61. The fluid of any of Embodiments 59 to 60, wherein the fluid has a thermal conductivity measured according to ASTM D7896 at 0° C. of from 0.14 W/m·K to 0.155 W/m·K.

Embodiment 62. The fluid of any of Embodiments 59 to 61, wherein the fluid has a specific heat capacity measured according to ASTM E1269 at 150° C. of from 2.1 J/g·C to 2.3 J/g·C.

Embodiment 63. The fluid of any of Embodiments 59 to 62, wherein when the fluid is at a temperature of 0° C., the fluid is substantially free of crystallized wax.

Embodiment 64. The fluid of any of Embodiments 59 to 63, wherein the fluid has an oxidation performance indicated by a kinematic viscosity at 100° C. (KV100) increase measured according to ASTM D5704 of 30% or less.

Embodiment 65. The fluid of any of Embodiments 59 to 64, wherein the fluid has an oxidation performance indicated by a kinematic viscosity at 100° C. (KV100) increase measured according to ASTM D5704 of 20% or less.

Embodiment 66. The fluid of any of Embodiments 59 to 65, wherein the fluid has an oxidation performance indicated by a kinematic viscosity at 100° C. (KV100) increase measured according to ASTM D5704 of 15% or less.

Embodiment 67. The fluid of any of Embodiments 59 to 66, wherein the fluid has an Average Carbon/Varnish rating as measured under ASTM D5704 of from 8 to 10.

Embodiment 68. The fluid of any of Embodiments 59 to 67, wherein the fluid has an Average Sludge rating as measured under ASTM D5704 of from 8 to 10.

Embodiment 69. The fluid of any of Embodiments 59 to 68, wherein the fluid has an Average Sludge rating as measured under ASTM D5704 of from 9 to 10.

Embodiment 70. The fluid of any of Embodiments 59 to 69, wherein the fluid has a Brookfield viscosity measured according to ASTM D2983 of 70,000 mPa·s or less at −12° C.

Embodiment 71. The fluid of any of Embodiments 59 to 70, wherein the fluid has a Brookfield viscosity measured according to ASTM D2983 of from 30,000 mPa·s to 40,000 mPa·s at −12° C.

Embodiment 72. The fluid of any of Embodiments 59 to 71, wherein the fluid has a Brookfield viscosity measured according to ASTM D2983 of 150,000 mPa·s or less at −26° C.

Embodiment 73. The fluid of any of Embodiments 59 to 72, wherein the fluid has a Brookfield viscosity measured according to ASTM D2983 of from 70,000 mPa·s to 100,000 mPa·s at −26° C.

Embodiment 74. The fluid of any of Embodiments 59 to 73, wherein the fluid has a pour point depressant additive content of 0.7 wt % or less.

Embodiment 75. The fluid of any of Embodiments 59 to 74, wherein the fluid has a pour point depressant additive content of 0.3 wt % or less.

Embodiment 76. The fluid of any of Embodiments 59 to 75, wherein the fluid has a polyalphaolefin content of 10 wt % or less.

Embodiment 77. The fluid of any of Embodiments 59 to 76, wherein the fluid has a polyalphaolefin content of 5 wt % or less.

Embodiment 78. The fluid of any of Embodiments 59 to 77, wherein the fluid has a polyalphaolefin content of from 0.01 wt % to 1 wt %.

Embodiment 79. The fluid of any of Embodiments 59 to 78, wherein the base stock has a viscosity index of from 80 to 120.

Embodiment 80. The fluid of any of Embodiments 59 to 79, wherein the fluid has a viscosity index improver additive content of 5 wt % or less.

Embodiment 81. The fluid of any of Embodiments 59 to 80, wherein the fluid has a viscosity index improver additive content of from 0.01 wt % to 1 wt %.

Embodiment 82. The fluid of any of Embodiments 59 to 81, wherein the fluid has a viscosity index improver selected from a group consisting of: polyacrylates, polymers of methacrylate, polymers of butadiene, polymers of olefins, polymers of alkylated styrenes, copolymers of methacrylate, copolymers of butadiene, copolymers of olefins, copolymers of alkylated styrenes, copolymers of ethylene, copolymers of propylene, hydrogenated block copolymers of styrene, hydrogenated block copolymers of isoprene, and combination(s) thereof.

Embodiment 83. The fluid of any of Embodiments 59 to 82, wherein the fluid has a saturates content of at least 70 wt %.

Embodiment 84. The fluid of any of Embodiments 59 to 83, wherein the fluid has a saturates content of at least 80 wt %.

Embodiment 85. The fluid of any of Embodiments 59 to 84, wherein the fluid has an antioxidant additive content of 0.1 wt % or less.

Embodiment 86. The fluid of any of Embodiments 59 to 85, wherein the fluid has an antioxidant additive content of from 0.01 wt % to 0.05 wt %.

Embodiment 87. A fluid comprising: a base stock and one or more additives, wherein: the base stock has a viscosity index of at least 80, and either a kinematic viscosity at 40° C. of at least 320 cSt or a kinematic viscosity at 100° C. of at least 14 cSt; and comprises: greater than or equal to about 90 wt % saturates, less than or equal to about 10 wt % aromatics, and a sum of terminal/pendant propyl groups and terminal/pendant ethyl groups of at least 1.7 per 100 carbon atoms; and the fluid has a thermal conductivity measured according to ASTM D7896 at 140° C. of greater than 0.12 W/m·K.

Embodiment 88. The fluid of Embodiment 87, wherein the fluid has a thermal conductivity measured according to ASTM D7896 at 140° C. of 0.12 W/m·K or greater.

Embodiment 89. The fluid of any of Embodiments 87 to 88, wherein the fluid has a thermal conductivity measured according to ASTM D7896 at 140° C. of 0.125 W/m·K or greater.

Embodiment 90. The fluid of any of Embodiments 87 to 89, wherein the fluid has a thermal conductivity measured according to ASTM D7896 at 140° C. of 0.128 W/m·K to 0.135 W/m·K.

Embodiment 91. The fluid of any of Embodiments 87 to 90, wherein the fluid has a thermal conductivity measured according to ASTM D7896 at 0° C. of 0.14 W/m·K or greater.

Embodiment 92. The fluid of any of Embodiments 87 to 91, wherein the fluid has a thermal conductivity measured according to ASTM D7896 at 0° C. of 0.145 W/m·K or greater.

Embodiment 93. The fluid of any of Embodiments 87 to 92, wherein the fluid has a thermal conductivity measured according to ASTM D7896 at 0° C. of 0.148 W/m·K to 0.155 W/m·K.

Embodiment 94. The fluid of any of Embodiments 87 to 93, wherein the fluid has a specific heat capacity measured according to ASTM E1269 at 150° C. of 2.1 J/g·C or greater.

Embodiment 95. The fluid of any of Embodiments 87 to 94, wherein the fluid has a specific heat capacity measured according to ASTM E1269 at 150° C. of 2.15 J/g·C or greater.

Embodiment 96. The fluid of any of Embodiments 87 to 95, wherein the fluid has a specific heat capacity measured according to ASTM E1269 at 150° C. of 2.18 J/g·C to 2.3 J/g·C.

Embodiment 97. The fluid of any of Embodiments 87 to 96, wherein when the fluid is at a temperature of 0° C., the fluid is substantially free of crystallized wax.

Embodiment 98. The fluid of any of Embodiments 87 to 97, wherein the fluid is selected from a group consisting of: a base oil, a lubricant, a process fluid, a hydraulic fluid, an industrial fluid, an automotive fluid, and combination(s) thereof.

Embodiment 99. The fluid of any of Embodiments 87 to 98, wherein the fluid is configured to resist oxidation, or resist forming deposits, or resist oxidation and resist forming deposits in an oxidizing environment.

Embodiment 100. The fluid of Embodiments 99, wherein the oxidizing environment includes a temperature of up to 250° F. (121° C.).

Embodiment 101. The fluid of any of Embodiments 99 to 100, wherein the oxidizing environment includes a temperature of up to 302° F. (150° C.).

Embodiment 102. The fluid of any of Embodiments 99 to 101, wherein the oxidizing environment includes a temperature of up to 325° F. (163° C.).

Embodiment 103. The fluid of any of Embodiments 99 to 102, wherein the oxidizing environment includes air.

Embodiment 104. The fluid of any of Embodiments 99 to 103, wherein the oxidizing environment includes water.

Embodiment 105. The fluid of any of Embodiments 99 to 104, wherein the fluid is configured to resist forming deposits for at least 50 hours in the presence of a metal reagent at a temperature of up to 325° F. (163° C.).

Embodiment 106. The fluid of Embodiment 105, wherein the metal reagent is any one of copper, steel, iron, and combination(s) thereof.

Embodiment 107. The fluid of any of Embodiments 87 to 106, wherein the fluid has a kinematic viscosity at 100° C. (KV100) increase of 30% or less, 25% or less, 20% or less, or of about 5% to 15% measured according to an ASTM D5704 test.

Embodiment 108. The fluid of any of Embodiments 87 to 107, wherein the fluid has an Average Carbon/Varnish rating as measured according to ASTM D5704 of from 8 to 10.

Embodiment 109. The fluid of any of Embodiments 87 to 108, wherein the fluid has an Average Sludge rating as measured according to ASTM D5704 of from 8 to 10.

Embodiment 110. The fluid of any of Embodiments 87 to 109, wherein the fluid has an Average Sludge rating as measured according to ASTM D5704 of from 9 to 10.

Embodiment 111. The fluid of any of Embodiments 87 to 110, wherein the fluid is configured to maintain fluidity in a low temperature environment.

Embodiment 112. The fluid of any of Embodiments 87 to 111, wherein the fluid has a MRV apparent viscosity measured according to ASTM D4684 at −15° C. of 17,000 mPa·s or less.

Embodiment 113. The fluid of any of Embodiments 87 to 112, wherein the fluid has a MRV apparent viscosity measured according to ASTM D4684 at −15° C. of 16,000 mPa·s or less.

Embodiment 114. The fluid of any of Embodiments 87 to 113, wherein the fluid has a MRV apparent viscosity measured according to ASTM D4684 at −15° C. of 15,000 mPa·s or less.

Embodiment 115. The fluid of any of Embodiments 87 to 114, wherein the fluid has a MRV apparent viscosity measured according to ASTM D4684 at −15° C. of from 14,000 mPa·s to 15,000 mPa·s.

Embodiment 116. The fluid of any of Embodiments 87 to 115, wherein the fluid has a Brookfield viscosity measured according to ASTM D2983 at −12° C. of 70,000 mPa·s or less.

Embodiment 117. The fluid of any of Embodiments 87 to 116, wherein the fluid has a Brookfield viscosity measured according to ASTM D2983 at −12° C. of 60,000 mPa·s or less.

Embodiment 118. The fluid of any of Embodiments 87 to 117, wherein the fluid has a Brookfield viscosity measured according to ASTM D2983 at −12° C. of 50,000 mPa·s or less.

Embodiment 119. The fluid of any of Embodiments 87 to 118, wherein the fluid has a Brookfield viscosity measured according to ASTM D2983 at −12° C. of 40,000 mPa·s or less.

Embodiment 120. The fluid of any of Embodiments 87 to 119, wherein the fluid has a Brookfield viscosity measured according to ASTM D2983 at −12° C. of from 30,000 mPa·s to 40,000 mPa·s.

Embodiment 121. The fluid of any of Embodiments 87 to 120, wherein the fluid has a Brookfield viscosity measured according to ASTM D2983 at −26° C. of 150,000 mPa·s or less.

Embodiment 122. The fluid of any of Embodiments 87 to 121, wherein the fluid has a Brookfield viscosity measured according to ASTM D2983 at −26° C. of 140,000 mPa·s or less.

Embodiment 123. The fluid of any of Embodiments 87 to 122, wherein the fluid has a Brookfield viscosity measured according to ASTM D2983 at −26° C. of 130,000 mPa·s or less.

Embodiment 124. The fluid of any of Embodiments 87 to 123, wherein the fluid has a Brookfield viscosity measured according to ASTM D2983 at −26° C. of 120,000 mPa·s or less.

Embodiment 125. The fluid of any of Embodiments 87 to 124, wherein the fluid has a Brookfield viscosity measured according to ASTM D2983 at −26° C. of 110,000 mPa·s or less.

Embodiment 126. The fluid of any of Embodiments 87 to 125, wherein the fluid has a Brookfield viscosity measured according to ASTM D2983 at −26° C. of 100,000 mPa·s or less.

Embodiment 127. The fluid of any of Embodiments 87 to 126, wherein the fluid has a Brookfield viscosity measured according to ASTM D2983 at −26° C. of 90,000 mPa·s or less.

Embodiment 128. The fluid of any of Embodiments 87 to 127, wherein the fluid has a Brookfield viscosity measured according to ASTM D2983 at −26° C. of 80,000 mPa·s or less.

Embodiment 129. The fluid of any of Embodiments 87 to 128, wherein the fluid has a Brookfield viscosity measured according to ASTM D2983 at −26° C. of from 70,000 mPa·s to 80,000 mPa·s.

Embodiment 130. A method comprising: cooling a surface within an electrical machine by causing a fluid to contact the surface, wherein the fluid is the fluid of any of Embodiments 87 to 129.

Embodiment 131. The method of Embodiment 130, wherein the electrical machine is an electric vehicle.

Embodiment 132. The method of any of Embodiments 130 to 131, wherein the surface is part of a drivetrain.

Embodiment 133. The method of any of Embodiments 131 to 132, further comprising causing the fluid to contact an electric traction motor within the electric vehicle.

Embodiment 134. The method of any of Embodiments 130 to 131, wherein the surface is part of a battery pack.

Embodiment 135. The method of Embodiment 134, further comprising causing the fluid to directly contact the battery pack.

Embodiment 136. The method of Embodiment 135, further comprising causing the fluid to directly contact battery cells within the battery pack.

Embodiment 137. The method of Embodiment 136, further comprising immersing the battery cells in the fluid.

Embodiment 138. A method for producing a deposit resistant fluid comprising: combining a base stock and one or more additives to form a blended fluid configured to resist forming deposits in an oxidizing environment; wherein: the base stock has a viscosity index of at least 80, and either a kinematic viscosity at 40° C. of at least 320 cSt, or a kinematic viscosity at 100° C. of at least 14 cSt; the base stock comprises: greater than or equal to about 90 wt % saturates, less than or equal to about 10 wt % aromatics, and a sum of terminal/pendant propyl groups and terminal/pendant ethyl groups of at least 1.7 per 100 carbon atoms; and the blended fluid has a thermal conductivity measured according to ASTM D7896 at 140° C. of 0.12 W/m·K or greater.

Embodiment 139. The method of Embodiment 138, wherein the oxidizing environment includes a temperature up to 250° F. (121° C.).

Embodiment 140. The method of any of Embodiments 138 to 139, wherein the oxidizing environment includes a temperature up to 302° F. (150° C.).

Embodiment 141. The method of any of Embodiments 138 to 140, wherein the oxidizing environment includes a temperature up to 325° F. (163° C.).

Embodiment 142. The method of any of Embodiments 138 to 141, wherein the oxidizing environment includes air.

Embodiment 143. The method of any of Embodiments 138 to 142, wherein the blended fluid is selected from a group consisting of: a base oil, a lubricant, a process fluid, a hydraulic fluid, an industrial fluid, an automotive fluid, and combination(s) thereof.

Embodiment 144. The method of any of Embodiments 138 to 143, wherein the blended fluid is configured to resist oxidation in the oxidizing environment.

Embodiment 145. The method of any of Embodiments 138 to 144, wherein the blended fluid has a kinematic viscosity at 100° C. (KV100) increase of 30% or less measured according to an ASTM D5704 test.

Embodiment 146. The method of any of Embodiments 138 to 145, wherein the blended fluid has a kinematic viscosity at 100° C. (KV100) increase of 20% or less measured according to an ASTM D5704 test.

Embodiment 147. The method of any of Embodiments 138 to 146, wherein the blended fluid has a kinematic viscosity at 100° C. (KV100) increase of 15% or less measured according to an ASTM D5704 test.

Embodiment 148. The method of any of Embodiments 138 to 147, wherein the blended fluid has an Average Carbon/Varnish rating as measured according to ASTM D5704 of from 8 to 10.

Embodiment 149. The method of any of Embodiments 138 to 148, wherein the blended fluid has an Average Sludge rating as measured according to ASTM D5704 of from 8 to 10.

Embodiment 150. The method of any of Embodiments 138 to 149, wherein the blended fluid has an Average Sludge rating as measured according to ASTM D5704 of from 9 to 10.

All numerical values within the detailed description and the claims herein are modified by "about" or "approximately" the indicated value, and take into account experimental error and variations that would be expected by a person having ordinary skill in the art.

When numerical lower limits and numerical upper limits are listed herein, ranges from any lower limit to any upper limit are contemplated. While the illustrative embodiments of the present disclosure have been described with particularity, it will be understood that various other modifications will be apparent to and can be readily made by those skilled in the art without departing from the spirit and scope of the present disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art.

While the foregoing is directed to embodiments of the present disclosure, other and further embodiments of the disclosure may be devised without departing from the basic scope thereof, and the scope thereof is determined by the claims that follow.

What is claimed is:

1. A fluid comprising:
a base stock and one or more additives, wherein:
the base stock has a viscosity index of at least 80, and either
a kinematic viscosity at 40° C. of at least 320 cSt, or
a kinematic viscosity at 100° C. of at least 14 cSt;
the base stock comprises:
hydrocarbons having greater than or equal to about 90 wt % saturates, and less than or equal to about 10 wt % aromatics,
wherein the hydrocarbons comprise hydrocarbon chains having propyl groups and ethyl groups, wherein the propyl groups and ethyl groups are terminal and/or pendant to the hydrocarbon chains, wherein a sum of the propyl groups and the ethyl groups is at least 1.7 per 100 carbon atoms of the hydrocarbons, and wherein the hydrocarbons are derived from low severity deasphalting of resid fractions to form a deasphalted oil wherein the deasphalted oil is further demetallated, hydrotreated, hydrocracked, hydrodewaxed, and hydrofinished to produce the base stock; and
the fluid has a thermal conductivity measured according to ASTM D7896 at 140° C. of 0.12 W/m·K or greater.

2. The fluid of claim 1, wherein the fluid has a thermal conductivity measured according to ASTM D7896 at 140° C. of 0.125 W/m·K or greater.

3. The fluid of claim 2, wherein the fluid has a thermal conductivity measured according to ASTMD7896 at 140° C. of 0.128 W/m·K to 0.135 W/m·K.

4. The fluid of claim 3, wherein the fluid has a thermal conductivity measured according to ASTM D7896 at 0° C. of 0.14 W/m·K or greater.

5. The fluid of claim 4, wherein the fluid has a thermal conductivity measured according to ASTM D7896 at 0° C. of 0.145 W/m·K or greater.

6. The fluid of claim 5, wherein the fluid has a thermal conductivity measured according to ASTM D7896 at 0° C. of 0.148 W/m·K to 0.155 W/m·K.

7. The fluid of claim 3, wherein the fluid has a specific heat capacity measured according to ASTM E1269 at 150° C. of 2.1 J/g·C or greater.

8. The fluid of claim 7, wherein the fluid has a specific heat capacity measured according to ASTM E1269 at 150° C. of 2.15 J/g·C or greater.

9. The fluid of claim 8, wherein the fluid has a specific heat capacity measured according to ASTM E1269 at 150° C. of 2.18 J/g·C to 2.3 J/g·C.

10. The fluid of claim 9, wherein when the fluid is at a temperature of 0° C., the fluid is substantially free of crystallized wax.

11. The fluid of claim 1, wherein the fluid is configured to resist oxidation in an oxidizing environment, and the fluid has a kinematic viscosity at 100° C. (KV100) increase of 30% or less measured according to an ASTM D5704 test.

12. The fluid of claim 1, wherein the fluid has a Brookfield viscosity measured according to ASTM D2983 of 30,000 mPa·s to 70,000 mPa·s at −12° C.

13. The fluid of claim 1, wherein the fluid has a Brookfield viscosity measured according to ASTM D2983 of 70,000 mPa·s to 150,000 mPa·s at −26° C.

14. A method comprising:
cooling a surface within an electrical machine by causing a fluid to contact the surface, wherein:
the fluid comprises a base stock and one or more additives;
the base stock has a viscosity index of at least 80, and either
a kinematic viscosity at 40° C. of at least 320 cSt, or
a kinematic viscosity at 100° C. of at least 14 cSt;
the base stock comprises:
hydrocarbons having greater than or equal to about 90 wt. % saturates, and less than or equal to about 10 wt. % aromatics, and
wherein the hydrocarbons comprise hydrocarbon chains having propyl groups and ethyl groups, wherein the propyl groups and ethyl groups are terminal and/or pendant to the hydrocarbon chains, wherein a sum of the propyl groups and the ethyl groups is at least 1.7 per 100 carbon atoms of the hydrocarbons, and wherein the hydrocarbons are derived from low severity deasphalting of resid fractions to form a deasphalted oil wherein the deasphalted oil is further demetallated, hydrotreated, hydrocracked, hydrodewaxed, and hydrofinished to produce the base stock; and
the fluid has a thermal conductivity measured according to ASTM D7896 at 140° C. of 0.12 W/m·K or greater.

15. The method of claim 14, wherein the electrical machine is an electric vehicle.

16. The method of claim 15, wherein the surface is part of a drivetrain.

17. The method of claim 16, further comprising causing the fluid to contact an electric traction motor within the electric vehicle.

18. The method of claim 15, wherein the surface is part of a battery pack.

19. The method of claim 18, further comprising causing the fluid to directly contact the battery pack.

20. The method of claim 19, further comprising causing the fluid to directly contact battery cells within the battery pack.

21. The method of claim 20, further comprising immersing the battery cells in the fluid.

22. The method of claim 14, wherein the fluid has a thermal conductivity measured according to ASTM D7896 at 140° C. of 0.125 W/m·K to 0.135 W/m·K.

23. The method of claim 22, wherein the fluid has a specific heat capacity measured according to ASTM E1269 at 150° C. of 2.1 J/g·C to 2.3 J/g·C.

24. The method of claim 23, wherein when the fluid is at a temperature of 0° C., the fluid is substantially free of crystallized wax.

25. A method for producing a deposit resistant fluid comprising:
combining a base stock and one or more additives to form a blended fluid configured to resist forming deposits in an oxidizing environment;
wherein:
the base stock has a viscosity index of at least 80, and either
a kinematic viscosity at 40° C. of at least 320 cSt, or
a kinematic viscosity at 100° C. of at least 14 cSt;
the base stock comprises:
hydrocarbons having greater than or equal to about 90 wt. % saturates, and less than or equal to about 10 wt. % aromatics, and
wherein the hydrocarbons comprise hydrocarbon chains having propyl groups and ethyl groups, wherein the propyl groups and ethyl groups are terminal and/or pendant to the hydrocarbon chains, wherein a sum of the propyl groups and the ethyl groups is at least 1.7 per 100 carbon atoms of the hydrocarbons, and wherein the hydrocarbons are derived from low severity deasphalting of resid fractions to form a deasphalted oil wherein the deasphalted oil is further demetallated, hydrotreated, hydrocracked, hydrodewaxed, and hydrofinished to produce the base stock; and
the blended fluid has a thermal conductivity measured according to ASTM D7896 at 140° C. of 0.12 W/m·K or greater.

26. The method of claim 25, wherein the oxidizing environment includes a temperature up to 325° F. (163° C.).

27. The method of claim 26, wherein the oxidizing environment includes air.

28. The method of claim 25, wherein the blended fluid is selected from a group consisting of: a base oil, a lubricant, a process fluid, a hydraulic fluid, an industrial fluid, an automotive fluid, and combination(s) thereof.

29. The method of claim 25, wherein the blended fluid has a kinematic viscosity at 100° C. (KV100) increase of 30% or less measured according to an ASTM D5704 test.

30. The method of claim 29, wherein the blended fluid has at least one of:
an Average Carbon/Varnish rating measured according to ASTM D5704 of from 8 to 10; and
an Average Sludge rating measured according to ASTM D5704 of from 8 to 10.

\* \* \* \* \*